United States Patent
Hu et al.

(10) Patent No.: US 10,963,493 B1
(45) Date of Patent: Mar. 30, 2021

(54) INTERACTIVE GAME WITH ROBOT SYSTEM

(71) Applicant: AIBrain Corporation, Seoul (KR)

(72) Inventors: Yi Hu, Seoul (KR); Run Cui, Seoul (KR); Hong Shik Shinn, Seoul (KR)

(73) Assignee: AIBrain Corporation

( * ) Notice: Subject to any disclaimer, the term of this patent is extended or adjusted under 35 U.S.C. 154(b) by 97 days.

(21) Appl. No.: 16/142,809

(22) Filed: Sep. 26, 2018

Related U.S. Application Data

(63) Continuation-in-part of application No. 15/946,646, filed on Apr. 5, 2018, now Pat. No. 10,810,371.

(60) Provisional application No. 62/482,631, filed on Apr. 6, 2017, provisional application No. 62/564,845, filed on Sep. 28, 2017.

(51) Int. Cl.
| | |
|---|---|
| G06F 16/332 | (2019.01) |
| G06F 40/40 | (2020.01) |
| G06N 3/08 | (2006.01) |
| G06K 9/00 | (2006.01) |
| G05D 1/02 | (2020.01) |
| G06N 5/02 | (2006.01) |

(52) U.S. Cl.
CPC ......... *G06F 16/3329* (2019.01); *G05D 1/021* (2013.01); *G06F 40/40* (2020.01); *G06K 9/00268* (2013.01); *G06K 9/00302* (2013.01); *G06N 3/088* (2013.01); *G06N 5/022* (2013.01)

(58) Field of Classification Search
CPC .... G06N 5/022; G06N 3/088; G06F 16/3329; G06K 9/00302; G05D 1/021
See application file for complete search history.

(56) References Cited

U.S. PATENT DOCUMENTS

| | | | | |
|---|---|---|---|---|
| 4,638,445 | A | * | 1/1987 | Mattaboni ............. B25J 19/021 |
| | | | | 701/23 |
| 4,815,005 | A | | 3/1989 | Oyanagi |
| 5,581,664 | A | * | 12/1996 | Allen ....................... G06N 5/04 |
| | | | | 706/46 |

(Continued)

OTHER PUBLICATIONS

Agichtein et al., Learning Search Engine Specific Query Transformations for Question Answering, 10th International World Wide Web Conference, World Academy of Science, Engineering and Technology, 2001, pp. 169-178.

(Continued)

*Primary Examiner* — Daniel C Washburn
*Assistant Examiner* — Oluwadamilola M Ogunbiyi
(74) *Attorney, Agent, or Firm* — Van Pelt, Yi & James LLP

(57) ABSTRACT

A system comprises a motor and a base. The motor is configured to control the physical movement of the system and the base is configured to be coupled with a computing device. The computing device is configured to receive an indication of a target object and detect an obstacle object in a physical environment of the system. In response to detecting an obstacle object, the computing device provides to a user an inquiry associated with the detected obstacle object and receives a natural language response. Based at least in part on the natural language response, the computing device controls the motor to navigate the system around the detected obstacle object. Once the target object is detected, the computing device provides an indication that the target object has been located.

20 Claims, 35 Drawing Sheets

(56) References Cited

U.S. PATENT DOCUMENTS

| | | | |
|---|---|---|---|
| 5,761,717 A | 6/1998 | Vishlitzky | |
| 5,875,331 A | 2/1999 | Lindsey | |
| 6,542,242 B1 | 4/2003 | Yost | |
| 6,859,931 B1 | 2/2005 | Cheyer | |
| 7,386,449 B2 | 6/2008 | Sun | |
| 7,426,500 B2 | 9/2008 | Dragojlovic | |
| 7,545,965 B2 * | 6/2009 | Suzuki | G06T 5/007 382/128 |
| 7,925,605 B1 | 4/2011 | Rubin | |
| 8,073,804 B1 | 12/2011 | Rubin | |
| 8,365,138 B2 | 1/2013 | Iborra | |
| 8,392,921 B2 | 3/2013 | Song | |
| 8,495,002 B2 | 7/2013 | Nelken | |
| 8,924,011 B2 | 12/2014 | Park | |
| 9,239,382 B2 | 1/2016 | Paglieroni | |
| 9,261,978 B2 | 2/2016 | Liberty | |
| 9,373,086 B1 * | 6/2016 | Allen | G06F 16/24522 |
| 9,380,017 B2 | 6/2016 | Gelfenbeyn | |
| 9,424,523 B2 | 8/2016 | Koll | |
| 9,471,668 B1 | 10/2016 | Alupului | |
| 9,555,326 B2 * | 1/2017 | Scott | A63F 13/245 |
| 9,564,149 B2 | 2/2017 | Gelfenbeyn | |
| 9,568,909 B2 | 2/2017 | Lawson | |
| 9,569,425 B2 | 2/2017 | Jackson | |
| 9,659,052 B1 | 5/2017 | Glennon | |
| 9,747,901 B1 * | 8/2017 | Gentry | B64C 39/024 |
| 9,792,434 B1 | 10/2017 | Li | |
| 9,801,517 B2 * | 10/2017 | High | G06K 9/00671 |
| 10,068,031 B2 | 9/2018 | Moore | |
| 10,297,253 B2 * | 5/2019 | Walker, II | G10L 15/22 |
| 10,318,907 B1 | 6/2019 | Bergstrom | |
| 10,341,304 B1 | 7/2019 | Boutros | |
| 10,395,173 B1 * | 8/2019 | Heidenreich | G06N 5/04 |
| 10,410,328 B1 | 9/2019 | Liu | |
| 10,418,032 B1 | 9/2019 | Mohajer | |
| 10,453,117 B1 | 10/2019 | Reavely | |
| 10,514,776 B2 | 12/2019 | Liberty | |
| 10,613,527 B2 * | 4/2020 | D'Andrea | A63H 17/26 |
| 2003/0130827 A1 | 7/2003 | Bentzien | |
| 2004/0013295 A1 * | 1/2004 | Sabe | G06T 7/97 382/153 |
| 2004/0044657 A1 | 3/2004 | Lee | |
| 2004/0182614 A1 * | 9/2004 | Wakui | G06N 3/008 180/7.1 |
| 2004/0193322 A1 | 9/2004 | Pirjanian | |
| 2004/0228456 A1 | 11/2004 | Glynn | |
| 2005/0005266 A1 | 1/2005 | Datig | |
| 2005/0028133 A1 | 2/2005 | Ananth | |
| 2005/0058066 A1 | 3/2005 | Sung | |
| 2005/0096790 A1 | 5/2005 | Tamura | |
| 2005/0165508 A1 * | 7/2005 | Kanda | G06N 3/008 700/245 |
| 2005/0256882 A1 | 11/2005 | Able | |
| 2005/0262130 A1 | 11/2005 | Mohan | |
| 2006/0041722 A1 | 2/2006 | Hakura | |
| 2006/0072738 A1 | 4/2006 | Louis | |
| 2006/0080382 A1 | 4/2006 | Dutta | |
| 2006/0150119 A1 | 7/2006 | Chesnais | |
| 2006/0195407 A1 | 8/2006 | Athelogou | |
| 2007/0070069 A1 | 3/2007 | Samarasekera | |
| 2007/0192910 A1 | 8/2007 | Vu | |
| 2007/0200920 A1 | 8/2007 | Walker | |
| 2008/0015418 A1 | 1/2008 | Jarrell | |
| 2008/0133052 A1 | 6/2008 | Jones | |
| 2008/0177683 A1 | 7/2008 | No | |
| 2008/0222077 A1 | 9/2008 | Duan | |
| 2008/0243305 A1 | 10/2008 | Lee | |
| 2009/0019058 A1 | 1/2009 | Jung | |
| 2009/0148034 A1 * | 6/2009 | Higaki | G06K 9/3241 382/153 |
| 2009/0175545 A1 | 7/2009 | Cancedda | |
| 2009/0192968 A1 | 7/2009 | Tunstall-Pedoe | |
| 2010/0013153 A1 | 1/2010 | Yourlo | |
| 2010/0036802 A1 | 2/2010 | Tsuruta | |
| 2010/0082513 A1 | 4/2010 | Liu | |
| 2010/0211340 A1 | 8/2010 | Lowenthal | |
| 2010/0222957 A1 * | 9/2010 | Ohta | B60K 35/00 701/31.4 |
| 2011/0010013 A1 * | 1/2011 | Ruan | B25J 5/007 700/261 |
| 2011/0054689 A1 * | 3/2011 | Nielsen | G05D 1/0088 700/258 |
| 2011/0090787 A1 | 4/2011 | Smith | |
| 2011/0106436 A1 | 5/2011 | Bill | |
| 2011/0224828 A1 | 9/2011 | Breznak | |
| 2011/0288684 A1 | 11/2011 | Farlow | |
| 2011/0307435 A1 | 12/2011 | Overell | |
| 2012/0010900 A1 | 1/2012 | Kaniadakis | |
| 2012/0016678 A1 | 1/2012 | Gruber | |
| 2012/0095619 A1 | 4/2012 | Pack | |
| 2012/0117005 A1 | 5/2012 | Spivack | |
| 2012/0130270 A1 | 5/2012 | Imamura | |
| 2012/0233152 A1 | 9/2012 | Vanderwende | |
| 2012/0238366 A1 | 9/2012 | Tedder | |
| 2013/0103195 A1 | 4/2013 | Anhalt | |
| 2013/0110764 A1 | 5/2013 | Wilf | |
| 2013/0138425 A1 | 5/2013 | Luke | |
| 2013/0246430 A1 | 9/2013 | Szucs | |
| 2013/0253977 A1 | 9/2013 | Vibhor | |
| 2013/0289984 A1 | 10/2013 | Hakkani-Tur | |
| 2013/0337916 A1 * | 12/2013 | Saretto | A63F 13/5378 463/32 |
| 2014/0070947 A1 | 3/2014 | Ionson | |
| 2014/0075004 A1 | 3/2014 | Van Dusen | |
| 2014/0100012 A1 | 4/2014 | Miller | |
| 2014/0108303 A1 | 4/2014 | Cheyer | |
| 2014/0132767 A1 * | 5/2014 | Sonnabend | G06K 9/00476 348/148 |
| 2014/0164533 A1 | 6/2014 | Lynch | |
| 2014/0223408 A1 | 8/2014 | Wunderlich, Jr. | |
| 2014/0279807 A1 * | 9/2014 | Dimitrijevic | G06F 16/00 706/47 |
| 2014/0279971 A1 | 9/2014 | Bobick | |
| 2014/0280210 A1 | 9/2014 | Ritchie | |
| 2014/0298358 A1 | 10/2014 | Tian | |
| 2014/0316570 A1 | 10/2014 | Sun | |
| 2015/0025708 A1 * | 1/2015 | Anderson | A61B 5/02055 701/2 |
| 2015/0032254 A1 * | 1/2015 | Ishiguro | B25J 9/1602 700/245 |
| 2015/0046181 A1 | 2/2015 | Adjaoute | |
| 2015/0066520 A1 | 3/2015 | Leon | |
| 2015/0066836 A1 | 3/2015 | Midmore | |
| 2015/0089515 A1 | 3/2015 | Bondada | |
| 2015/0106308 A1 | 4/2015 | Harrison | |
| 2015/0142704 A1 | 5/2015 | London | |
| 2015/0168954 A1 * | 6/2015 | Hickerson | G01S 7/483 700/259 |
| 2015/0193186 A1 | 7/2015 | Lee | |
| 2015/0197007 A1 | 7/2015 | Pack | |
| 2015/0248525 A1 | 9/2015 | Ury | |
| 2015/0269139 A1 | 9/2015 | McAteer | |
| 2015/0279348 A1 * | 10/2015 | Cao | G06F 16/288 704/258 |
| 2015/0285644 A1 | 10/2015 | Pfaff | |
| 2015/0290795 A1 | 10/2015 | Oleynik | |
| 2015/0310446 A1 | 10/2015 | Tuchman | |
| 2015/0326832 A1 * | 11/2015 | Zhang | G06K 9/00342 348/159 |
| 2015/0356144 A1 | 12/2015 | Chawla | |
| 2015/0378984 A1 | 12/2015 | Ateya | |
| 2016/0004826 A1 | 1/2016 | Van Arkel | |
| 2016/0062882 A1 | 3/2016 | Bonwick | |
| 2016/0068267 A1 * | 3/2016 | Liu | G05D 1/0061 701/11 |
| 2016/0103653 A1 | 4/2016 | Jang | |
| 2016/0110422 A1 | 4/2016 | Roytman | |
| 2016/0117593 A1 * | 4/2016 | London | G10L 15/1822 706/11 |
| 2016/0132789 A1 | 5/2016 | Flinn | |
| 2016/0167226 A1 * | 6/2016 | Schnittman | G05D 1/0274 382/153 |

(56) References Cited

U.S. PATENT DOCUMENTS

| | | | |
|---|---|---|---|
| 2016/0170742 A1 | 6/2016 | Pallath | |
| 2016/0188595 A1 | 6/2016 | Chen | |
| 2016/0189035 A1 | 6/2016 | Shakeri | |
| 2016/0255969 A1* | 9/2016 | High | G01S 1/7034 |
| 2016/0261771 A1 | 9/2016 | Fujii | |
| 2016/0271795 A1* | 9/2016 | Vicenti | G05D 1/0274 |
| 2016/0303738 A1 | 10/2016 | Laurent | |
| 2016/0350685 A1 | 12/2016 | Helbing | |
| 2016/0350930 A1 | 12/2016 | Lin | |
| 2016/0378752 A1 | 12/2016 | Anderson | |
| 2016/0379092 A1 | 12/2016 | Kutliroff | |
| 2016/0379106 A1 | 12/2016 | Qi | |
| 2016/0379120 A1 | 12/2016 | Merdivan | |
| 2016/0379121 A1* | 12/2016 | Ge | G06K 9/00288 706/46 |
| 2017/0004199 A1 | 1/2017 | Häusler | |
| 2017/0010830 A1 | 1/2017 | Ishikawa | |
| 2017/0017838 A1* | 1/2017 | Biswas | G06K 9/00302 |
| 2017/0024392 A1 | 1/2017 | Shah | |
| 2017/0038846 A1 | 2/2017 | Minnen | |
| 2017/0052905 A1 | 2/2017 | Lin | |
| 2017/0061302 A1 | 3/2017 | Subasi | |
| 2017/0078224 A1 | 3/2017 | Chander | |
| 2017/0099200 A1 | 4/2017 | Ellenbogen | |
| 2017/0109355 A1 | 4/2017 | Li | |
| 2017/0116187 A1* | 4/2017 | Erickson | G06F 40/253 |
| 2017/0250930 A1 | 8/2017 | Ben-Itzhak | |
| 2017/0255884 A1 | 9/2017 | Visvanathan | |
| 2017/0277619 A1 | 9/2017 | Liu | |
| 2017/0278110 A1 | 9/2017 | Ezry | |
| 2017/0293610 A1 | 10/2017 | Tran | |
| 2017/0297588 A1* | 10/2017 | Doshi | B60W 50/0098 |
| 2017/0307391 A1 | 10/2017 | Mason | |
| 2017/0308521 A1 | 10/2017 | Bruno | |
| 2017/0311863 A1* | 11/2017 | Matsunaga | A61B 5/163 |
| 2017/0318919 A1* | 11/2017 | Gharabegian | H04N 7/181 |
| 2017/0323285 A1 | 11/2017 | Xing | |
| 2017/0323356 A1* | 11/2017 | Gharabegian | A45B 3/02 |
| 2017/0330106 A1 | 11/2017 | Lindsley | |
| 2017/0337620 A1 | 11/2017 | Yu | |
| 2017/0364747 A1* | 12/2017 | Ekambaram | G06K 9/00671 |
| 2018/0043532 A1* | 2/2018 | Lection | B25J 9/1661 |
| 2018/0052876 A1* | 2/2018 | Liu | G06F 16/313 |
| 2018/0052913 A1 | 2/2018 | Gaskill | |
| 2018/0053114 A1 | 2/2018 | Adjaoute | |
| 2018/0054507 A1* | 2/2018 | Bentitou | H04M 3/527 |
| 2018/0068031 A1 | 3/2018 | Hewavitharana | |
| 2018/0075403 A1 | 3/2018 | Mascorro Medina | |
| 2018/0082230 A1* | 3/2018 | Rosenberg | G06Q 10/06311 |
| 2018/0092559 A1 | 4/2018 | Wybo | |
| 2018/0099846 A1* | 4/2018 | High | G06K 9/00791 |
| 2018/0107917 A1 | 4/2018 | Hewavitharana | |
| 2018/0108443 A1 | 4/2018 | Li | |
| 2018/0114111 A1 | 4/2018 | Gill | |
| 2018/0121098 A1 | 5/2018 | Gill | |
| 2018/0127211 A1 | 5/2018 | Jarvis | |
| 2018/0127212 A1 | 5/2018 | Jarvis | |
| 2018/0136615 A1 | 5/2018 | Kim | |
| 2018/0137155 A1 | 5/2018 | Majumdar | |
| 2018/0143634 A1* | 5/2018 | Ott | G05D 1/0212 |
| 2018/0143978 A1 | 5/2018 | Chang | |
| 2018/0144208 A1 | 5/2018 | Lu | |
| 2018/0144248 A1 | 5/2018 | Lu | |
| 2018/0144257 A1 | 5/2018 | Ankisettipalli | |
| 2018/0150740 A1 | 5/2018 | Wang | |
| 2018/0157902 A1* | 6/2018 | Tu | G06K 9/0055 |
| 2018/0165518 A1* | 6/2018 | Assaf | G06K 9/00671 |
| 2018/0165625 A1* | 6/2018 | Modi | G06F 16/90332 |
| 2018/0169865 A1* | 6/2018 | Kou | A63H 33/005 |
| 2018/0173459 A1 | 6/2018 | Katarki | |
| 2018/0189269 A1 | 7/2018 | Quirk | |
| 2018/0190377 A1* | 7/2018 | Schneemann | G06K 9/00275 |
| 2018/0197275 A1 | 7/2018 | Price | |
| 2018/0218266 A1 | 8/2018 | Halim | |
| 2018/0218472 A1 | 8/2018 | Riabov | |
| 2018/0225281 A1 | 8/2018 | Song | |
| 2018/0233141 A1 | 8/2018 | Solomon | |
| 2018/0256989 A1* | 9/2018 | Adekunle | A63F 13/235 |
| 2018/0267540 A1 | 9/2018 | Sonoura | |
| 2018/0268699 A1* | 9/2018 | Ohsawa | B60W 30/0956 |
| 2018/0275677 A1* | 9/2018 | Hamada | A63H 11/00 |
| 2018/0275913 A1 | 9/2018 | Mitkar | |
| 2018/0281191 A1 | 10/2018 | Sinyavskiy | |
| 2018/0284735 A1 | 10/2018 | Cella | |
| 2018/0285359 A1 | 10/2018 | Bostick | |
| 2018/0285595 A1* | 10/2018 | Jessen | G06F 16/9535 |
| 2018/0292827 A1* | 10/2018 | Artes | G05D 1/0212 |
| 2018/0314603 A1 | 11/2018 | Gibbons, Jr. | |
| 2018/0314689 A1 | 11/2018 | Wang | |
| 2018/0336271 A1* | 11/2018 | Chandrasekaran | G06F 16/24578 |
| 2018/0349485 A1 | 12/2018 | Carlisle | |
| 2019/0035083 A1 | 1/2019 | Lin | |
| 2019/0053856 A1* | 2/2019 | Weber | A61B 18/1477 |
| 2019/0154439 A1 | 5/2019 | Binder | |
| 2019/0179329 A1 | 6/2019 | Keivan | |
| 2019/0193273 A1 | 6/2019 | Favis | |
| 2019/0220774 A1* | 7/2019 | Terry | G06F 11/3466 |
| 2019/0255703 A1 | 8/2019 | Izhikevich | |
| 2019/0273619 A1 | 9/2019 | Campagna | |
| 2019/0278796 A1 | 9/2019 | Lellis | |
| 2019/0286996 A1* | 9/2019 | Tian | G06F 16/00 |
| 2019/0290209 A1* | 9/2019 | Fu | A61B 5/6828 |
| 2019/0347120 A1 | 11/2019 | Kottomtharayil | |
| 2019/0351558 A1* | 11/2019 | Park | B25J 13/06 |
| 2019/0361457 A1* | 11/2019 | Johnson | B63H 25/00 |
| 2019/0370909 A1 | 12/2019 | Grewal | |
| 2019/0378019 A1 | 12/2019 | Scheutz | |
| 2020/0035110 A1* | 1/2020 | Priest | G08G 5/0039 |
| 2020/0061839 A1 | 2/2020 | Deyle | |
| 2020/0117187 A1* | 4/2020 | Kothari | G06K 9/00892 |
| 2020/0152084 A1* | 5/2020 | Kumar | G06F 3/16 |
| 2020/0215698 A1 | 7/2020 | Bogolea | |

OTHER PUBLICATIONS

Kambhampati et al, "Multiresolution Path Planning For Mobile Robots," IEEE Journal on Robotics and Automation, vol. 2 Issue 3, pp. 135-145. (Year: 1986).

Kangavari et al., Information Retrieval: Improving Question Answering Systems by Query Reformulation and Answer Validation, World Academy of Science, Engineering and Technology, 2008, pp. 303-310, Issue 48.

Kamel et al., "A graph based knowledge retrieval system." 1990 IEEE International Conference on Systems, Man, and Cybernetics Conference Proceedings. IEEE, 1990. (Year: 1990).

* cited by examiner

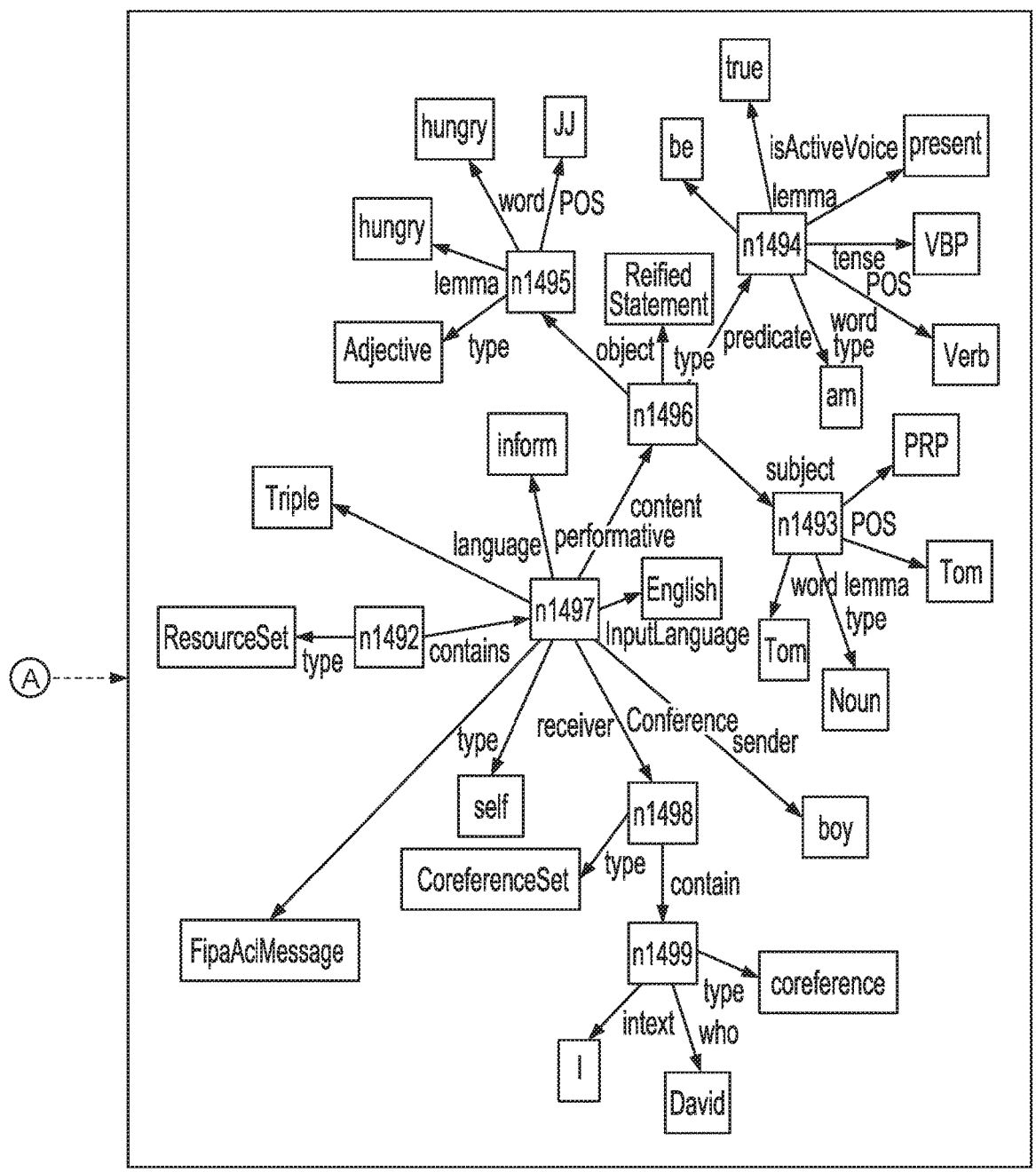
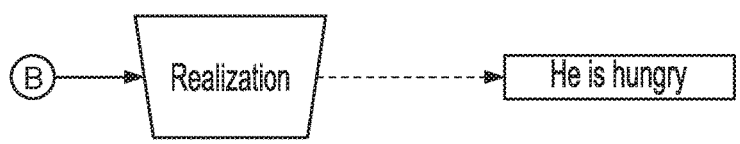
FIG. 14 (Cont.)

1. Initialize state
2. Repeat - Overall works
    1) Get new external events
    2) Sequence for determining plan
        * Repeat to select most proper module
            1/Select the highest priority module
            2/Execute Planner or selected module
                *(if planner works)*
                >> Generate Domain & Problem
                >> Set a goal
                >> Run planner to get a plan
                *(If other module works)*
                >> Execute each module's work
                >> Set a plan for module
            3/Investigate if plan is proper
        * Repeat end (if plan is proper)
    3) Execute plan with executor
    4) Generate natural language
    5) Output generated response
3. End Repeat - Overall works

FIG. 18

| Action command of intelligent smartphone robot ||||
|---|---|---|---|
| Start robot | Stop robot | Turn left | Turn right |
| Light on | Light off | Move forward | Move backward |

FIG. 22

| Obstacle detected | Object recognized | Find the final target | Sample questions |
|---|---|---|---|
| Yes | No | No | Do I need to turn left?<br>Do I need to move forward?<br>Do I need to turn on the lights? |
| No | No | No | No question in this case |
| Yes | Yes | Yes | Did I find the [Final Target Name]?<br>Is final target [Final Target Name]?<br>Do I win?<br>Am I victorious? |
| No | Yes | Yes | Is final target on my left?<br>Is final target in front of me?<br>Do I need to move forward?<br>Do I need to move to the left side of [Recognized Object Name]?<br>Is [Final Target Name] near the [Recognized Object Name]? |
| Yes | Yes | No | Is [Final Target Name] on the right side of [Recognized Object Name]? |
| No | Yes | No | Do I need to move towards to [Recognized Object Name]? |

FIG. 23

INTERACTIVE GAME WITH ROBOT SYSTEM

CROSS REFERENCE TO OTHER APPLICATIONS

This application is a continuation-in-part of co-pending U.S. patent application Ser. No. 15/946,646 entitled ADAPTIVE, INTERACTIVE, AND COGNITIVE REASONER OF AN AUTONOMOUS ROBOTIC SYSTEM filed Apr. 5, 2018, which claims priority to U.S. Provisional Patent Application No. 62/482,631 entitled ADAPTIVE, INTERACTIVE, AND COGNITIVE REASONER OF AN AUTONOMOUS ROBOTIC SYSTEM filed Apr. 6, 2017, both of which are incorporated herein by reference for all purposes.

This application claims priority to U.S. Provisional Patent Application No. 62/564,845 entitled INTERACTIVE GAME WITH INTELLIGENT SMARTPHONE ROBOT filed Sep. 28, 2017 which is incorporated herein by reference for all purposes.

BACKGROUND OF THE INVENTION

Traditional robotic systems such as a voice artificial intelligence (AI) robot agent are capable of responding to generic queries. Examples of a query and response include asking and receiving a response for the current weather or movie show times. These queries typically rely on backend databases, such as weather or movie show times databases, to retrieve general knowledge information. Typically, the queries are directed from the human user to the AI robot and not vice versa. Moreover, traditional AI robots are not able to formulate context-specific questions to learn from the responses of human users to solve a common goal. The ability for an AI robot to query a user and learn from the user's responses helps to create a more interactive and rich user experience. Therefore, there exists a need for an interactive game utilizing the features of an autonomous AI robotic system that allow the robotic system to interact with game players in a more natural and friendly manner.

BRIEF DESCRIPTION OF THE DRAWINGS

Various embodiments of the invention are disclosed in the following detailed description and the accompanying drawings.

FIG. 18 is a pseudo-code description illustrating an embodiment of a process for solving an artificial intelligence problem using adaptive, interactive, and cognitive reasoning.

FIG. 22 is a table illustrating exemplary action commands for an embodiment of an intelligent smartphone robot for an interactive game system.

FIG. 23 is a table illustrating exemplary questions that may be asked by an embodiment of an intelligent smartphone robot for an interactive game system.

DETAILED DESCRIPTION

Figure 1:
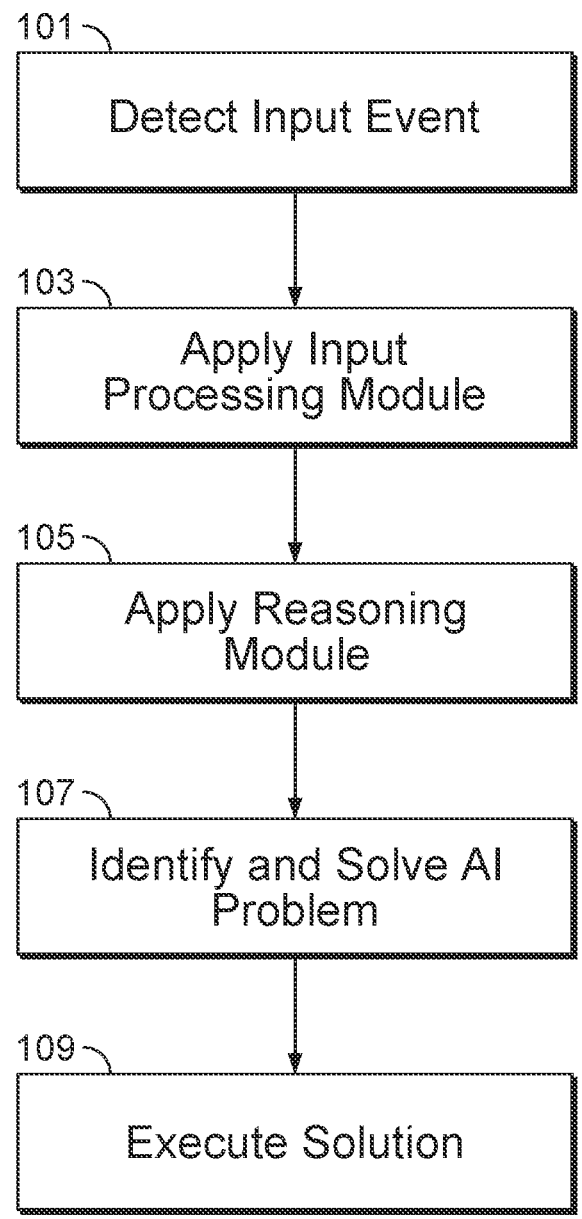
FIG. 1 is a flow diagram illustrating an embodiment of a process for responding to an input event using an adaptive, interactive, and cognitive reasoner.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An autonomous robotic system for responding to conversational voice input using an adaptive, interactive, and cognitive reasoner is disclosed. For example, a voice artificial intelligence (AI) robot agent is capable of storing previous conservations with a user and using the stored knowledge in responses to new queries. The voice AI robot agent is also capable to asking a user questions and learning from the user's responses. In additional, a conversation between a user and an autonomous robotic system can include multiple back-and-forth exchanges where the responses of the autonomous robotic system rely on the context of what the user speaks or the surrounding environment of the robot agent. The user's voice input is processed using speech recognition and natural language understanding. The processed input is then compared to a knowledge store, such as a memory graph, that stores historical knowledge shared by the user with the agent. Using the retrieved supporting knowledge and the user's input, an AI planning problem is constructed. The AI problem is solved using an AI planner such as an automated planner and/or by referencing previous solutions to similar problems. The resulting solution is executed using natural language generation to provide the user with a voice response. The result is a conversation between a user and an AI agent that spans multiple back-and-forth exchanges and where the content of the conversation includes responses that rely on past conversations or the surrounding environment. The questions and responses generated by the AI agent are much more interactive and adaptive to the user's responses and the robot's surrounding environment than possible with traditional voice AI response techniques.

An interactive game using an intelligent smartphone robot is disclosed. For example, an intelligent smartphone robot utilizing an adaptive, interactive, and cognitive reasoner interacts with a human user to play an interactive game. The intelligent smartphone robot is placed in a physical game environment along with obstacles and a target object. The goal of the intelligent smartphone robot is to find the target object with the help of the human user. The intelligent smartphone robot can detect objects that are obstacles as well recognize the target object. When an obstacle is encountered, the intelligent smartphone robot can ask the human user a question, for example, to help navigate around the obstacle and to the target object. In some scenarios, the robot may ask, "Should I turn left?" or "Should I move forward?" based on the context of the encounter with detected objects. In various embodiments, the adaptive, interactive, and cognitive reasoner is remotely located and processes status information received from the intelligent smartphone robot to generate action commands for the intelligent smartphone robot to execute. In various embodiments, the interactive game requires the adaptive, interactive, and cognitive reasoner to solve an AI problem using inputs from the sensors of the intelligent smartphone robot including responses from the human user to inquiries generated by the reasoner. In some embodiments, the intelligent smartphone robot uses facial expression recognition to identify the facial expressions of the human user. For example, prior to asking the human user a question, the intelligent smartphone robot may turn to face the human user in order to more accurately and/or interactively capture the human's verbal answer and/or facial expressions. In various embodiments, the context of the autonomous robot along with a verbal response and/or recognized facial expressions are used to by a cognitive reasoner to solve an AI planning problem. In some embodiments, the solutions to an AI planning problem are generated actionable results for the intelligent smartphone robot to execute.

In some embodiments, a system comprises a motor configured to control a physical movement of the system and a base configured to be coupled with a computing device. For example, an autonomous robot system may include a motorized robot base and a smartphone computing device docked on the motorized base. The motorized base is used to move the coupled smartphone computing device and base, for example, to navigate a physical environment. In some embodiments, the computing device is configured to play an interactive game with a human player. The computing device is configured to receive an indication of a target object. For example, a human player registers a target object with an intelligent smartphone robot. In some embodiments, the registration is done by voice, using a camera, and/or via a touchscreen. In various embodiments, a human user identifies a target object such as a ball or a person's face as the target object for the intelligent smartphone robot to find. The computing device is configured to detect an obstacle object in a physical environment of the system. For example, using sensors such as distance measurement sensors, objects in the proximity of the coupled computing device and base are detected and some may be determined to be obstacles hindering the robot from reaching the target object. In response to a detection of the detected obstacle object, the computing device is configured to provide to a user an inquiry associated with the detected obstacle object. For example, the smartphone robot may ask the user a question based on the context of the obstacle. In some embodiments, the inquiry may ask for a suggestion on how to navigate around the obstacle object. In various embodiments, the generated inquiry is determined by a cognitive reasoner based at least in part on status information transmitted from the computing device to the reasoner. In various embodiments, the computing device is configured to receive a natural language response to the inquiry. For example, a human user may tell the robot to go through a tunnel, to go to the left of a stack of books, to move forward through a small pile of confetti, etc. In various embodiments, the computing device receives the user's response. In some embodiments, the computing device is configured to control the motor to navigate the system around the detected obstacle object based at least in part on the natural language response. For example, based on the human user's response, the intelligent smartphone robot executes a plan to navigate around the obstacle. In some embodiments, the plan is a command action sequence generated by a cognitive reasoner solving an AI planning problem. In some embodiments, the target object is detected. For example, based on a human user's feedback, the intelligent smartphone robot successfully navigates to reach the target object and detects the target object. In various embodiments, the target object is identified with a particular confidence level using computer vision. Before the game is won, the computing device is configured to provide an indication that the target object has been located. For example, the intelligent smartphone robot will ask the human user to confirm that the detected target object is the actual target object. Once confirmed, the game is completed and the human user is rewarded with a win. In the event the detected target object is not the actual target object, the search for the target object continues. In some embodiments, the search to find the target object must be completed within a time out period or else the game ends with a loss for the human user.

In some embodiments, a natural language artificial intelligence (AI) problem is solved. For example, a user asks a voice AI agent a query and the voice AI agent solves the natural language AI problem and provides a vocal response. For example, a user asks a voice AI agent a query and the voice AI agent solves the natural language AI problem and provides a vocal response. Initially, a natural language input is received. For example, a user speaks a query to a robotic system such as a voice AI agent. The natural language input is processed to classify components of the natural language input. For example, the voice is processed into a structured format that identifies a subject, object, and predicate. In some embodiments, one or more lemma are identified as well as a performative classification, a sender of the input, and a receiver of the input. A starting node of an artificial intelligence memory graph data structure is selected to begin a search for one or more supporting knowledge data nodes associated with the classified components, wherein the artificial intelligence memory graph comprises one or more data nodes. For example, an artificial intelligence memory graph is made up of one or more nodes including root nodes that are each associated with a different user that has interacted with the robotic system. The speaker of the natural language input is identified and the user root node associated with the speaker is selected as a starting node. Starting at the starting node, the artificial intelligence memory graph data structure is searched using a lexical database to identify the one or more supporting knowledge data nodes. For example, the starting nodes may serve as a starting node to begin a search for data nodes relevant to the classified components. In some embodiments, one or more nodes based on previous input are identified as supporting knowledge and are associated with the example query. In some embodiments, a lexical database is used to identify words and/or nodes that are related to the input. In some embodiments, a lexical database is utilized for co-referencing. An artificial intelligence problem is identified. For example, a query is identified as an AI problem that is different from a declaration. In one scenario, a user may ask "What is my name?" and in the other scenario a user makes the assertion "My name is Alice." In various embodiments, the identified AI problem is generated using the processed natural language input and identified supporting knowledge data nodes. The artificial intelligence problem is solved using the one or more identified supporting knowledge nodes of the artificial intelligence memory graph data structure. For example, using the identified nodes as supporting knowledge, an AI planning problem is created and solved. In some embodiments, the AI problem is an AI planning problem solved using an AI planner.

In some embodiments, the classified components of the natural language input are recorded in one or more nodes of an artificial intelligence memory graph data structure. As an example, certain words or variations of words of an input sentence are classified into word components and recorded as nodes in a memory graph data structure for processing and retrieval at a later date. The nodes may identify the part of speech of the word and its relation to the sentence as well as previously received input. In some embodiments, the solution to the identified artificial intelligence problem is also stored in the artificial intelligence memory graph data structure.

Cognitive Science and other related fields have brought us closer to the understanding of the human mind and brain and how they work. True AI has the very purpose of mapping the human knowledge and how it is acquired, processed, and used into artificial intelligent agents. The adaptive interactive cognitive reasoning engine (AICoRE) is an agent reasoner that is meant to be the encapsulation of the components of the human mind in any agent with a robot body. The integration of the human knowledge traits from language, memory, visual perception, thinking and reasoning to decision making and social cognition can be shown in a practical implementation of the general conversational agent.

In various embodiments, the adaptive interactive cognitive reasoning engine (AICoRE) is a cognitive reasoning engine that unifies problem solving and learning. It may fully automate the reasoning process from end to end. In some embodiments, the AICoRE is an incremental holistic human-like reasoner, covering the full spectrum of reasoning from sensing, reasoning, discovering, planning, learning and remembering until responding and performing.

In order to have such a significant improvement over the general conversation agent (GCA), the depth and breadth of the research that was undertaken includes fields like audio-visual sensory techniques, natural language understanding (NLU), reasoning, planning, natural language generation (NLG), case based reasoning (CBR), inter-agent communication (iAC) and memory graph (MG). In some embodiments, these modules constitute the AICoRE, and are closely related to each other.

In some embodiment, the NLU module tries to find triples from a sentence using a natural language processing tool and co-reference modules. In some embodiments, the NLU module parses sentences based on constituency first, and then adds more information such as the subject, verb, and object of the sentence. It not only parses the grammatical structure of the sentence, but also analyzes the performative and language of the sentence. In addition, the co-reference module checks not only objects in sentences, but also the relationships between the speaker and the object.

In some embodiments, the output of NLU is transferred into a reasoner module to retrieve information that will help the next module, the planner, generate a response fit for general conversation. Using a supporting knowledge retriever sub-function, the reasoner gathers a list of resources from the memory graph corresponding to knowledge that are related to the given input, and ranks these resources in order of importance. After that, an open-ended conversation generator sub-module determines possible response types that will serve as templates for generating more various natural responses.

In some embodiments, using the output of the reasoner module, the problem generator generates an artificial intelligence problem and the planner solves the problem. For example, in some embodiments, the problem generator generates a PDDL domain/problem description, and the planner module solves the PDDL problem specified by the description. In various embodiments, the planner module is capable of dealing with both physical and cognitive (speech) actions, and also dealing with real world problems while interacting with multiple agents and humans. Unlike traditional conversation agents, the disclosed autonomous robotic system can use the planner module itself to get solutions.

In various embodiments, the generated solution is used in a NLG module for generating answers in a natural language format. For example, a NLG module is utilized to generate natural language from a machine-based representation such as a knowledge base or a logical form.

In some embodiments, all of the generated data is saved in memory. The AICoRE can manage and use the saved data efficiently, for example, by using its memory structure. In various embodiments, the CBR is the process of solving new problems based on the solutions of similar past problems. The CBR compares the current case against previous ones based on a description of the problem, such as a PDDL problem description, and the action plan made by the planner module. In the event the CBR module determines a previously solved problem is similar to the current one, a previous case may be reused.

In various embodiments, inter-agent communication (iAC) is utilized for communication between different agents. The iAC may include two modules, an iACManager and an iAC Server. The iACManager module represents the client side of the iAC. The iACManager module generates ACLMessages and sends the messages via an inter-agent communication platform. In some embodiments, the ACLMessages are based on the FIPA-ACL standard. In some embodiments, the inter-agent communication platform is the JADE Platform. In some embodiments, the iACServer module runs on the same inter-agent communication platform as the iACManager and can send and receive ACLMessages. In various embodiments, messages are sent based on whether the appropriate receiver exists.

An example process of the AICoRE is as follows: the chosen event, represented in natural language format, gets put into the natural language understanding module of the AICoRE. Next, the planner module of the AICoRE uses a set of internal rules to set the most proper goal and plan to get the best solution for the given event. The AICoRE relies on rules of the planner module as well as rules from other modules within the system. In some embodiments, an iterative sequence is required within the main repeat sequence in order to account for all the various rules. Examples of rules not from the planner module include rules from the reasoner module that are used to map data to the event, based on various characteristics of the event. Once a plan is set for executing a solution for a given event, the AICoRE executes the plan with an executor module. Using the steps generated by the execution of the plan, the AICoRE can generate responses in a natural language form that satisfies the actions required to accomplish the goal set by the input event.

FIG. 1 is a flow diagram illustrating an embodiment of a process for responding to an input event using an adaptive, interactive, and cognitive reasoner. In the example shown, the process of FIG. 1 may be used by an autonomous robotic system to create and execute a voice response to a received query, such as a voice query. As another example, the result of FIG. 1 may be movement performed by an autonomous robotic system in response to a movement command. In various embodiments, the process of FIG. 1 may be implemented on a computer programmed system including a mobile device. In some embodiments, portions of the process of FIG. 1 are performed across one or more computer programmed systems including remote servers such as cloud computing servers. In some embodiments, the process of FIG. 1 is implemented by an autonomous robotic system in response to an input event.

At 101, an input event is detected. In various embodiments, the input event is a triggering event that initiates the processing of FIG. 1. In some embodiments, the input detected is voice input from a human user such as a spoken sentence. In some embodiments, the input detected includes not only voice input but also visual input. In various embodiments, the input detected may be voice input, visual input (e.g., gestures, the presentation of a face, an object moving, etc.), and network communication, among others. In some embodiments, the input detected is received from an autonomous agent and/or autonomous robot.

At 103, an input processing module is applied to the input detected at 101. In various embodiments, an autonomous robotic system includes one or more input processing modules. In various embodiments, a conversation module is used to process voice input. In some embodiments, visual input such as a gesture is processed by a vision module, remote communication is processed using a remote communication module, movement instructions are processed by a plan & move module, etc. In the example shown, the appropriate input processing module is determined and applied. For example, a conversation module is selected and applied when the input detected at 101 is determined to be a voice sentence that initiates or continues a conversation.

At 105, a reasoning module is applied. For example, an autonomous robotic system includes a reasoning module that identifies and retrieves supporting knowledge related to the input event detected at 101. In some embodiments, the knowledge is retrieved from a knowledge store such as a memory graph data structure that captures and organizes data previously learned including data from sources such as conversations, actions, and/or observations, etc. In some embodiments, a reasoning module determines which data of the knowledge store is supporting knowledge in part by utilizing a lexical database. For example, a remote lexical database may be utilized for co-referencing to identify data as relevant to the received input. In various embodiments, a reasoning module may access remote data stores for supporting knowledge in addition to the knowledge store of the system. In various embodiments, the knowledge store may be local and/or remote to the system. In some embodiments, the knowledge store may be partitioned by the entity that generates, creates, and/or receives the knowledge. For example, a knowledge store may contain a separate partition of the data associated with each different user that interacts with the system. In some embodiments, the knowledge store may contain a separate partition of data for the autonomous system. In various embodiments, the knowledge store may be located on a server system and/or in the cloud. In some embodiments, the knowledge store is maintained on the local system and/or device and may be encrypted to limit access to only processes local the knowledge store. In various embodiments, the knowledge store may reside in one or more locations. In some embodiments, the reasoning modules updates the knowledge store based on the input event.

At 107, an artificial intelligence (AI) problem is identified and solved. In some embodiments, the supporting knowledge retrieved at 105 is used to identify and construct an AI planning problem. In various embodiments, the AI planning problem is solved using an AI planner. In some embodiments, once solved, the solution is saved for potential reuse if the same problem is encountered again. In some embodiments, previously solved problems are analyzed to determine the appropriate solution for the current problem. For example, previous solved problems may be matched using a case based reasoning module and the solution re-used for a subsequently generated AI planning problem. In various embodiments, case based reasoning improves the performance of the system compared to a solution that relies solely on an AI planner. In various embodiments, the solution is used to create a response to the input received at 101.

At 109, a solution is executed. For example, in response to a voice input at 101, the solution solved at 107 is executed by generating a voice response that is played to the user. In various embodiments, a voice response is generated using natural language generation. In some embodiments, the executed solution and/or output are added to the knowledge store of the system. As another example, in response to input that is a movement request, an autonomous robotic system will move based on its understanding of the received movement instruction. For example, an autonomous robot may determine to move to a certain location, at a certain speed, using a certain movement pattern (walking, running, crawling, 4-wheel drive, 2-wheel drive, slithering, etc.). In various embodiments, the execution of the solution is performed by an executor module. In some embodiments, the executor module relies on one or more different sub-modules depending on type of input event detected at 101. For example, in the case of a movement request input event, the executor module executes a solution that physically moves the autonomous robotic system and may engage different mechanical control systems including those configured to manipulate motor and steering functionality.

Figure 2:
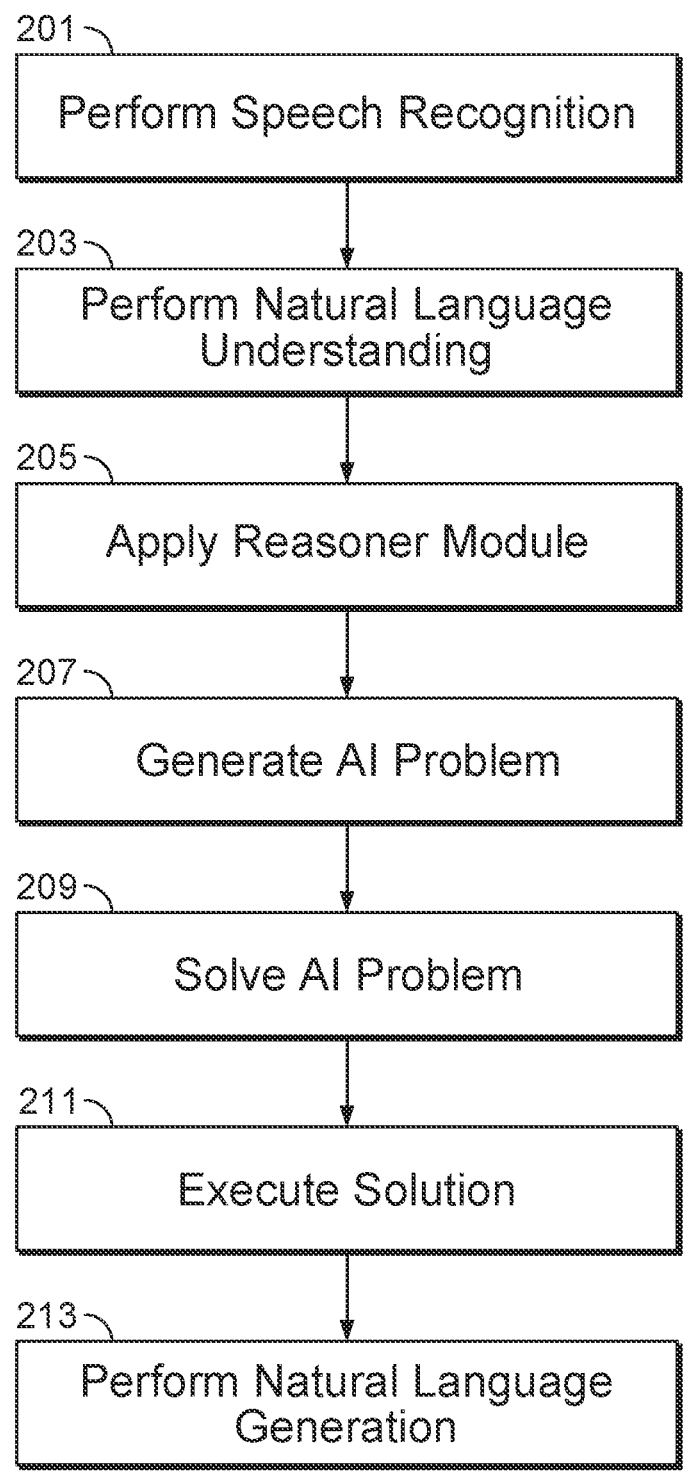
FIG. 2 is a flow diagram illustrating an embodiment of a process for responding to voice input using an adaptive, interactive, and cognitive reasoner with a voice response.

FIG. 2 is a flow diagram illustrating an embodiment of a process for responding to voice input using an adaptive, interactive, and cognitive reasoner with a voice response. In the example shown, the process of FIG. 2 may be used by an autonomous robotic system to create and execute a voice response to a received voice query. For example, a voice artificial intelligence (AI) agent can generate a response to the voice query "What fruit do I like?" that answers the fruit the user previously told the agent that she or he likes. In some embodiments, the process of FIG. 2 is performed using the process of FIG. 1.

At 201, speech recognition is performed. In various embodiments, speech recognition is performed on detected voice input. For example, an input event associated with a spoken sentence is detected as a sound and recognized as human speech. In some embodiments, the speech recognition identifies the beginning and end of a voice input. In some embodiments, the step of 201 is performed as part of the step of 101 and/or 103 of FIG. 1.

At 203, natural language understanding is performed. For example, a natural language understanding process is performed by a natural language understanding module on the speech recognized at 201 to derive meaning from the received human or natural language input. In some embodiments, the natural language understanding functionality is performed by a conversation input processing module. In some embodiments, the step of 203 is performed at 103 of FIG. 1 in response to applying a conversation input processing module to detected voice input.

In some embodiments, the natural language understanding module attempts to identify triples from a sentence. For example, a sentence recognized as speech at 201 is parsed and triples are extracted. In some embodiments, triples are extracted using a parse tree. In some embodiments, reified triples are extracted from the sentence. In some embodiments, the system uses labeled-links to find appropriate modifiers from an element. In various embodiments, reification is utilized to further annotate the recognized sentence.

In some embodiments, the natural language understanding processing includes adding missing punctuation to improve the accuracy of the syntactic parsing. For example, a first set of words of the sentence and corresponding parts of speech tags are analyzed and punctuation may be added. In some embodiments, co-referencing is performed to identify referents prior to creating a parse tree. In some embodiments, the initial parse tree is corrected using a set of pre-defined rules. In various embodiments, the sentence's performative classification is determined and may be utilized to determine the appropriate response. Examples of performative classifications include inform, query-ref, query-if, and request types and may be used to denote the type of communicative act. In various embodiments, fewer or more performatives types may be supported. In some embodiments, the performatives are based on the Foundation for Intelligent Physical Agents-Agent Communication Language (FIPA-ACL) specification. For example, a query-if performative denotes a query (e.g., "Do you like apples?" and "Am I a student?") that expects a true or false response. A query-ref performative denotes a query (e.g., "What fruit do I like?" and "How is the weather today?") that expects a response using an object answer. A request performative is a request directed to the autonomous robotic system. Examples include: "Move forward" and "Turn the light on."

In various embodiments, the natural language understanding process parses the received sentence based on constituency and then added additional information such as the identified subject, verb, and/or object. The module identifies the grammatical structure of the sentence and determines the sentence's performative classification and language.

At 205, a reasoner module is applied. In various embodiments, the reasoner module is implemented using an adaptive, interactive, and cognitive reasoner. For example, an adaptive, interactive, and cognitive reasoner is applied to the voice input processed at 201 and 203. In some embodiments, the reasoner provides data for creating an artificial intelligence (AI) planning problem. For example, the reasoner may retrieve data used to generate an AI problem based on the relevance of stored data to the input to the reasoner. In some embodiments, the data is retrieved from a memory graph data structure that stores episodic memory relevant to each user the robotic system interacts with. In some embodiments, the step of 205 is performed at 105 of FIG. 1.

At 207, an artificial intelligence (AI) problem is generated. In some embodiments, the problem is generated by an AI problem generator using the information provided by applying a reasoner module at 205. In some embodiments, the planning problem is described using an artificial intelligence planning language such as the language described by the Planning Domain Definition Language (PDDL) specification and/or a multi-agent extension of PDDL. In some embodiments, the specifications are Multi-Agent PDDL (MA-PDDL) descriptions that include a domain description and a problem description. In various embodiments, the problem generation includes converting the extracted triple at 203 to an artificial intelligence planning language. The generated problem includes a description of the current status and/or state of the system and one or more goals to achieve. In some embodiments, the step of 207 is performed as part of 107 of FIG. 1.

In some embodiments, the generated artificial intelligence (AI) problem uses a predefined problem domain and includes one or more actions appropriate for the domain. In various embodiments, the actions are defined based on the performative of the input sentence. For example, in some embodiments, the performative classifications include inform, query-ref, query-if, and request to denote the type of communicative act. In various embodiments, fewer or more performative types may be supported. In some embodiments, the performatives are based on the Foundation for Intelligent Physical Agents-Agent Communication Language (FIPA-ACL) specification.

At 209, an artificial intelligence (AI) problem is solved. In various embodiments, the solution is solved using an AI planner. In some embodiments, the AI planner utilizes a machine learning model such as a deep convolutional neural network (DCNN). In various embodiments, a traditional AI planner is utilized to solve the AI planning problem. For example, the planner determines a sequence of actions based on an AI planning problem generated at 207. In some embodiments, once solved, the solution is saved for potential reuse in the event the same or a similar problem is encountered again. For example, the problem, the solution, and the context related to the two are saved in a knowledge store such as a memory graph data structure. In some embodiments, the step of 209 is performed as part of 107 of FIG. 1.

In some embodiments, a case based reasoning (CBR) module is used in addition to an AI planner. For example, a CBR module is utilized to increase the performance of AI problem solving by relying on previously solved AI problems and their solutions. Previous solutions are stored as case data using the CBR module. In some embodiments, the data for a case includes at least the problem and an associated sequence of actions determined to solve the problem. In response to a new AI planning problem that matches a previous case, the previously solved solution is utilized instead of re-solving the same problem. In various embodiments, utilizing the CBR module reduces the response time for solving an AI problem.

In some embodiments, case data are stored in a knowledge store such as a memory graph data structure. For example, case data stored may include sender, receiver, time, planner, problem, and solution information. In various embodiments, the sender information identifies the speaker, the receiver information identifies the listener, the time information is the time associated with the conversation, the planner information includes the type of planner used for generating the solution, and the solution information is the action plan of the selected planner.

At 211, the solved artificial intelligence (AI) problem solution is executed. In some embodiments, an executor module executes the solution plan to the AI problem. In various embodiments, the executor module uses one or more different sub-modules to execute the solution based on the input event. For an input event requiring a voice response, the executor module utilizes a natural language generation sub-module and processing continues to 213 where a voice response is generated. In some embodiments, the step of 211 is performed as part of 109 of FIG. 1

At 213, natural language generation (NLG) is performed. In various embodiments, a NLG module performs NLG processing to generate a voice response based on the AI solution solved at 209. In some embodiments, the NLG module performs reconstruction, fixes grammatical errors, and corrects person discrepancies detected in the AI solution to create a more accurate natural language response before converting the solved solution to a voice response. In some embodiments, the step of 213 is performed as part of 109 of FIG. 1.

In some embodiments, the natural language generation (NLG) processing includes parsing string of triples and making a graph of the solution solved at 209. A parsed tree is created using the graph to determine the ordering of the sentence and the subject, predicate, and object(s) of the sentence. In some embodiments, the data is coreferenced. For example, names may be replaced with personal pronouns. In some embodiments, the NLG module utilizes the entire (i.e. whole) sentence without omission of words or changes in grammatical structure to generate a natural language response.

Figure 3:
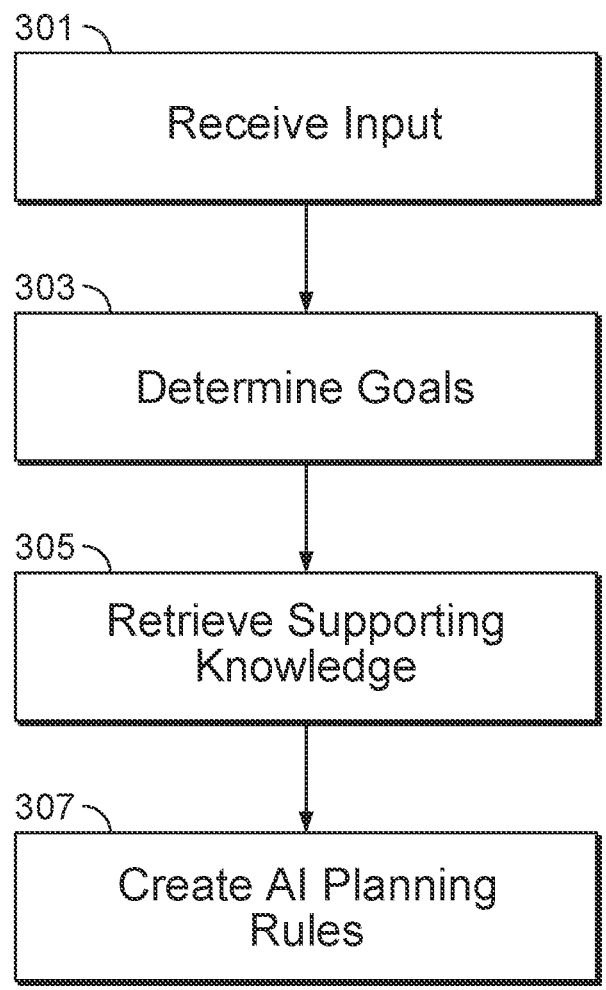
FIG. 3 is a flow diagram illustrating an embodiment of a process for performing reasoning by an adaptive, interactive, and cognitive reasoner.

FIG. 3 is a flow diagram illustrating an embodiment of a process for performing reasoning by an adaptive, interactive, and cognitive reasoner. In various embodiments, the process of FIG. 3 identifies and retrieves supporting knowledge and goals and creates artificial intelligence (AI) planning rules based on the determined information. In some embodiments, AI planning rules are utilized to create an AI planning problem. In some embodiments, the process of FIG. 3 is performed at 105 of FIG. 1 and/or 205 of FIG. 2.

At 301, input is received. For example, a reasoner module receives input such as the input sentence. In some embodiments, an input sentence and a talk mode is received. Examples of talk mode include a query mode and a quiz mode. In some embodiments, a query mode is used for retrieving information from a robotic system. In some embodiments, a query talk mode is also referred to as a conversation and/or normal talk mode. In some embodiments, a quiz mode is used for testing the user on a particular subject, such as a language, using the robotic system. For example, in quiz mode, the robotic system may quiz the user on a subject matter that the user is learning. In some embodiments, the input is received by a reasoner module and the reasoner module invokes one or more sub-functions to retrieve information that is appended to the processed input. In some embodiments, a data structure such as an IntentInformation object is used to encapsulate the retrieved information.

At 303, one or more goals are determined. In some embodiments, each goal represents a goal of the speaker and the reasoner module will attempt to achieve one or more of the determined goals. For example, a basic and common goal may be to make the speaker happy. In some embodiments, a goal predicate is determined based on the one or more goals. In various embodiments, the determined goal is based on the needs of the speaker and determined using the input sentence and goal hierarchy. For example, a goal hierarchy may be represented as a goal hierarchy tree where nodes in the tree correspond to the speaker's needs. The goals may be ranked. For example, each goal within the sub-tree may be assigned a score based on how urgent the goal needs to be satisfied. Using the goal rankings, one or more goals may be selected and the selected goals may be prioritized.

At 305, supporting knowledge is retrieved. In various embodiments, the supporting knowledge retrieved is based on the talk mode of the input received at 301. For example, a query and/or conversation talk mode retrieves supporting knowledge based at least on previous conversations. In various embodiments, the retrieved supporting knowledge is provided to a subsequent module, such as a planner module for artificial intelligence (AI) planning to generate a response appropriate for the received input. In various embodiments, the retrieved supporting knowledge is ranked. For example, the ranking is used to prioritize the knowledge.

In some embodiments, the supporting knowledge retrieved is based on a quiz talk mode. For example, in a quiz talk mode, supporting knowledge is retrieved based on the quiz subject. In some embodiments, the supporting knowledge retrieved is information for administering an IQ quiz session. In some embodiments, the retrieved information is based on the current IQ quiz state.

At 307, artificial intelligence (AI) planning rules are created. For example, based on the supporting knowledge retrieved at 305, planning rules are created that may be utilized for AI planning problem creation. In some embodiments, the created rules are based on the priority assigned to each set of data of the retrieved supporting knowledge. For example, in some embodiments, each set of data retrieved is assigned a rank. The supporting knowledge is then prioritized using AI planning rules. In some embodiments, the rules created are used to map retrieved supporting data to an event, such as a user's voice query. In some embodiments, the rules are based on the characteristics of the event. In various embodiments, the resulting rules are provided to an AI planning problem generator step such as step 207 of FIG. 2.

Figure 4:
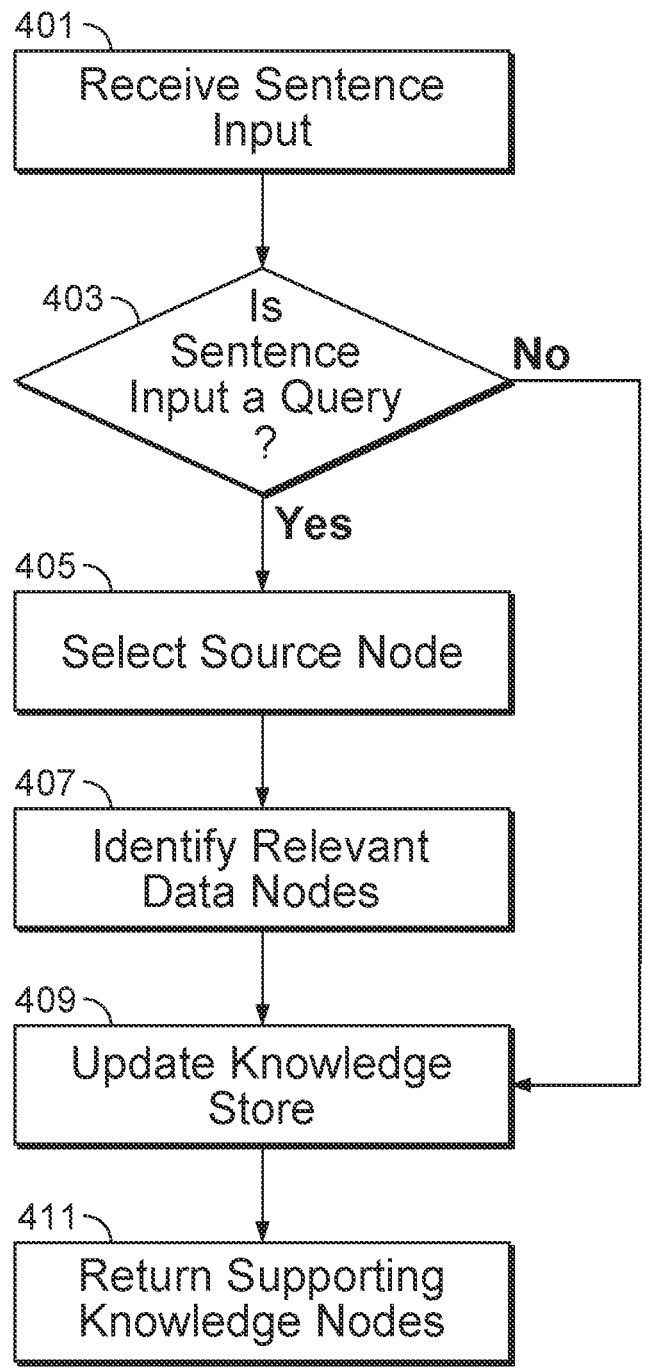
FIG. 4 is a flow diagram illustrating an embodiment of a process for identifying supporting knowledge.

FIG. 4 is a flow diagram illustrating an embodiment of a process for identifying supporting knowledge. In various embodiments, the process of FIG. 4 is performed by an adaptive, interactive, and cognitive reasoner to identify supporting knowledge from a memory graph data structure. For example, an adaptive, interactive, and cognitive reasoner performs the process of FIG. 4 using a knowledge store to help generate a voice response to a voice input event. In some embodiments, the process of FIG. 4 is performed at 305 of FIG. 3.

At 401, a sentence input is received. In some embodiments, the sentence input is a sentenced processed using a natural language understanding module. In various embodiments, the received sentence input includes component information such as identified parts of speech, lemmas (e.g., subject, predicate, and/or object lemma), coreference relationships, and performative classification, among others.

At 403, a determination is made whether the sentence input is a query. For example, the input sentence received at 401 is evaluated to determine whether the input is a query such as a question to the autonomous robotic system. In some embodiments, the determination utilizes the performative classification of the input sentence. For example, a sentence input includes a performative classification that identifies the sentence as a type of query performative (e.g., query-if, query-ref, etc.) or as an inform performative. In some embodiments, the performative classification utilizes the Foundation for Intelligent Physical Agents-Agent Communication Language (FIPA-ACL) for performative classification. In response to a sentence input that is a query, processing continues to 405. In response to a sentence that is not a query, such as an informative sentence, processing continues to 409.

At 405, a source node is selected from a knowledge store. In various embodiments, a source node is selected from a knowledge store such as a memory graph data structure based on the identified speaker. For example, a speaker related to the sentence input is identified and the source node corresponding to the speaker is selected. In various embodiments, a knowledge store is partitioned by speakers such that knowledge data can be accessed by speaker identity. For example, for an autonomous robotic system that has interacted with two different users, Alice and Bob, at 405, the source node for Alice is selected in response to a query initiated by Alice and the source node for Bob is selected in response to a query initiated by Bob. In various embodiments, a source node is selected since an autonomous robotic system partitions stored knowledge data by user and/or agent. For example, the knowledge data associated with each user includes user information related to that user's conversation history with the autonomous robotic system. In some embodiments, agents include the autonomous robotic system itself and may include other robotic agents acting autonomously.

In various embodiments, the knowledge store stores a history of conversations that the system has engaged in. In some embodiments, the knowledge store includes information captured by sensors such as location, time, weather, etc. In some embodiments, a declarative memory holds the system's knowledge about the world and itself. In various embodiments, the knowledge store is implemented using a memory graph data structure.

At 407, relevant data nodes are identified. For example, data nodes of a knowledge store, such as a memory graph data structure, are identified and made candidates for retrieval. In various embodiments, the nodes are either (1) filtered and removed because they are not relevant or (2) selected as relevant to the sentence input. In some embodiments, the selected data nodes are ranked to determine a priority.

In some embodiments, the identification of the data nodes includes several filtering and data retention steps. In some embodiments, the nodes of a memory graph data structure are traversed to identify relevant data nodes. Relevant nodes are retained and irrelevant nodes are filtered from consideration. In various embodiments, the identified nodes are collected and utilized as supporting knowledge.

In various embodiments, the knowledge store is implemented using a memory graph data structure. In some embodiments, each user's sentences are saved in the memory graph under a user identifier. In some embodiments, a root node exists for each user identifier. For example, Alice's sentences are saved under a node tree identified by Alice's user identifier and Bob's sentences are saved under a separate node tree identified by Bob's user identifier. In some embodiments, nodes corresponding to word components of sentences may reference one another. For example, two sentences containing the word "Charles" may reference the same word node. In various embodiments, sentences are saved using a triple format. For example, a triple format may identity a subject, object, and predicate.

In some embodiments, data stating negative facts are removed as candidates for supporting knowledge. For example, a recorded sentence "I am not Tom" is removed as a candidate and is not supporting knowledge. As another example, "He is not hungry" is removed as a candidate and is not supporting knowledge because it states a negative fact. In some embodiments, negatives are preserved for later use. For example, in some embodiments, the negative fact is converted into a positive fact. The positive fact is then utilized as a candidate for matching.

In some embodiments, certain special cases are identified and the associated knowledge node is retained as a candidate for supporting knowledge. In some embodiments, these nodes contain data that cannot be initially dismissed as not supporting knowledge and that is not an immediate match (e.g., a subject-verb-object and/or part of speech match). By preemptively retaining these nodes, their relationship to the sentence input can be determined after additional filtering is performed. For example, in some embodiments, informative statements and/or fact statements are preemptively retained.

In some embodiments, data that is negated by a negative fact is removed from consideration as relevant knowledge data. For example, a user makes the statement "My hobby is programming" followed by the statement "My hobby is not programming." The later negative fact statement negates the first statement and the first statement is removed. In various embodiments, in response to a more recent statement that negates an initial statement, the initial statement is removed as possible relevant knowledge.

In some embodiments, subject-verb-object (SVO) matching is performed to identify relevant supporting knowledge nodes. For example, subjects, verbs, and objects of sentences that match the sentence input are identified and retained as candidate supporting knowledge nodes. Conversely, subjects, verbs, and objects of sentences that do not match the sentence input are discarded from consideration as supporting knowledge nodes. For example, the input sentence "I like fruit" contains the SVO triple "I, like, fruit" and an exemplary sentence "I like skiing" stored in a node of an exemplary knowledge store contains the SVO triple "I, like, skiing." In the example, the subjects and verbs match since both use the subject "I" and the verb "like." However, the candidate node is discarded as supporting knowledge because the objects do not match (i.e., "fruit" and "skiing" are different objects). In various embodiments, Subject-predicate-object (SPO) matching is performed on the lemmas of the words. In some embodiments, parts of speech (POS) matching is utilized. For example, the same parts of speech are analyzed to determine whether a match exists.

In some embodiments, after two sentences are compared, for example, using subject-verb-object (SVO) matching, any non-matching pairs are analyzed for co-reference relationships. Co-reference analysis is performed on the non-matching pair(s) to determine whether they have a particular semantic relationship. For example, in the event that the subjects of two sentences do not initially match, the subject components are candidates for co-reference analysis. In various embodiments, a lexical database, including a remote database, is used to determine whether a co-reference relationship exists. For example, in some scenarios, a synonym relationship exists between two words. As another example, the sentence input word is a hypernym of a word referenced by a knowledge node. In some embodiments, the lexical database is WordNet.

In some embodiments, the sentence input is analyzed and matches are made using synonym relationships. For example, using a lexical database such as WordNet, words that are synonyms, such as "right" and "correct," are matched. As another example, the words "nice" and "good" are matched. By identifying synonyms, synonyms are matched using the techniques described herein such as subject-verb-object (SVO) and parts of speech (POS) matching to select candidate relevant knowledge nodes.

In various embodiments, the sentence input is analyzed and matches are made using a hypernym relation. For example, using a lexical database such as WordNet, a word with a broader meaning (e.g., fruit) is related to one or more words that are more specific (e.g., apples, oranges, and pineapples, etc.). In some embodiments, a hypernym is a word that is a generic term that is used to designate a whole class of specific instances. In various embodiments, hypernyms are identified based on a lexical database and used to identify relevant supporting knowledge nodes. For example, a node with the object "fruit" matches a stored knowledge node with the object "apples" (as long as the subject and verb parts also match) because the input sentence object "fruit" is a hypernym of "apples." As another example, the word "animal" is a hypernym of the word "mammal" and may be used to identify matches for a particular subject or object.

In some embodiments, hypernyms are utilized to derive hypernym relationships. In some embodiments, a derived hypernym relationship is identified by determining whether a word has the same or equivalent meaning of the hypernym of a word. For example, an analysis for a derived hypernym determines that the hypernym of the word "red" has the same meaning as the word "color." Nodes using the word "red" are candidates for matching "color." In an example scenario, a knowledge store includes a node corresponding to the sentence "My hair is red." The sentence input "What color is your hair?" returns supporting knowledge that the correct answer for the color is "red." The analysis for a derived hypernym determines that the hypernym of the word "red" has the same meaning as the word "color."

In some embodiments, the lexical database utilized is the WordNet or similar database. For example, synonyms relationships may be based on synset relationships defined using WordNet. In some embodiments, a synonym matches only if the synonym is within a configured synset range. Words outside the synset range are not considered matches. For example, a synonym relationship is determined in the event a word is within a configured synset range (e.g., a range of 5). Words outside the range are considered obscure forms and are not match material for determining supporting knowledge. In various embodiments, synonyms match only if the parts of speech match as well. In various embodiments, an additional check may be made to require that a fact adjective is derivationally contained in the query noun.

In various embodiments, relevant knowledge nodes can be constructed from information retrieved from a remote lexical database. For example, the answers to questions based on what, where, who, and is queries utilize information from a lexical database such as WordNet. In various embodiments, a query modifier (e.g., what, where, who, and is) is identified and a query structure is compared to determine the query type. For example, in some embodiments, a question initiated with a "What" query modifier is checked to determine that it is composed of "what," "is," and an object (e.g., "What is a lion?"). The definition from a lexical database is retrieved and used as supporting knowledge. In some embodiments, a question initiated with a "Where" query modifier is checked to determine that it is composed of "where," "is," and an object (e.g., "Where is Seoul?"). The part holonym (e.g., South Korea) of the object is determined from a lexical database and used as supporting knowledge. In some embodiments, a question initiated with a "Who" query modifier is checked to determine that it is composed of "who," "is," and an object (e.g., "Who is Obama?"). The definition of the object is determined from a lexical database and analyzed to determine if the definition is about a person. In the event the response is about a person, the definition is used as supporting knowledge. In some embodiments, a question initiated with an "Is" query modifier is checked to determine that it is composed of "is," a subject, and an object (e.g., "Is a lion an animal?"). A lexical database is used to determine whether the object is a hypernym of the subject and the result is used as supporting knowledge.

In some embodiments, the candidate relevant supporting knowledge nodes are prioritized based on a rank. For example, a first sentence contains the words "I like red" and a second sentence contains the words "I like blue." Both sentences are relevant to the query sentence "What is my favorite color?" and their respective knowledge nodes are relevant supporting knowledge. In various embodiments, the relevant nodes are ranked. In some embodiments, the nodes are ranked based on date. For example, in one configuration, earlier nodes are ranked lower than later nodes. In another configuration, earlier nodes are ranked higher than later nodes. As an example, by configuring later nodes to have higher priority, a response to the query sentence "What is my favorite color?" prioritizes the knowledge node with the color blue since that node has a higher priority due to its more recent date. In various embodiments, only the most recent data node (i.e. the most fresh) is retained as a candidate relevant knowledge. In various embodiments, the priority assigned to the nodes may be configurable and/or trained based on expected results.

In various embodiments, additional filtering and/or selecting technique may be implemented to improve the accuracy and/or performance of retrieving supporting knowledge nodes. In some embodiments, one or more of the above techniques may be implemented together in the sequence described or in another appropriate sequence.

At 409, the knowledge store is updated. In various embodiments, the knowledge store is updated based on the retrieved relevant data. For example, one or more additional nodes are added and/or linked based on the input sentence. In some embodiments, the input sentence is inserted into the knowledge store. For example, nodes corresponding to the input sentence are inserted into a memory graph. In various embodiments, related nodes are associated and/or shared. For example, a node corresponding to a person's name from an input sentence is linked to a node associated with a second sentence that utilizes a pronoun (e.g., "I") in place of the same person's name.

At 411, supporting knowledge nodes are returned as output. In various embodiments, the supporting knowledge nodes are references to nodes in a memory graph and include relevance ranking information. In some embodiments, a reference to the nodes of a memory graph is returned. For example, a reference to the data nodes corresponding to supporting knowledge are returned and no copies of the nodes are made. In some embodiments, the relevant knowledge nodes are selected by a unique identifier of the data node. In various embodiments, data nodes of a knowledge store, such as a memory graph, are accessible using the unique identifiers. For example, an artificial intelligence planner can access the relevant knowledge nodes using the set of unique identifiers for the relevant nodes. In some embodiments, a relevant sentence is identified using a node number of the node containing the relevant sentence.

Figure 5A:
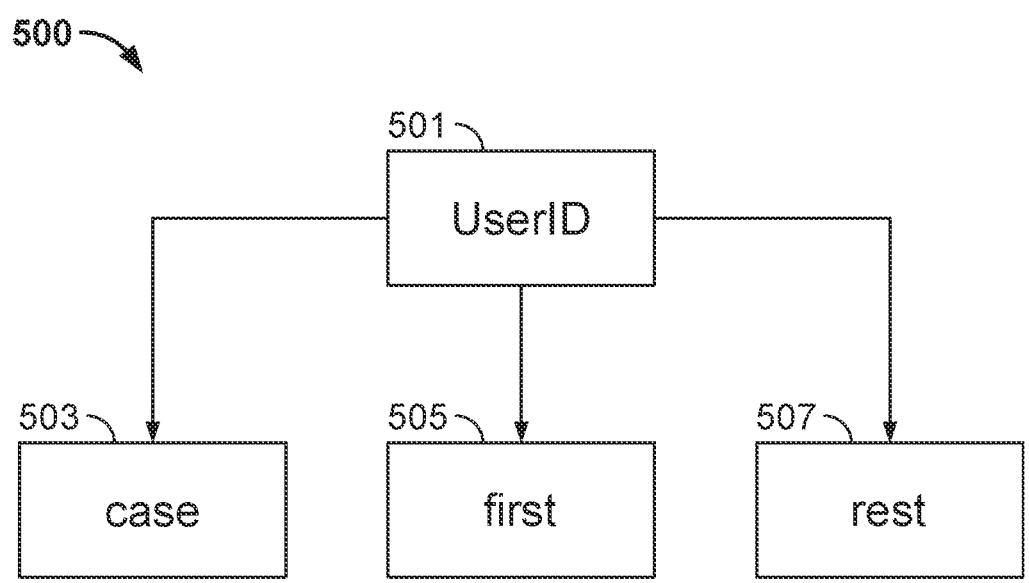
FIG. 5A is a diagram illustrating an example of a memory graph data structure.

FIG. 5A is a diagram illustrating an example of a memory graph data structure. In the example shown, memory graph data structure 500 is an empty memory graph. For example, memory graph data structure 500 represents an initialized memory graph of an autonomous robotic system. In some embodiments, a memory graph data structure includes UserID node 501, case node 503, first node 505, and rest node 507. In various embodiments, UserID node 501 is the root node for a particular user. In some embodiments, UserID node 501 includes a unique user identifier for the referenced user and supporting knowledge associated with the user is stored under UserID node 501. In the example shown, case node 503 is a node associated with cases for previously saved problems and their respective solutions along with additional context. In the example show, there are no solved cases saved in memory graph data structure 500. First node 505 and rest node 507 are nodes for storing new input sentences when they are received. In some embodiments, data associated with first node 505 corresponds to a single input sentence.

In some embodiments, a rest node such as rest node 507 is used to reference additional nodes. For example, a first sentence is recorded under a free first node such as first node 505 and subsequent sentences are recorded under its corresponding rest node such as rest node 507. In various embodiments when no free first node is available, a new sentence is inserted into a memory graph data structure by creating a new first node and a new rest node under an empty rest node. The new sentence is then inserted using the newly created first node. Subsequent new sentences utilize a similar process using the newly created rest node.

In some embodiments, a different root node for each user that interfaces with the autonomous robotic system exists in the memory graph structure. In some embodiments, the autonomous robotic system has its own root node for storing supporting knowledge including output responses by the system. In various embodiments, the root nodes are identified using a unique user identifier. In some embodiments, the sub-trees of each root node can share and/or reference the same nodes. For example, different sub-trees can reference the same supporting knowledge node.

Figure 5B:
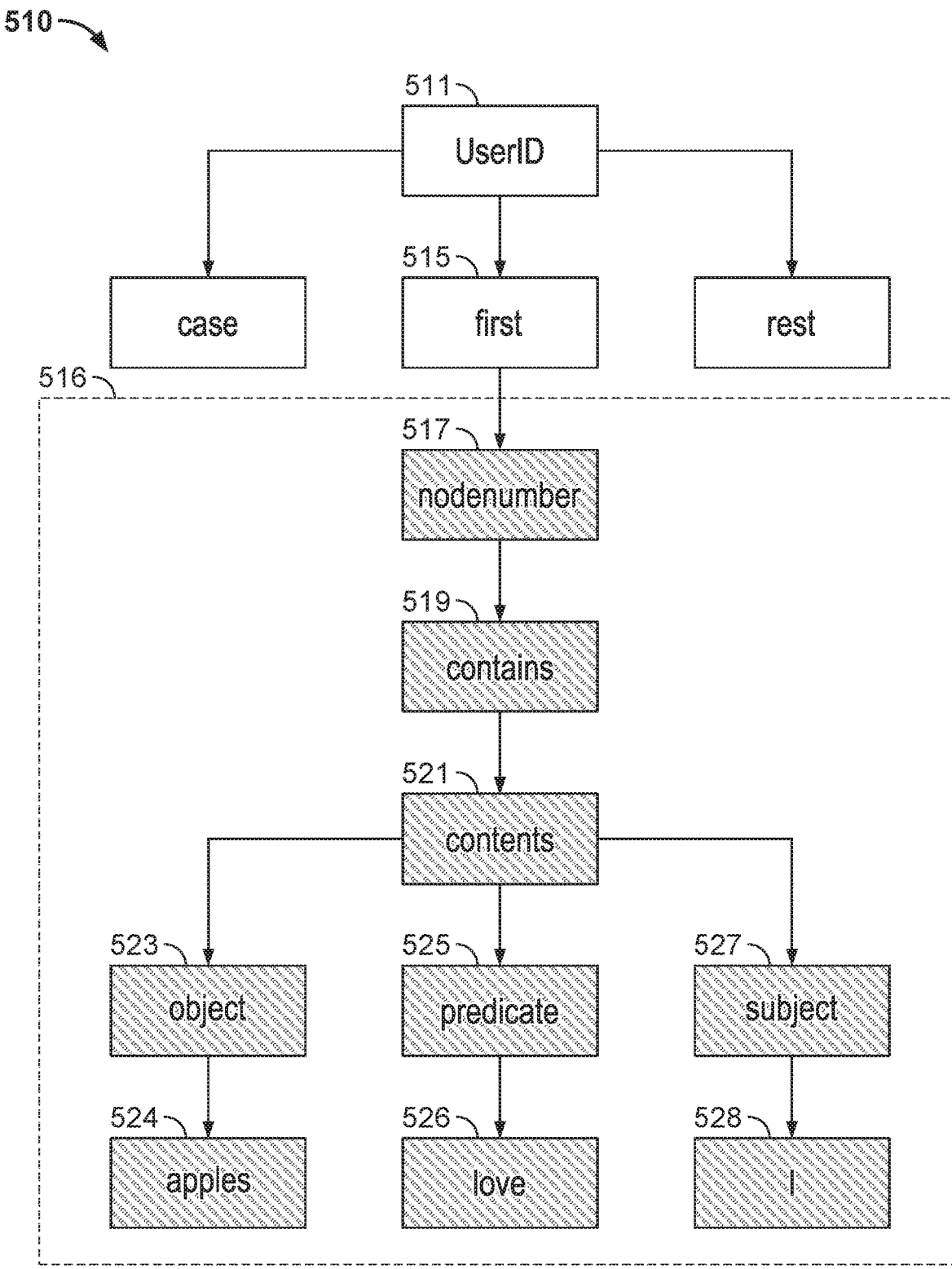
FIG. 5B is a diagram illustrating an example of a memory graph data structure.

FIG. 5B is a diagram illustrating an example of a memory graph data structure. In the example shown, memory graph data structure 510 is memory graph data structure 500 of FIG. 5A after the sentence "I love apples" is spoken by a user and processed by a reasoner. In the example, the input sentence is an informative sentence and not a query. Memory graph data structure 510 includes at least the nodes UserID node 511, first node 515, node-number node 517, contains node 519, contents nodes 521, object node 523, "apples" node 524, predicate node 525, "love" node 526, subject node 527, and "I" node 528. The sentence "I love apples" is converted to a triple using the processes described herein and represented by input sentence tree 516. Input sentence tree 516 includes the nodes shown within the dotted boundary lines. Input sentence tree 516 includes the nodes node-number node 517, contains node 519, contents nodes 521, object node 523, "apples" node 524, predicate node 525, "love" node 526, subject node 527, and "I" node 528. In some embodiments, UserID node 511 is UserID Node 501 of FIG. 5A.

In various embodiments, a new input sentence tree is inserted into a memory graph data structure at a first node. In the example shown, input sentence tree 516 is inserted into memory graph data structure 510 using first node 515. In various embodiments, a new sentence tree is inserted into a memory graph data structure at the first available first node. In some embodiments, a first node is nested under a rest node. In some embodiments, a first node is created under a free rest node.

In the example shown, node-number node 517 includes a node number that uniquely identifies the input sentence represented by input sentence tree 516. Contains node 519 is a container node that encapsulates the contents associated with input sentence tree 516. Contents node 521 is a contents nodes that may be used to reference the contents associated with the sentence. For example, a reference (such as a pointer) to contents node 521 may be used to retrieve the contents of the sentence. Under contents node 521, subject, object, and predicate nodes point to classified components of the input sentence. Contents node 521 references object node 523, predicate node 525, and subject node 527. Object node 523 references the object of the sentence, the word "apples," by referencing "apples" node 524. Predicate node 525 references the predicate of the sentence, the word "love," by referencing "love" node 526. Subject node 527 references the subject of the sentence, the word "I," by referencing "I" node 528. In various embodiments, each sentence tree inserted into a memory graph data structure utilize a structure similar to the one described above with respect to input sentence tree 516.

Figure 5C:
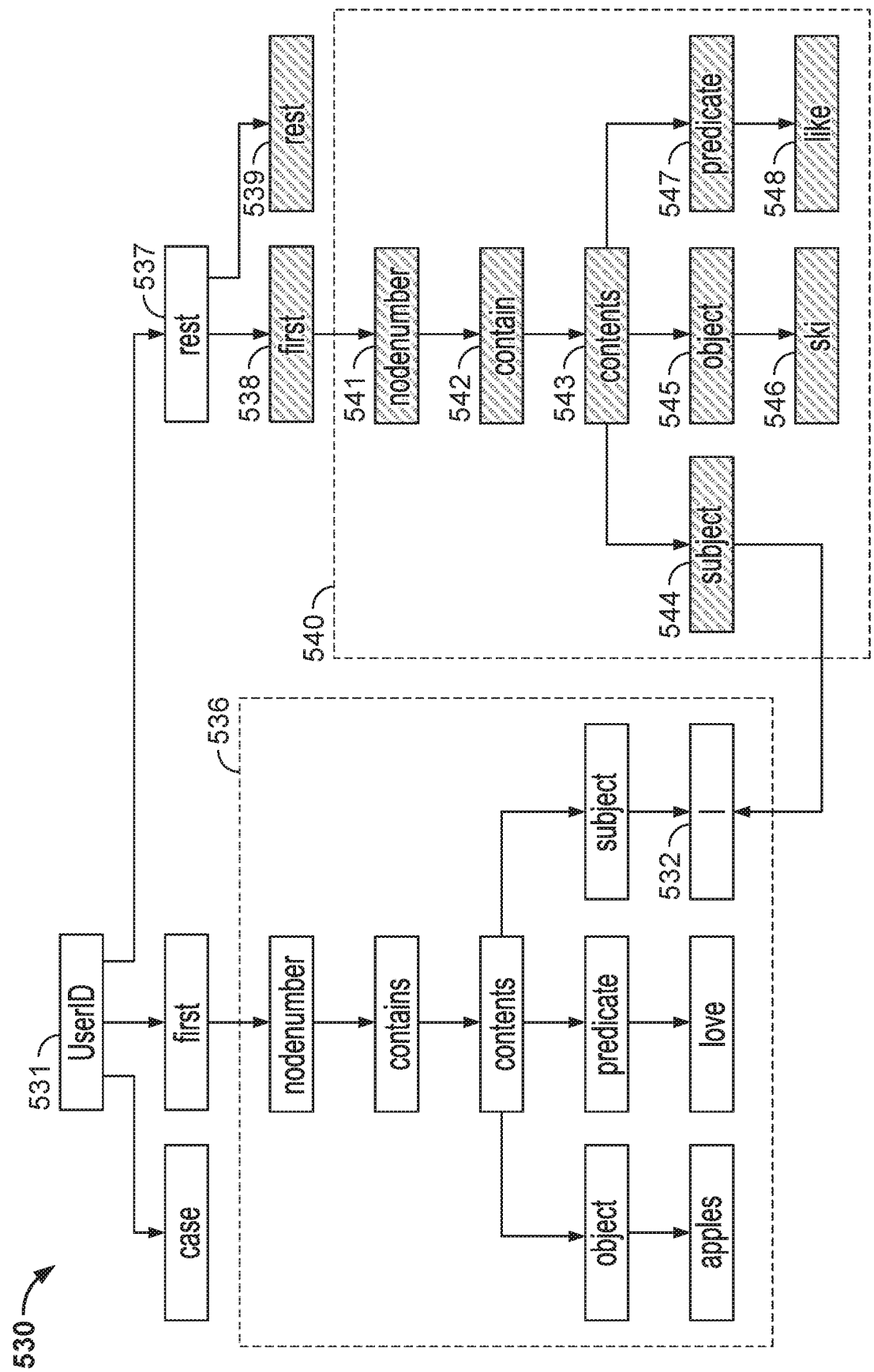
FIG. 5C is a diagram illustrating an example of a memory graph data structure.

FIG. 5C is a diagram illustrating an example of a memory graph data structure. In the example shown, memory graph data structure 530 is memory graph data structure 510 of FIG. 5B after the sentence "I like skiing" is spoken by the user and processed by a reasoner. In the example, the input sentence is an informative sentence and not a query. Memory graph data structure 530 includes previously inserted input sentence tree 536 corresponding to the sentence "I love apples" and newly inserted input sentence tree 540 corresponding to the sentence "I like skiing." Input sentence tree 540 is identified by a unique node number that is associated with node-number node 541. First node 538 and rest node 539 are new nodes appended to rest node 537 as a location for inserting additional sentences. Input sentence tree 540 is inserted at first node 538 and a future input sentence can be inserted at rest node 539. In various embodiments, at each rest node a new first node and rest node are added for saving new input sentences.

In the example shown, inserted sentence tree 540 includes node-number node 541, contains node 542, contents nodes 543, subject node 544, "I" node 532, object node 545, "ski" node 546, predicate node 547, and "like" node 548. The sentence "I like skiing" is converted to a triple using the processes described herein and represented by input sentence tree 540. Subject node 544 references the subject of the sentence, the word "I," by referencing "I" node 532. Object node 545 references the object of the sentence, the word "skiing," by referencing "ski" node 546. In various embodiments, the lemma of a word is used. For example, "ski" node 546 contains the lemma of the word "skiing." Predicate node 547 references the predicate of the sentence, the word "like," by referencing "like" node 548.

In the example shown, input sentence trees 536 and 540 both contain a reference to "I" node 532. Input sentence tree 536 includes the nodes shown within its dotted boundary lines. Input sentence tree 540 includes the nodes shown within its dotted boundary lines and in addition includes "I" node 532. In some embodiments, the "I" from input sentence tree 536 (for the sentence "I love apples") and the "I" from input sentence tree 540 (for the sentence "I like skiing") are matches and a reference to the same node is used instead of duplicating nodes. In some embodiments, this matching is performed by a reasoning module.

In some embodiments, UserID node 531 is 501 of FIG. 5A and 511 of FIG. 5B. In some embodiments, first input sentence tree 536 is input sentence tree 516 of FIG. 5B. In some embodiments, "I" node 532 is "I" node 528 of FIG. 5B.

Figure 5D:
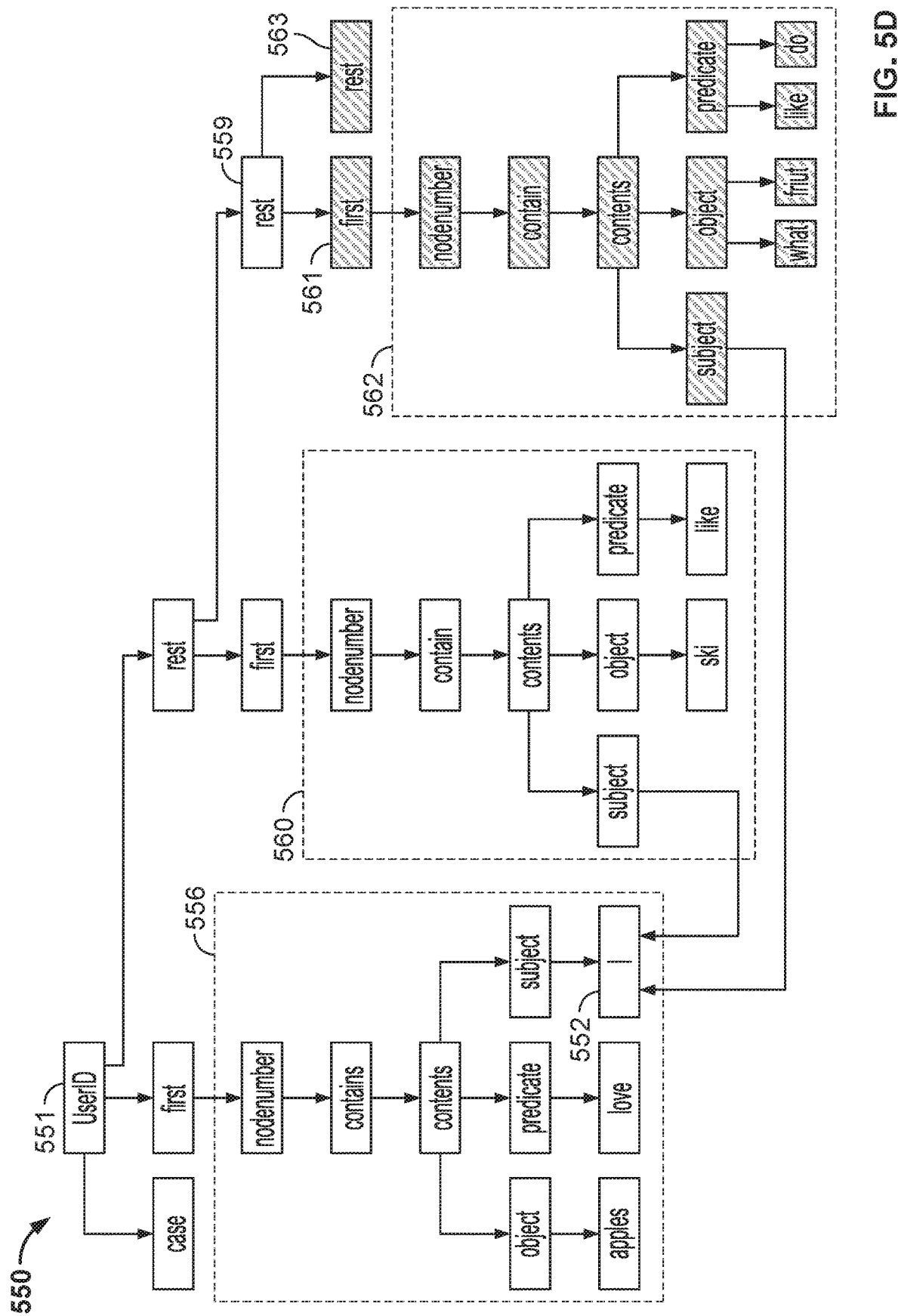
FIG. 5D is a diagram illustrating an example of a memory graph data structure.

FIG. 5D is a diagram illustrating an example of a memory graph data structure. In the example shown, memory graph data structure 550 is memory graph data structure 530 of FIG. 5C after the sentence "What fruit do I like?" is asked as a query by the user and processed by a reasoner. In some embodiments, the input sentence is associated with a query-ref performative. Memory graph data structure 550 includes previously inserted input sentence tree 556 corresponding to the sentence "I love apples," previously inserted input sentence tree 560 corresponding to the sentence "I like skiing," and newly inserted input sentence tree 562 corresponding to the query sentence "What fruit do I like?." First node 561 and rest node 563 are new nodes added to rest node 559 as a location for saving additional sentences. Input sentence tree 562 is inserted at first node 561 and a future input sentence can be inserted under newly created rest node 563. In various embodiments, at each rest node a new first node and rest node are added for saving new input sentences.

Using the processes described herein, the query sentence "What fruit do I like?" is converted to a triple and represented by the input sentence tree 562. Input sentence trees 556, 560, and 562 each include the nodes shown within their respective dotted boundary lines and in addition each includes "I" node 552. In some embodiments, UserID node 551 is 501 of FIG. 5A, 511 of FIG. 5B, and 531 of FIG. 5C. In some embodiments, input sentence tree 556 is input sentence tree 516 of FIG. 5B and 536 of FIG. 5C. In some embodiments, input sentence tree 560 is input sentence tree 540 of FIG. 5C. In some embodiments, "I" node 552 is "I" node 528 of FIG. 5B and 532 of FIG. 5C.

Figure 5E:
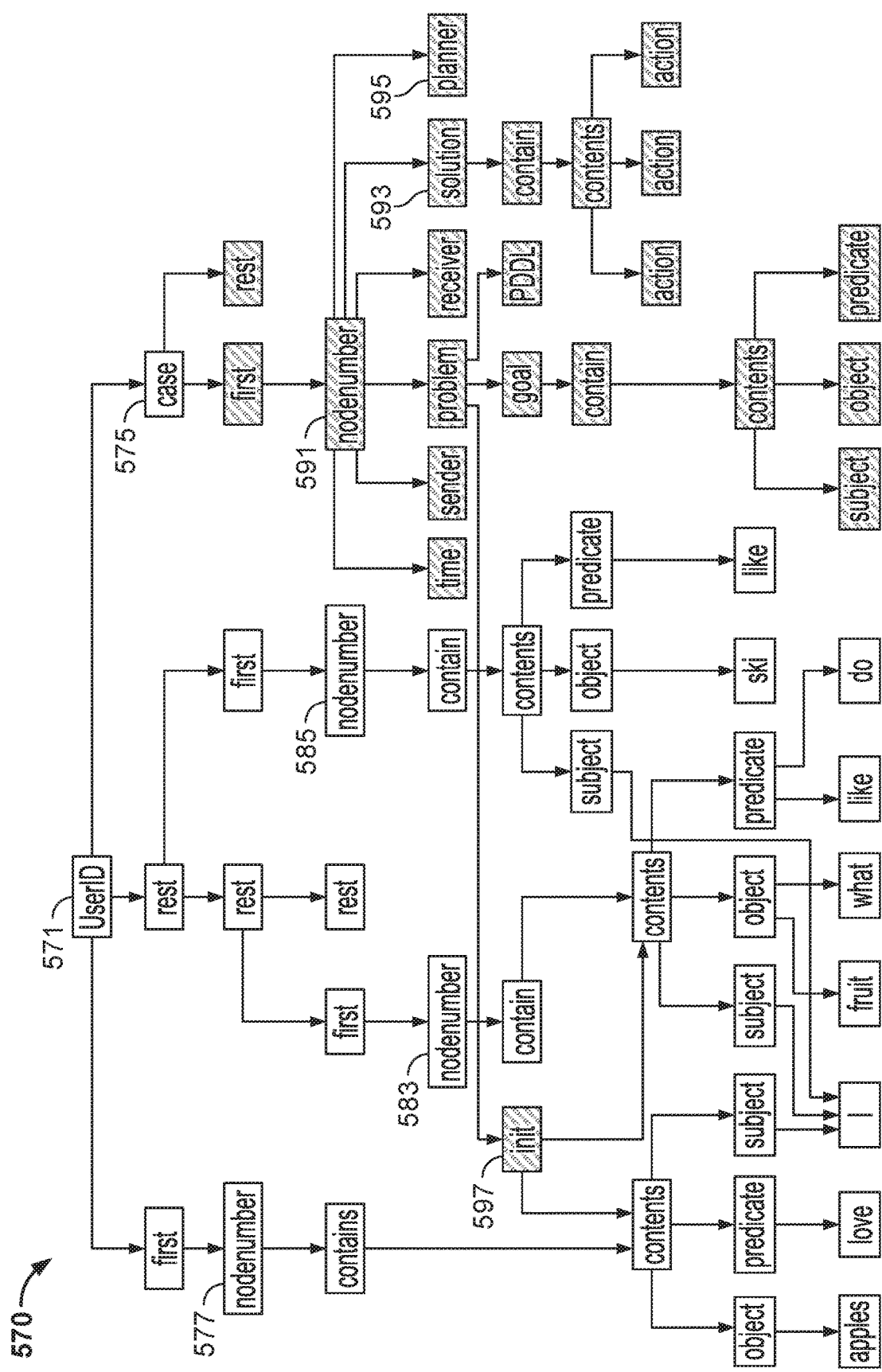
FIG. 5E is a diagram illustrating an example of a memory graph data structure.

FIG. 5E is a diagram illustrating an example of a memory graph data structure. In the example shown, memory graph data structure 570 is memory graph data structure 550 of FIG. 5D after the solution to the query sentence "What fruit do I like?" is solved and stored as a case in memory graph data structure 570. Memory graph data structure 570 includes a previously inserted input sentence tree corresponding to the sentence "I love apples" with root node-number node 577, a previously inserted input sentence tree corresponding to the sentence "I like skiing" with root node-number node 583, a previously inserted query input sentence tree corresponding to the query sentence "What fruit do I like?" with root node-number node 585, and case node 591 that corresponds to the solution of the query input sentence.

In various embodiments, user problems that are solved are saved in a memory graph data structure as cases. In various embodiments, the cases are reused when similar and/or identical problems are encountered. In the example, node-number node 591 is inserted into memory graph data structure 570 at case node 575. Node-number node 591 references a particular case that corresponds to a problem, solution, and context. In various embodiments, cases are inserted using a node-number node under the case node of the relevant user. Node-number node 591 includes multiple nodes. The nodes include at least solution node 593, planner node 595, and init node 597, among others. In some embodiments, solution node 593 is a solution sub-tree that includes a sequence of actions for solving the artificial intelligence (AI) planning problem associated with the case. In some embodiments, planner node 595 is associated with the planner used to solve the AI planning problem. In the example shown, init node 597 is linked to a parent node (not numbered) labeled as "problem" that represents the AI planning problem. Init node 597 contains links to supporting knowledge nodes that include the contents corresponding to the sentences "I love apples" and "What fruit do I like?" Init node 597 does not contain a link to the sentence "I like skiing" because it is not relevant to the problem. The lemma object "ski" and "fruit" do not match and are not determined to be related.

In some embodiments, a case includes at least the problem and the sequence of actions that was used to solve the problem. In some embodiments, the case includes time, sender, problem, receiver, solution, and planner information. In some embodiments, the problem includes a goal expressed using a subject, object, and predicate. In some embodiments, the problem includes supporting knowledge nodes. In some embodiments, the problem is described using an artificial intelligence (AI) planning language. In some embodiments, the solution includes a sequence of actions to solve the AI planning problem. In some embodiments, a case based reasoning (CBR) module is utilized to identify the appropriate case saved in memory graph data structure 570. In some embodiments, the identification of the case is performed at 107 of FIG. 1.

In various embodiments, more or fewer nodes may be used to represent the described data structures of FIGS. 5A-E. For example, in some embodiments (not shown), a contents node may contain a field that stores an object reference that points to a node that stores the object instead of using an intermediary object node.

Figure 6:
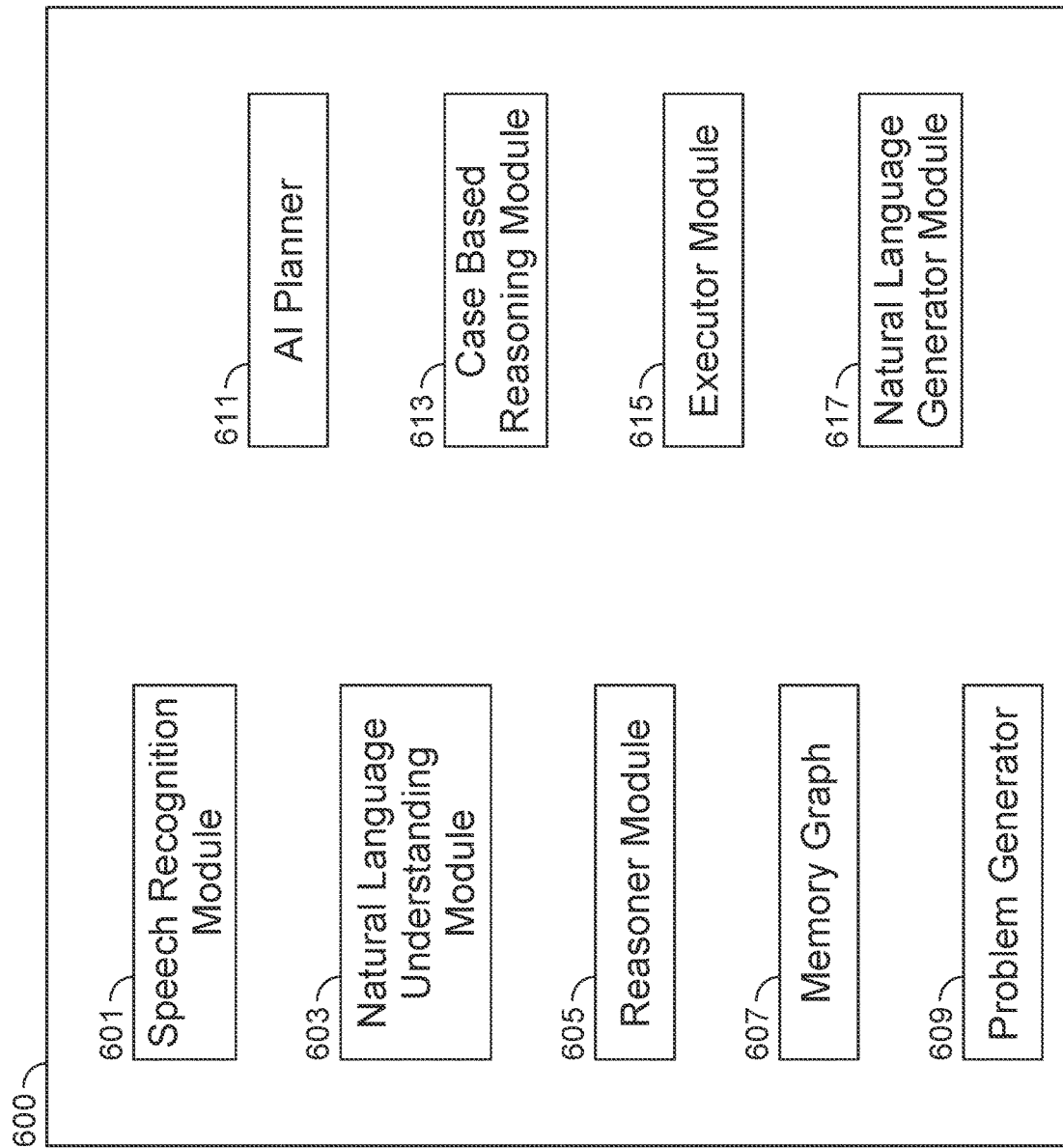
FIG. 6 is a functional block diagram illustrating an embodiment of an autonomous robotic system for responding to voice input using an adaptive, interactive, and cognitive reasoner.

FIG. 6 is a functional block diagram illustrating an embodiment of an autonomous robotic system for responding to voice input using an adaptive, interactive, and cognitive reasoner. In the example shown, autonomous robotic system 600 includes speech recognition (SR) module 601, natural language understanding (NLG) module 603, reasoner module 605, memory graph 607, problem generator 609, artificial intelligence (AI) planner 611, case based reasoning (CBR) module 613, executor module 615, and natural language generator (NLG) module 617. In various embodiments, the functional components shown may be used to implement the processes of FIGS. 1-4. Additional functionality, such as connectivity between functional components is not shown. In some embodiments, the functional components may be implemented using one or more programmed computer systems. For example, the processes of FIGS. 1-4 may be performed using one or more computer processors of one or more programming computer systems. In some embodiments, various modules and/or subsystems may be implemented on different programming computer systems. For example, modules and/or subsystems associated with reasoning module 605 and memory graph 607 may be implemented on a server and/or using a server-side implementation and speech recognition module 601 may be implemented on the local autonomous robotic system using a client-side implementation. In some embodiments, one or more subsystems and/or modules may exist on both the client and server side implementations.

In some embodiments, speech recognition (SR) module 601 is used at 101 and/or 103 of FIG. 1 and/or 201 of FIG. 2. In some embodiments, natural language understanding (NLU) module 603 is used at 103 of FIG. 1 and/or 203 of FIG. 2. In some embodiments, reasoner module 605 is used at 105 of FIG. 1 and/or 205 of FIG. 2. In some embodiments, reasoner module 605 is used to perform the processes of FIGS. 3 and 4. In some embodiments, memory graph 607 is utilized by the processes of FIGS. 1-4 including at 105 of FIG. 1; 205 of FIG. 2; 305 and/or 307 of FIG. 3; and/or 405, 407, 409 and/or 411 of FIG. 4. In some embodiments, FIGS. 5A-E are examples illustrating the contents of different states of memory graph 607. In some embodiments, problem generator 609 is used at 107 of FIG. 1 and/or 207 of FIG. 2. In some embodiments, artificial intelligence (AI) planner 611 and/or case based reasoning (CBR) module 613 are used at 107 of FIG. 1 and/or 209 of FIG. 2. In some embodiments, executor module 615 is used at 109 of FIG. 1 and/or 211 of FIG. 2. In some embodiments, natural language generator (NLG) module 617 is used at 109 of FIG. 1 and/or 213 of FIG. 2.

The functional block diagram of an autonomous robotic system shown in FIG. 6 is but an example of a system suitable for use with the various embodiments disclosed herein. Other autonomous robotic systems suitable for such use can include additional or fewer subsystems. For example, motion detection, vision input processing modules, inter-agent communication modules, etc. are not displayed in FIG. 6 but may be included in the disclosed autonomous robotic systems. As another example, motor control subsystems are not shown in FIG. 6 but may be utilized by the disclosed invention. Other systems having different functional configurations of subsystems can also be utilized.

Figure 7:
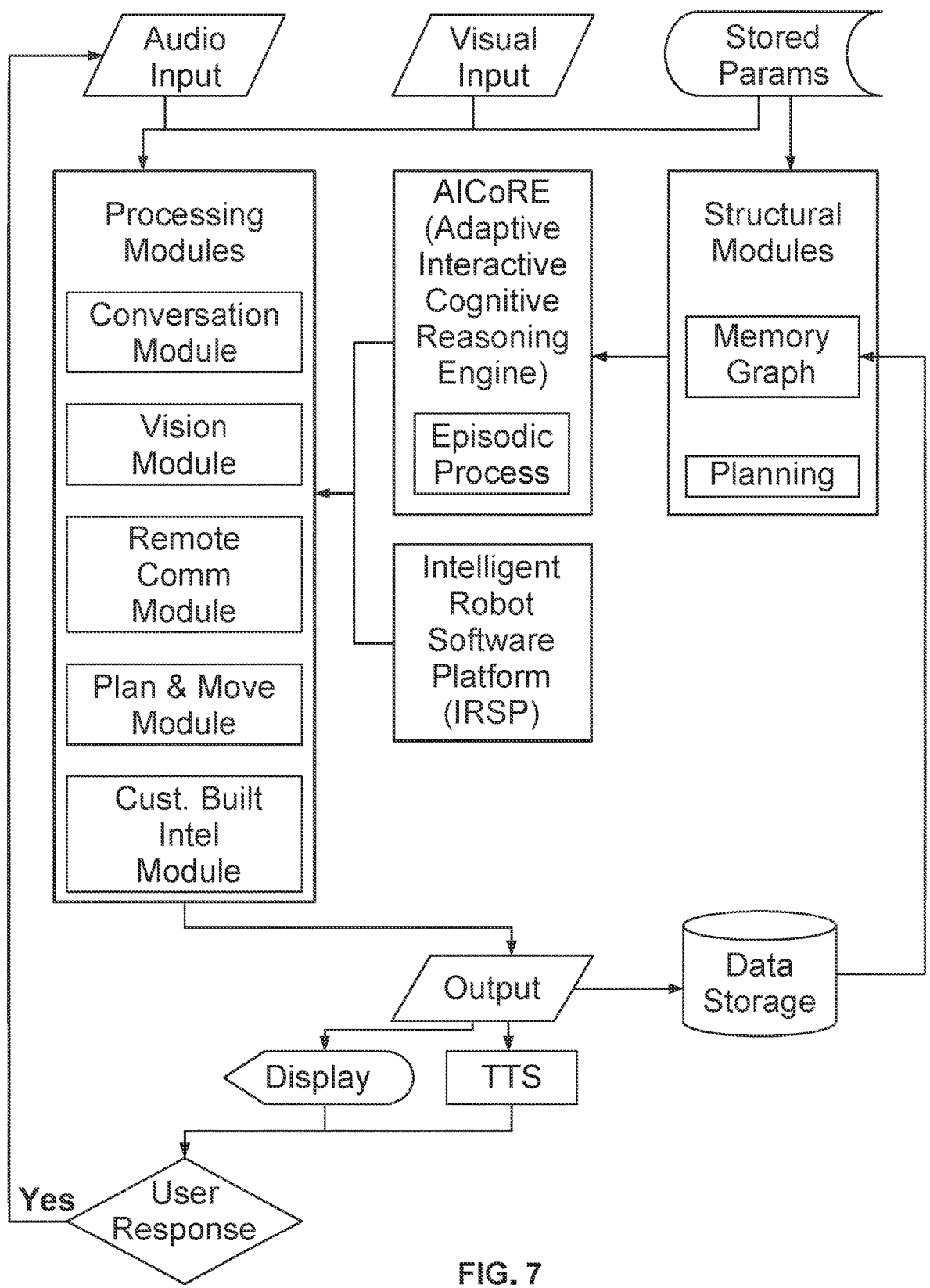
FIG. 7 is a block diagram of an embodiment of an artificial intelligence (AI) robotic system.

FIG. 7 is a block diagram of an embodiment of an artificial intelligence (AI) robotic system. FIG. 7 shows an embodiment of processing modules and components included in an artificial intelligence (AI) robotic system. In some embodiments, the AI robotic system of FIG. 7 performs the processes of FIGS. 1-4. In some embodiments, the components of FIG. 7, in particular the conversation module, the Adaptive Interactive Cognitive Reasoning Engine (AICoRE), and structural modules (memory graph and planning) correspond to functional components of FIG. 6.

Building and operating an intelligent smartphone robot based on domain-independent reactive planning with deep convolutional neural networks is disclosed. The artificial intelligence (AI) robot that talks, listens, thinks and reasons to plan and solve tasks. The system brings educational and entertaining experience to the users by creating an atmosphere that promotes learning, socializing, and playing to enhance imagination and creativity of users. In an embodiment, a plurality of Android applications are executed.

In some embodiments, the system allows users to innovate and add capabilities via custom built intelligence.

Modules of the system may include but are not limited to:
Conversation Module
Vision Module
Remote Communication Module
Plan & Move Module
Custom Built Intelligence Module
The benefits include:
Human-like intelligence (vision and conversation):
sees (processes visual data using computer vision technologies)
listens (processes audio data using speech recognition technology for human voice recognition and natural language understanding)
thinks (analyzes the given data in data structures based on artificial intelligence technologies)
responds (visualizes graphical objects on a mobile phone based on computer graphics, generates speech segments, and mechanically operates the artificially-manufactured physical arms and electric motors)
remembers (stores the relevant episodic data in a database) physical objects and user interactions, while imitating the sensory and cognitive processes of human beings.
provides an intelligent social companionship to the users through these artificially designed sensory and cognitive processes
Educational: Through visual and verbal programming, users can build new skills. Intelligent Robot Software Platform (hereinafter iRSP) allows users to be engaged in an advanced level of programming Fun: identify and follow certain physical objects like ball, and markers. The system can move around predefined paths using plan and move algorithms.

Remote communication: communicate with other mobile device such as a mobile phone, and the mobile device can be utilized to remotely control the system.

Additional benefits include:

Interaction steps with the users, in which the users can be helped to enhance their cognitive skills based on repetitive verbal training.

Follow ball, read marker capabilities
Customizable avatar
Conversational AI
Cognitive Vision
BLE
Collision avoidance system
Computer vision In some embodiments, an artificial intelligence (AI) robot is designed to provide intelligent way of enhancing IQ, an intelligent way of learning English, and a guide to easy robot programming. An exemplary embodiment may include a robot body in a form of a car and a mobile phone as the brain/engine that drives the robot. The communication between the robot body and the AI applications can be performed via a Bluetooth communication. AI Applications are available for Android and iOS systems, developed from highly sophisticated artificial intelligence techniques including natural language processing, machine learning, and computer vision.

AI Applications

The following exemplary artificial intelligence (AI) applications may be utilized to provide additional functionality.

Conversation module: This is an exemplary application that enables the user to communicate with the system in a natural way using the natural human language. This app uses a core technology, called the adaptive interactive cognitive reasoner (AICoRE). This core engine runs on the cloud and the client side of it connects through an API. In various embodiments, this module uses a speech recognition module that allows the user to communicate with the system in natural language.

Memory graph (MG): In some embodiments, a memory graph module is an additional technique to the AICoRE that enables a user to mark and retrieve past events and conversations. For example, conversations in English can be carried out with an intelligent companion using a MG module trained using the beginner level of the Cambridge English Text Book.

Vision apps module: This exemplary app uses a phone camera and processor to implement a number of vision tasks including face detection, face recognition, face tracking, marker/ball detection, and tracking. The view of a face, ball, or marker, while the system is processing functions in one of these vision modes, may be used to trigger an action or movement of the robotic body.

Custom built intelligence module: This exemplary module is also known as a build your own intelligence (BYOI) app. This exemplary app enables users to customize and control robotic actions in an easy way. Visual and verbal programming is also possible through BYOI app. In some embodiments, the BYOI uses an intelligent robot software platform (iRSP). The iRSP can be used to expand the components and functionality of the system.

Plan & Move module: This exemplary module enables the system to navigate a path that is sketched by the user that avoids collisions and obstacles. In some embodiments, this module includes a second mode of Go & Back that can move the robotic system to a destination and back to the origin with a snap taken at the destination.

Remote communication module: This exemplary a module can be used to control the robot body to navigate around.

Hardware and Firmware

In some embodiments, the system includes firmware. Future upgrades may come as updates whenever such are available. Both hardware and firmware are utilized in data communication between the robot body and the smart phone device. Notable components include one or more motors RPM/PWM, accessories (LED and ultrasonic sensor), and general mechanical parts assembly. The included motors allow movements for left, right, backward, and forward direction (e.g., precise movement performed by detecting the encoder data). The motors should operate with minimum noise.

Testing Operation Using Android App

In some embodiments, an app such as an Android app, can be used to independently test the operations of the system. The test is performed over various functions of components including an ultrasonic sensor, encoder board, motor, and LED. The exemplary testing steps for the app can be designed as follows:

1. Install the BluetoothTest apk file on the smart phone
2. Turn on the system
3. Execute "BluetoothTest" app on the smart phone
4. Follow the rest of the steps instructed in the app
5. If the connection is successful, a textview can be indicated as "Connected".
6. The last step is to control the system by touching the buttons to move and switch on/off the LED.
7. The status of the system can be seen on the top-right marked in red showing
   a. H: Headlight (LED) status whether it is ON or OFF
   b. B: Battery charge status in percentage
   c. D: Ultrasonic Sensor distance to the detected obstacle in cm.

AI Application Test Apps

In some embodiments, the system differentiates, recognizes, and remembers humans. The system processes a user's interaction in order to respond to the human's conversational dialog. One major goal of parents is to help children develop their intellectual capabilities whether they are at home or not. In some embodiments, the system may be utilized as an artificial intelligence companion for children to aid them in spending their time is the most fun and yet productive manner with respect to social and psychological aspects. An AI robot exhibits human-like cognitive intelligence such as understanding and reasoning, planning and problem solving, learning and remembering, and has the ability to take simple actions.

AI apps may be available from a publicly shared software repository, such as Google Play and Apple Store. In some embodiments, the system supports Android OS and iOS. In some embodiments, a Wi-Fi connection is necessary to perform some of its functions. In some embodiments, the system may communicate with the smart device via Bluetooth. Examples of AI apps may include:

AI 1. Dialog system—Talk to the system. It will understand and respond to you.

AI 2. Video analytics—Visually recognizes, differentiates, and remembers different people.

AI 3. Plan and move module—Navigate along the drafted path.

AI 4. Remote access module—Communicate with the system remotely

AI 5. Build your own intelligence module—Personalize and customize the system

Remote Communication Application

In some embodiments, the system is able to connect to a mobile device via a communication service such as the Bluetooth service. In some embodiments, the system can also connect to two mobile devices: one as a controller and the other can be docked on the robot body. The movements of the system can be tested after the connection. For example, the system can move forward, backward, right, and left. The speed can be adjusted by using the buttons on the controls.

Adaptive Interactive Cognitive Reasoning Engine (AICoRE)

In various embodiments, one source of the power of our practical AI agent comes from two central components: a reasoning engine called the AICoRE and a human-like memory called the memory graph (MG). In some embodiments, the adaptive interactive cognitive reasoner (AICoRE) is a cognitive reasoning engine that unifies problem solving and learning. In various embodiments, AICoRe fully automates the reasoning process from end to end. In some embodiments, the AICoRE is incremental holistic human-like reasoner, covering the full spectrum of reasoning from sensing, reasoning, discovering, planning, learning, remembering until responding and performing.

In some embodiments, a central part of the problem solving mechanism is the planner. In various embodiments, the planner is an advanced multi-agent cognitive planner capable of addressing real-world problems among multiple agents.

Unlike most classical planners, which deal with physical actions only, the disclosed cognitive multi-agent planner (CMAP) is capable of dealing with both physical and cognitive (speech) actions. In various embodiments, it may be implemented in a major planning languages called planning domain definition language (PDDL).

In some embodiments, the CMAP is highly practical dealing with real world problems while interacting with multiple agents and humans. In addition, various embodiments also integrate with an incremental case-based reasoner over time. The AICoRE receives and provides data using natural language format with user but changes data structure (triple or PDDL) when processing the data.

Figure 8:
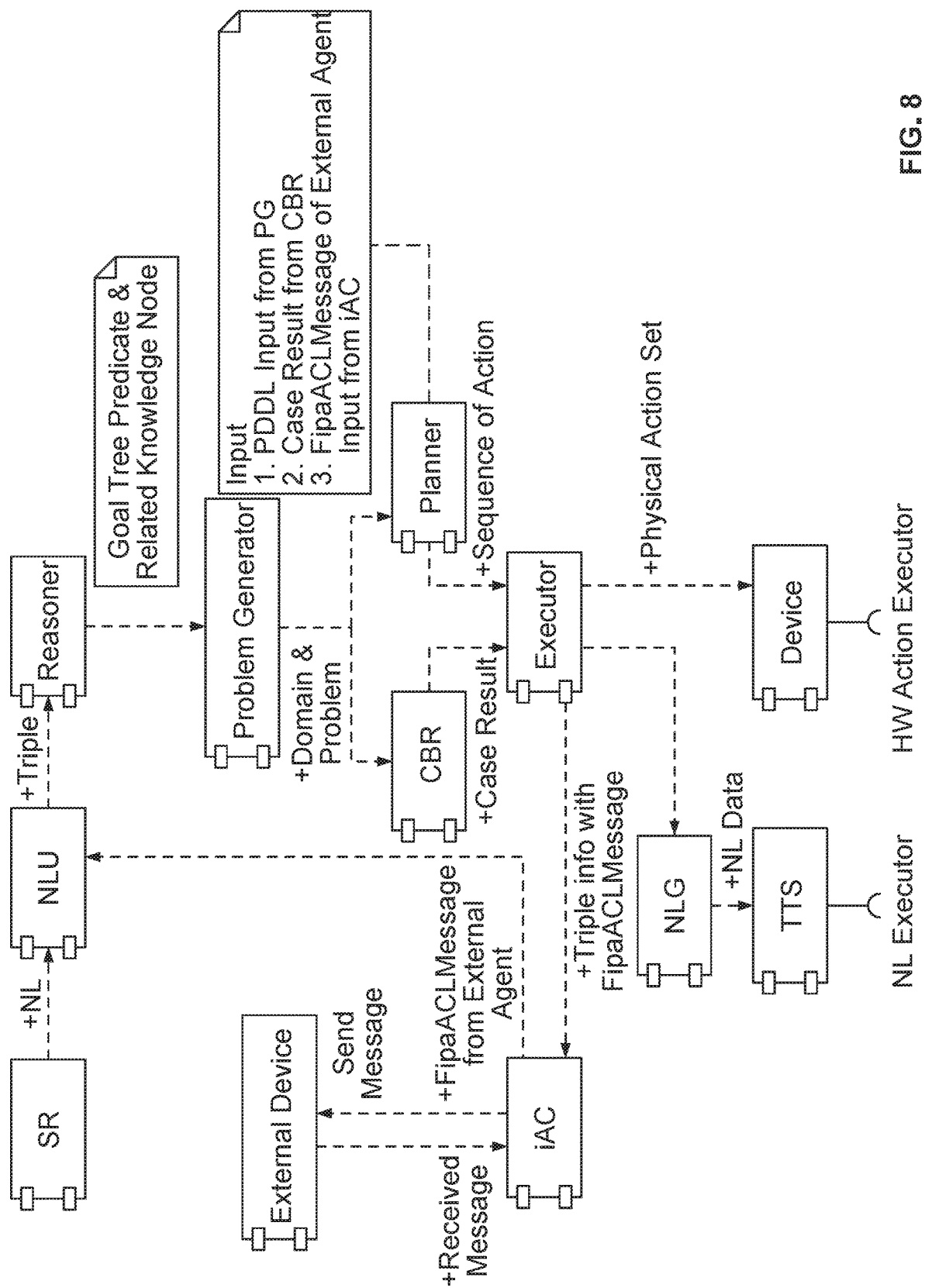
FIG. 8 is a block diagram illustrating an adaptive, interactive, and cognitive reasoner.

FIG. 8 is a block diagram illustrating an adaptive, interactive, and cognitive reasoner. FIG. 8 shows an example of the whole architecture of the AICoRE that includes speech recognition (SR) module or devices. In the example shown in FIG. 8, many modules constitute the AICoRE and are closely related on each other. In various embodiments, the modules and/or devices of FIG. 8 perform the processes of FIGS. 1-4. In some embodiments, one or more modules of FIG. 8 are functional components of FIG. 6.

(1) Natural Language Understating (NLU)

Natural language understating (NLU) is about language processing by computers, and is related to the field of human-computer interaction. NLU enables computers to derive meaning from human or natural language input.

In some embodiments, our natural language understanding module attempts to find triples from a sentence. First, the system uses a natural language processing tool to parse a sentence. Using a parsed sentence, the module extracts triples. The system uses labeled-link, so that it is easier to find an appropriate modifier from an element. The system also uses reification to further annotate about the sentence.

Figure 9:
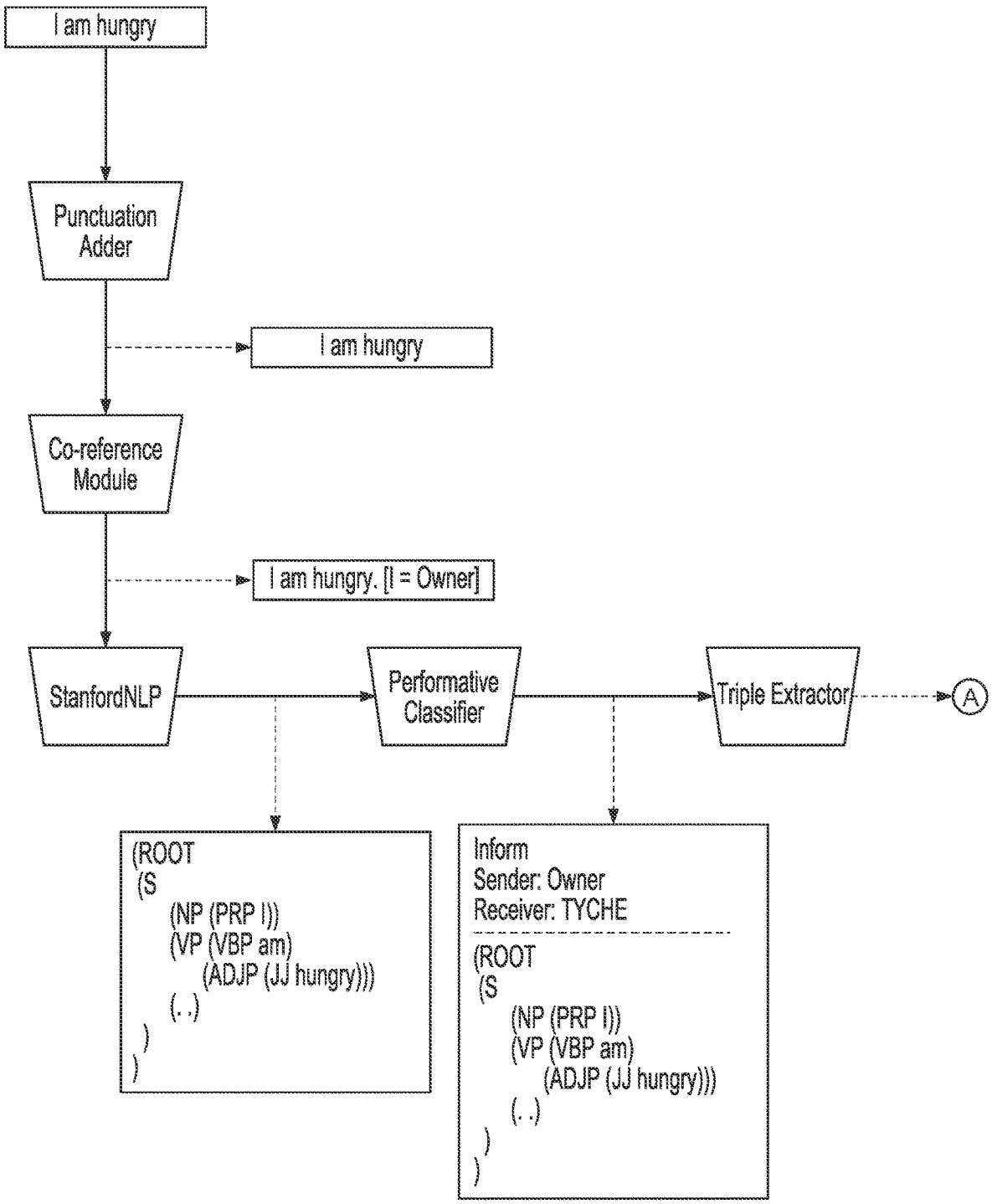
FIG. 9 is a diagram illustrating an embodiment of a process for natural language understanding (NLU).
Figure 9:
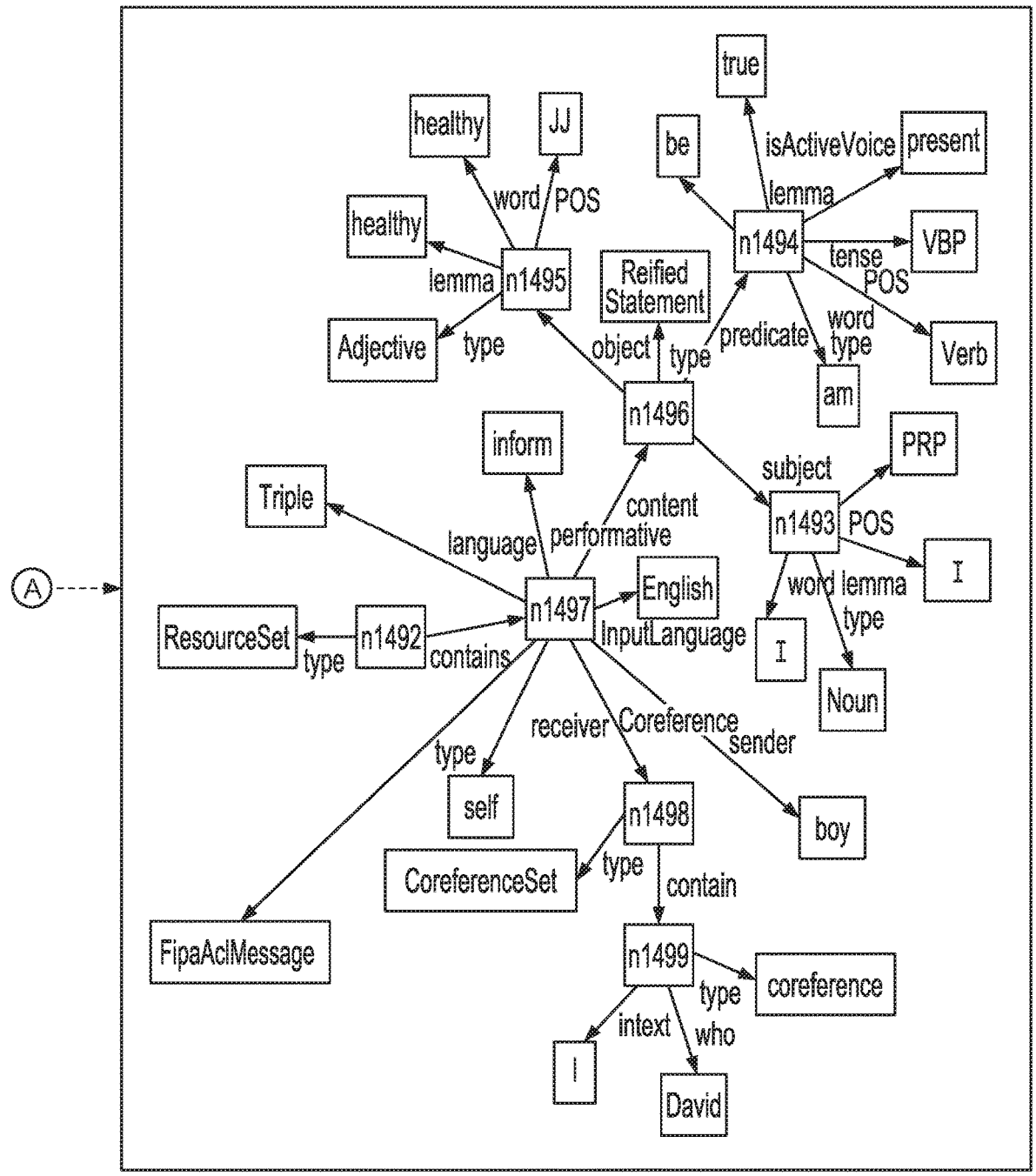

FIG. 9 is a diagram illustrating an embodiment of a process for natural language understanding (NLU). FIG. 9 shows exemplary architecture and processes of natural language understanding (NLU) including input and output of each part. In some embodiments, the process of FIG. 9 is performed at 103 of FIG. 1 and/or 203 of FIG. 2. In some embodiments, natural language understanding module 603 of FIG. 6 performs the process of FIG. 9.

In some embodiment, the first step of the NLU process is to add a missing punctuation. This may be done by analyzing the first few words of the sentence and their POS tags. This first step can improve the result of the syntactic parser. The second step is co-referencing. Co-referencing finds referents of certain words. The next step is to make a parse tree using a natural language processing tool. If there is a wrong parse tree made by the natural language processing tool, the NLU corrects it with a set of pre-defined rules. The next step is to classify the performative of the sentence. The NLU represents the sentence with additional information in a format that is similar to a FIPA ACL message, that is a language for agent communications, and the performative defines a type of the sentence, and it is used to determine what action to take by the planner. The last step is to extract triples using the parse tree. The parse tree itself is consisted of triples, but the triple extractor extracts one reified triple from a sentence and adds more triples to it including the parse tree itself.

The NLU module is different from other parsers, because it adds more information than any other parsers do. Usually parsers are divided into two categories: one is dependency-based parser and the other is constituency-based parser. The NLU module parses based on constituency first, and then adds more information like what is a subject, verb, and object, which is similar to a dependency parser. The NLU module not only finds grammatical structure of the sentence, but also analyzes which performative and language the sentence is. Performative denotes the type of the communicative act, and the system uses performatives defined in FIPA-ACL.

In various embodiments, the coreference module in NLU can handle conversational data that is a list of speakers and sentences. All sentences in conversation can have different speakers and receivers. Thus, the coreference module checks not only objects in sentences, but also relationships between the speakers and the objects. The coreference module can extract direct co-reference information by using its database.

(2) Reasoner

Figure 10:
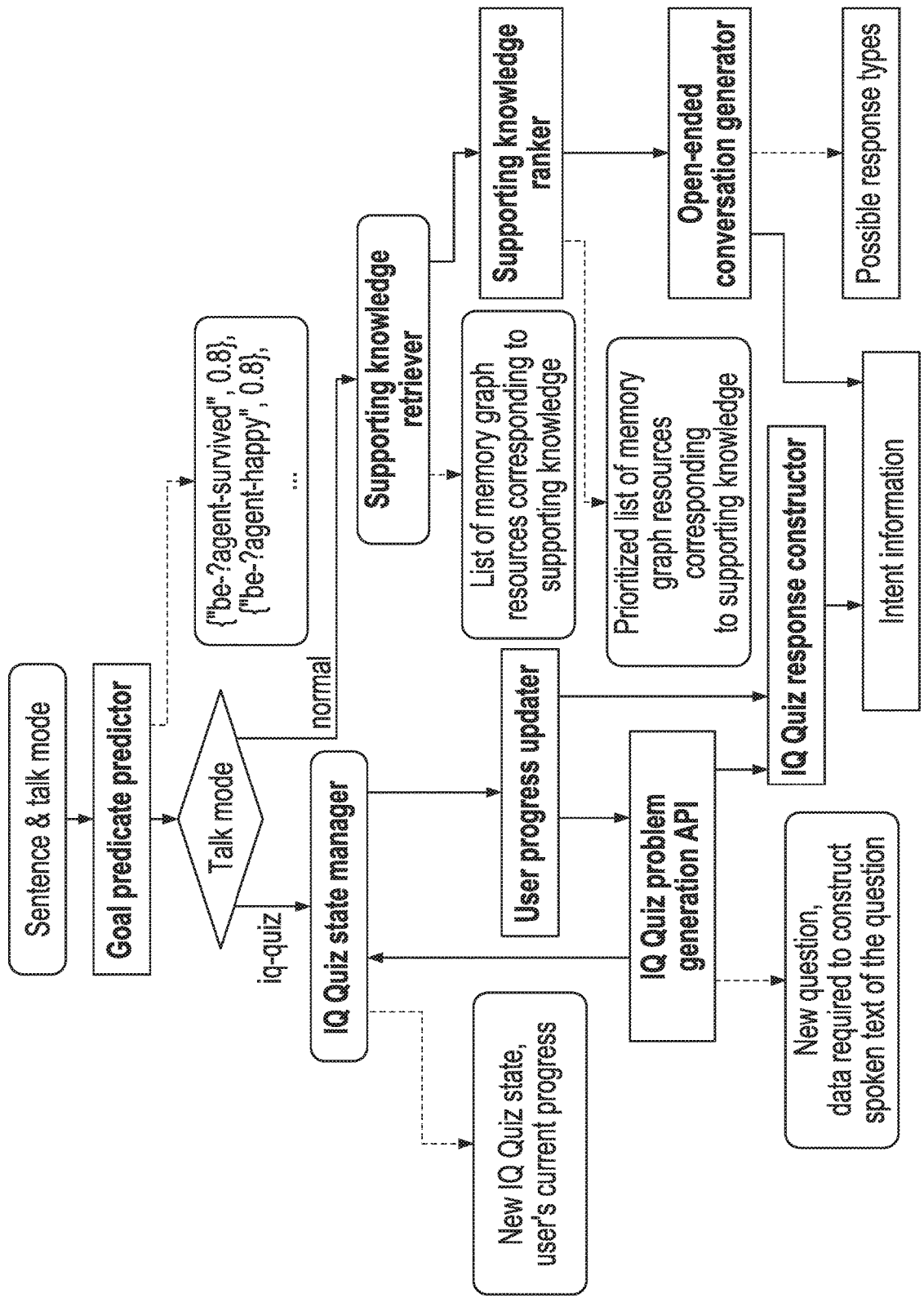
FIG. 10 is a flow diagram illustrating an embodiment of a process for performing reasoning.

FIG. 10 is a flow diagram illustrating an embodiment of a process for performing reasoning. FIG. 10 shows the overall exemplary processes of the reasoner module. Given an input sentence and talk mode, the reasoner module invokes several sub-functions in order to append various information to an 'IntentInformation' class object as its output. In some embodiments, the process of FIG. 10 is performed at 105 of FIG. 1 and/or 205 of FIG. 2. In some embodiments, the process of FIG. 10 describes in further detail the processes of FIGS. 3 and 4. In some embodiments, component of FIG. 6, including reasoner module 605 and memory graph 607, are used to perform the process of FIG. 10.

The first information the reasoner module outputs is goal predicate information, representing which 'goals' of the speaker the module will aim to satisfy. With the basic goal of 'making the speaker happy', the module predicts the needs of the speaker based on the input sentence and outputs a sub-tree of the goal hierarchy that corresponds to the needs. Each goal within the sub-tree is also assigned a score based on how urgent the goal needs to be satisfied.

From here, the reasoner module operates differently depending on the given talk mode, [normal] and [iq-quiz]. The [normal] and [iq-quiz] are predefined in AICoRE as static variable. The talk mode [normal] corresponds to general conversation, while [iq-quiz] stands for the speaker having an IQ quiz session.

If the given talk mode is [normal], the reasoner module will retrieve information that will help the next module (the planner) generate a response fit for general conversation. First, it calls the supporting knowledge retriever sub-function in order to gather a list of memory graph resources corresponding to knowledge (previously uttered speech) that are related to the given input. The reasoner module then ranks these resources in order of importance. Finally, the module calls the open-ended conversation generator sub-module in order to get possible response types (greetings, ask-where, etc.) that will serve as templates for generating more natural responses.

If the given talk mode is [iq-quiz], the reasoner module will retrieve information fit for administering an IQ quiz session. First, the IQ quiz state manager sub-function determines what the speaker's input means depending on the current IQ quiz state. Depending on the output state, the reasoner module can also update the current speaker's IQ quiz progress and generate a new problem for the speaker.

Figure 11:
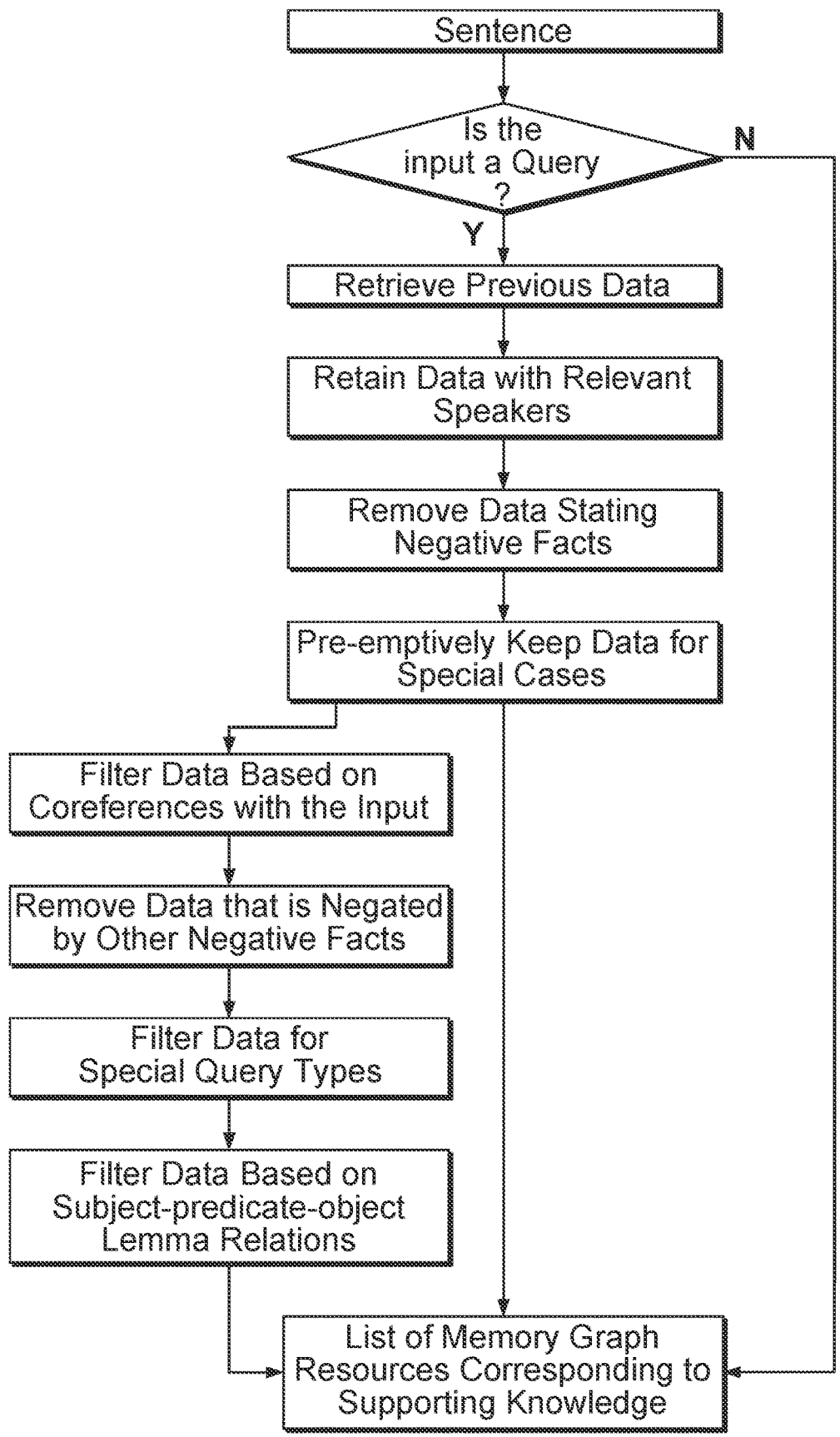
FIG. 11 is a flow diagram illustrating an embodiment of a process for identifying supporting knowledge.

FIG. 11 is a flow diagram illustrating an embodiment of a process for identifying supporting knowledge. FIG. 11 shows the process of the supporting knowledge retriever sub-function of the reasoner module. The sub-function first checks the input's performative in order to determine whether it is a query. If the input is a query, the sub-function determines which previous data (previously spoken data sentences) are related to the given input. This is accomplished via a series of filters that filter the whole set of previous data based on various criteria. In some embodiments, the process of FIG. 11 is performed at 105 of FIG. 1, 205 of FIG. 2, 305 of FIG. 3, and FIG. 4. In some embodiments, components of FIG. 6, including reasoner module 605 and memory graph 607, implement the process of FIG. 11.

(3) Problem Generator and Planner

Planning is a key ability for intelligent systems, increasing their autonomy and flexibility through the construction of sequences of actions to achieve their goals. Planning technique has been applied in a variety of tasks including robotics, process planning, web-based information gathering, autonomous agents and spacecraft mission control.

In various embodiments, the planner of the AICoRE support functions of an artificial intelligence planning language such as Planning Domain Definition Language (PDDL) specification 3.1 and multi-agent PDDL. The 'PDDL domain and problem' are necessary to solve the 'problem'. The AICoRE uses predefined 'PDDL domain', and there are many actions in the 'PDDL domain'. Each action is defined based on FIPA-ACL performative such as inform, query-ref, query-if, and request. In various embodiments, the performative denotes the type of the communicative act. The planner also decides a sequence of actions through comparing communicative act with performative, structure, meaning and intent of recent sentence or data.

In FIG. 8, the problem generator receives data from reasoner, changes the data from triple to PDDL, and generates 'PDDL problem in PDDL format so that the planner solves the problem. Originally, the problem has to include current status and a goal, so that there are user's recent sentence and data related to recent one in 'init' part of 'PDDL problem' to represent the current state.

The AICoRE has the 'GoalTree' that also predefines human's goals from upper step to lower in derived actions of domain to generate goal part in problem. Problem generator can select a goal for the solution in 'GoalTree' and uses the goal when it generates 'PDDL problem.' In addition, the 'PDDL domain and problem' are used by the Case Based Reasoning (CBR) to find same solution.

(4) Case Based Reasoning (CBR)

The CBR is the process of solving new problems based on the solutions of similar past problems. It is not only a powerful method for computer reasoning, but also models a behavior in human problem solving. Much of reasoning is based on past cases personally experienced. In some embodiments, the CBR module checks every conversation and saves all reasoning and action information.

In some embodiments, when a user generates a previously unknown conversation, the CBR module makes a case using a 'PDDL problem' generated by a reasoner and an action plan created by a planner. If the user generates a conversation that is similar to a previous conversation, the CBR module searches for this conversation in the case database. If the CBR module finds a similar case, then the CBR module makes an output by action plan of case. The AICoRE can reduce the response time and processing time by using this CBR module. When the CBR module gets a new problem, the CBR module checks the reasoning information with the new problem compared to saved cases. If there is a matching case, then the CBR module uses its action plans. By reusing solved cases, the CBR module reduces AICoRE's duplication of existing plans.

Figure 12:
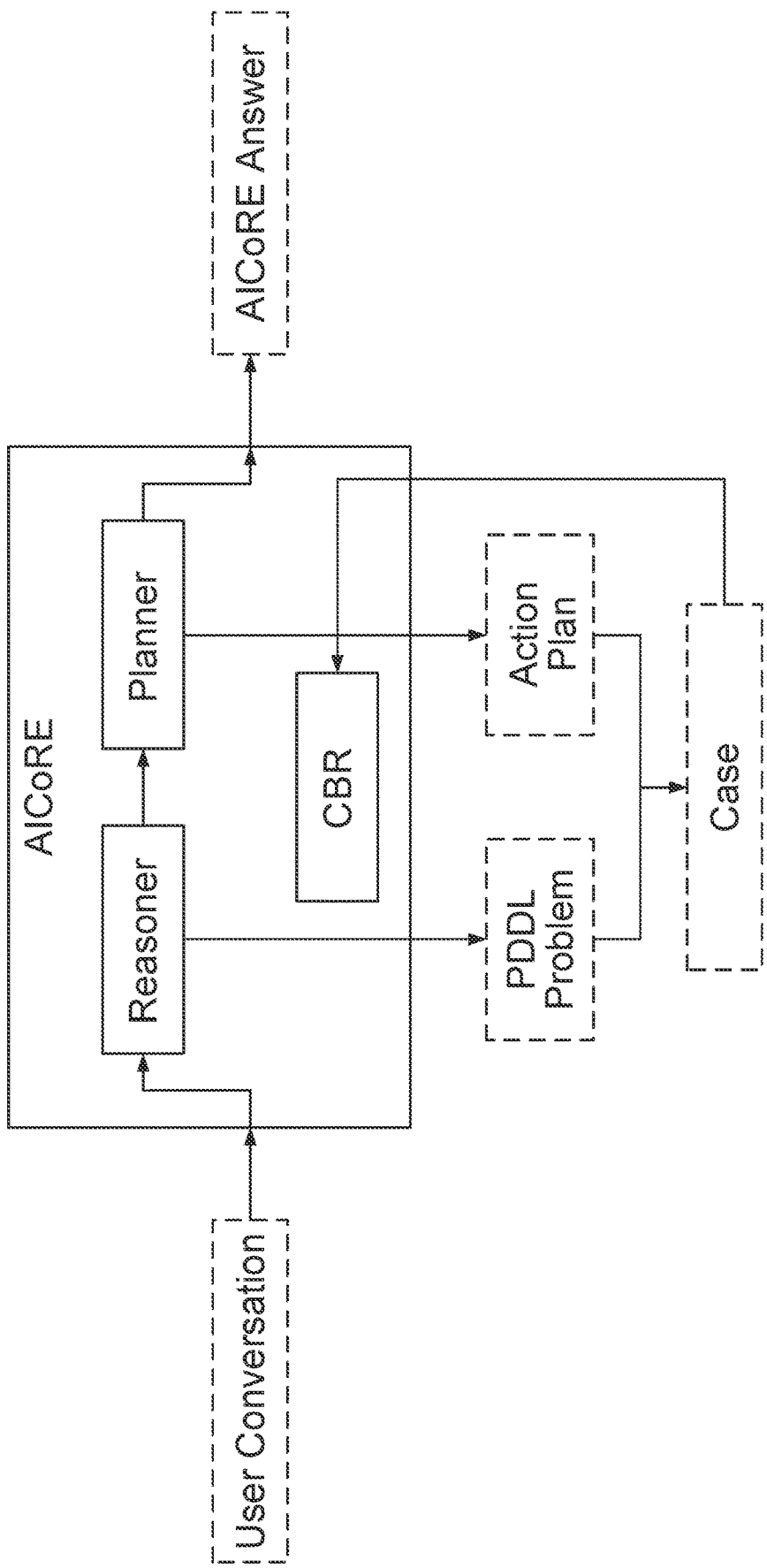
FIG. 12 is a functional block diagram illustrating an embodiment of a retrieve process for processing a case for a new artificial intelligence problem.

FIG. 12 is a functional block diagram illustrating an embodiment of a retrieve process for processing a case for a new artificial intelligence problem. FIG. 12 shows the process of retrieving case. In some embodiments, the process of FIG. 12 is performed at 107 and/or 109 of FIG. 1 as well as 209 and/or 211 of FIG. 2. In some embodiments, the process of FIG. 12 is performed using case based reasoning module 613 of FIG. 6. When a user talks with the AICoRE and user's conversation is translated to previously unknown 'PDDL problem' in Reasoner, and then the AICoRE runs retrieve process. First, the AICoRE makes a CBR case and puts this problem in a case. After the AICoRE makes action plan and executes this plan, CBR modules save this plan to the CBR case. The AICoRE saves this created CBR case as triple set in a triplestore.

Figure 13:
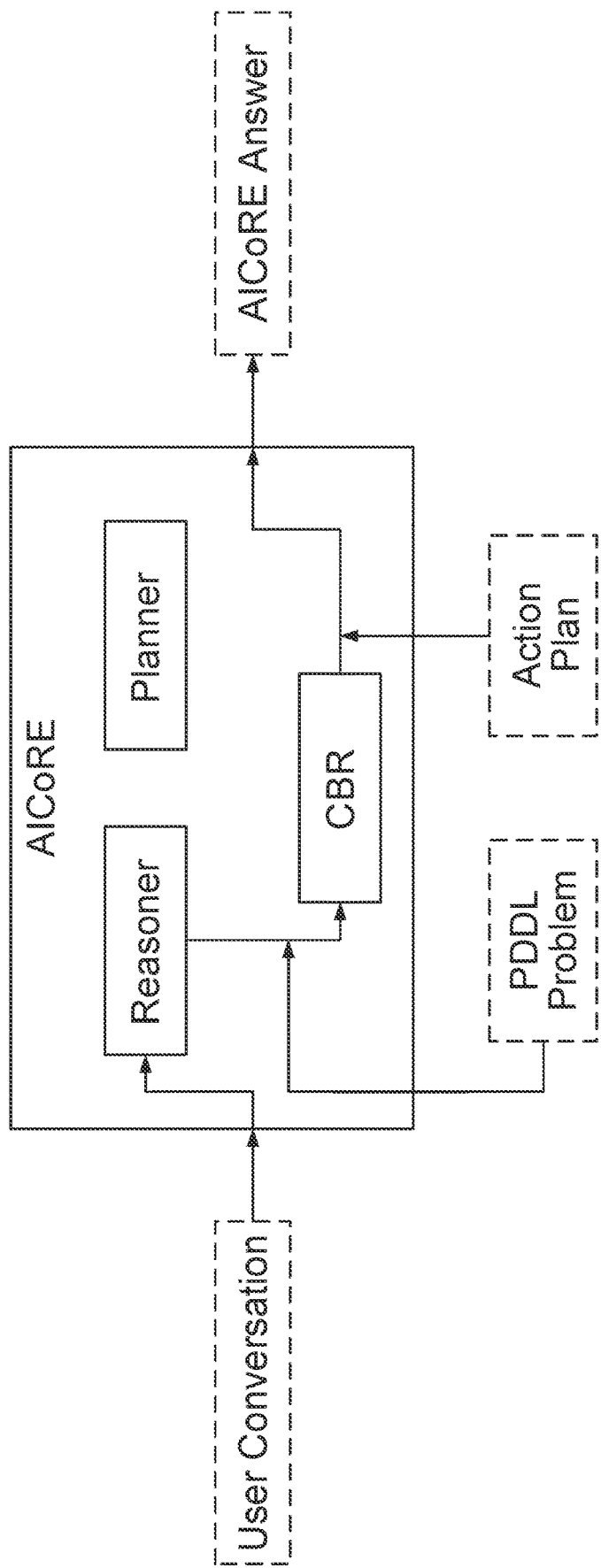
FIG. 13 is a functional block diagram illustrating an embodiment of a process for identifying and reusing a saved case.

FIG. 13 is a functional block diagram illustrating an embodiment of a process for identifying and reusing a saved case. FIG. 13 shows the process of reusing case. In some embodiments, the process of FIG. 13 is performed at 107 and/or 109 of FIG. 1 as well as 209 and/or 211 of FIG. 2. In some embodiments, the process of FIG. 13 is performed using case based reasoning module 613 of FIG. 6. After the AICoRE generates a 'PDDL problem' from conversation, the CBR module finds similar cases with the input case. The CBR module gets all cases in database and checks whether its problem situation is same with input case. In this step, the CBR module gets the case's 'PDDL problem' and checks information of 'PDDL problem'. If the CBR module finds similarity between the input problem and a saved case, then the CBR module will pick the saved case and use its action plan without using the planner module.

(5) Natural Language Generation (NLG)

Natural language generation (NLG) is the task of generating natural language from a machine representation system such as a knowledge base or a logical form. The NLG task may be viewed as the opposite of natural language understanding. In the AICoRE, the planner and reasoner determine what to say, what to change, and so on, so that the NLG does reconstructing, grammar fixing, and person correction.

Figure 14:
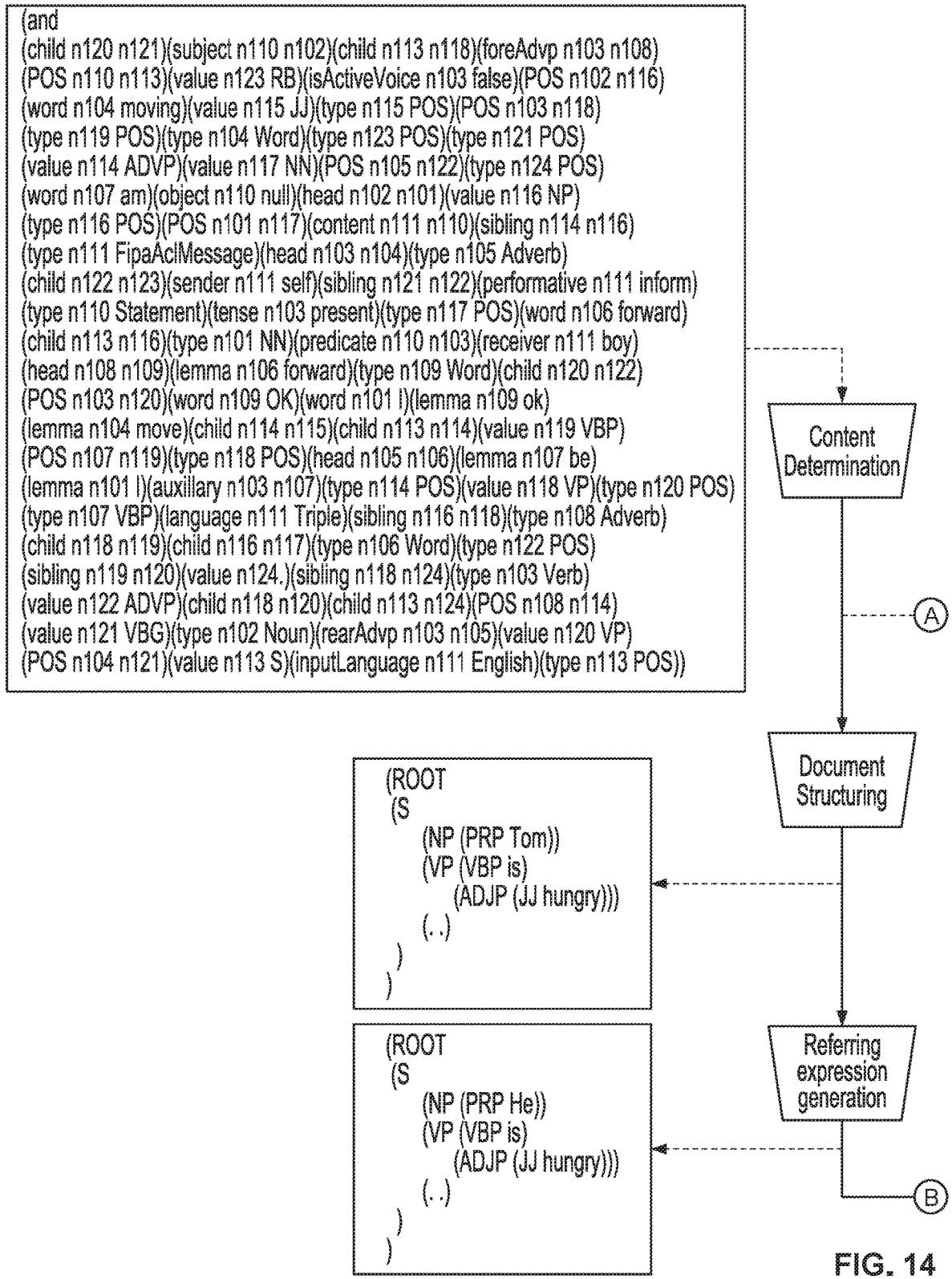
FIG. 14 is a diagram illustrating an embodiment of a process for natural language generation (NLG).

FIG. 14 is a diagram illustrating an embodiment of a process for natural language generation (NLG). FIG. 14 shows an exemplary natural language generation (NLG) architecture including input and output of each part. The first step of the NLG module is parsing strings of triples and making simple graphs for depth first search (DFS) using the result of a planner. Because the result from a planner is in PDDL format, the NLG module converts the format to a graph. Then, it makes a parsed tree by using a DFS search with the stored NLG triple and visited log at document structuring part. Through this process, it can determine the ordering and SPO structure of a sentence. Next, the referring expression generation part replaces names with personal pronouns using coreference data of the triple. Lastly, a realization module performs a process of realizing a sentence by an element of a parse tree or sentence, and NLG uses a natural language generation tool to realize it. In some embodiments, the process of FIG. 14 is performed at 109 of FIG. 1 and 213 of FIG. 2. In some embodiments, the process of FIG. 14 is performed using natural language generator module 617 of FIG. 6.

In some embodiments, the NLG module does not use concise data but instead uses a whole sentence without any omission of words or changes in grammar structure to generate natural language. Thus, there is no information loss in AICoRE.

(6) Memory

In some embodiments, the 'memory' module stores a history of conversations that the agents were engaged in, plus any other information captured by its sensors about the environment such as location, time, weather, etc. The declarative memory holds the agent's knowledge about the world and itself. The knowledge available to the agent in the declarative memory can be in at least two forms: 1) given to the agent in the form of an ontology (e.g., WordNet) or factual knowledge; or 2) inferred by the agent based on the content of its episodic memory.

Figure 15:
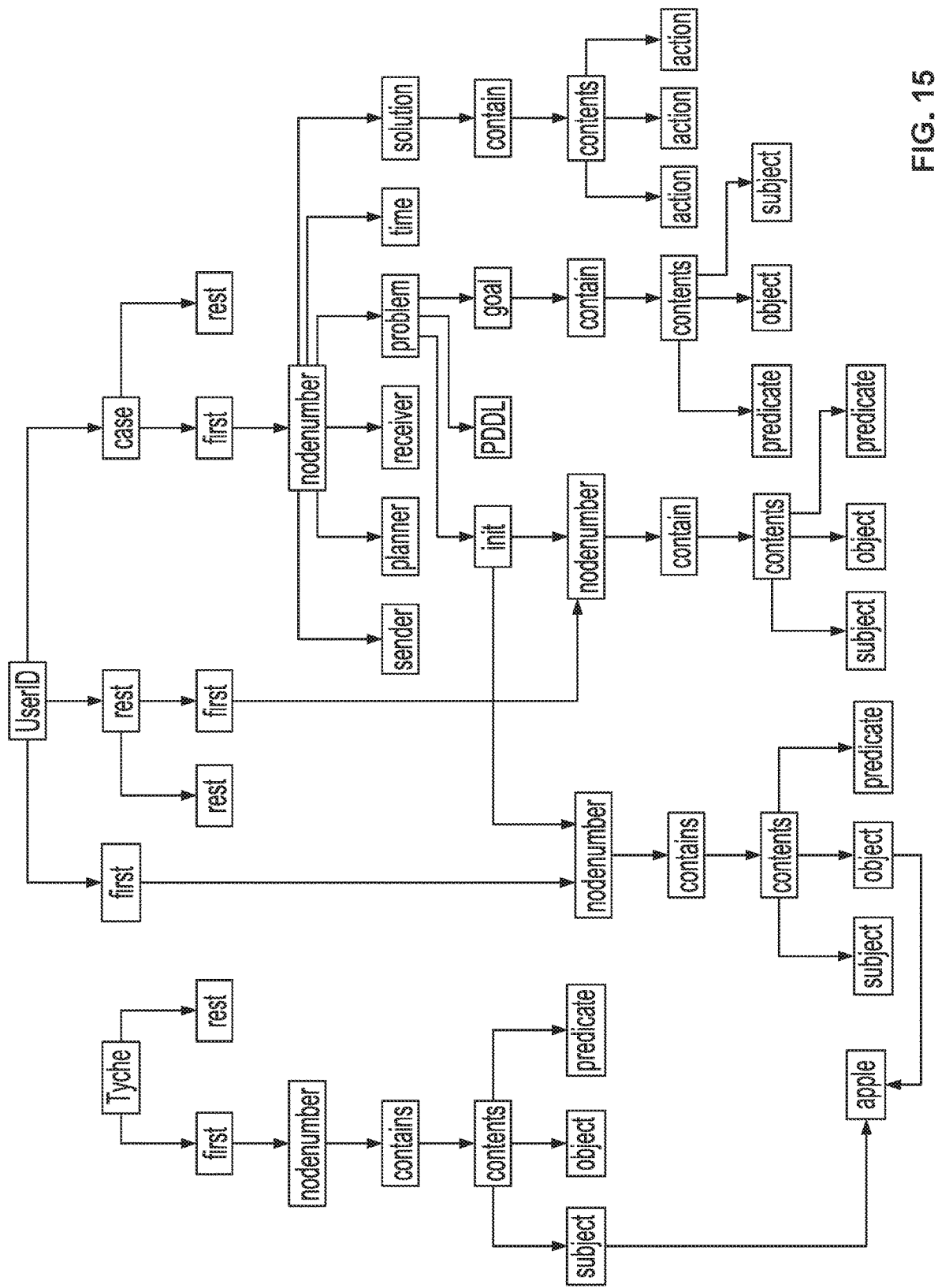
FIG. 15 is a diagram illustrating an example of a memory graph data structure.

FIG. 15 is a diagram illustrating an example of a memory graph data structure. FIG. 15 shows an exemplary memory graph in the AICoRE system. In FIG. 15, the 'memory module' consists of two parts, a user part and a robotic system part. The 'memory module' saves user's information of conversation history in the user part and data of robotic system in the robotic system part. In some embodiments, the memory graph of FIG. 15 is memory graph 607 of FIG. 6. In some embodiments, the memory graph of FIG. 15 is used at 105, 107, and 109 of FIGS. 1; 205, 207, 209, and 211 of FIGS. 2; 305 and 307 of FIG. 3; and FIG. 4.

(1) In some embodiments, the user part is classified into two sections. One section has data about the user that is generated from the user's conversation. The AICoRE saves the data under UserID sequentially. For example, the AICoRE generates a new resource that includes NLU output when a user says something about oneself and the resource connects it to the UserID using the 'first' relation.

Then, if the user says again, the AICoRE also generates a new relation 'rest' relation and connects the new node resource again. In addition, the node that is connected to the 'rest' has another 'first' and 'rest' relations. The AICoRE repeats this whenever the user says something.

(2) In some embodiments, the robotic system part uses the same architecture as that of the user part. However, under a robotic systemID, the system only saves a robotic system's data even if the user says the data and no one but the owner can change the robotic system's data.

Figure 16:
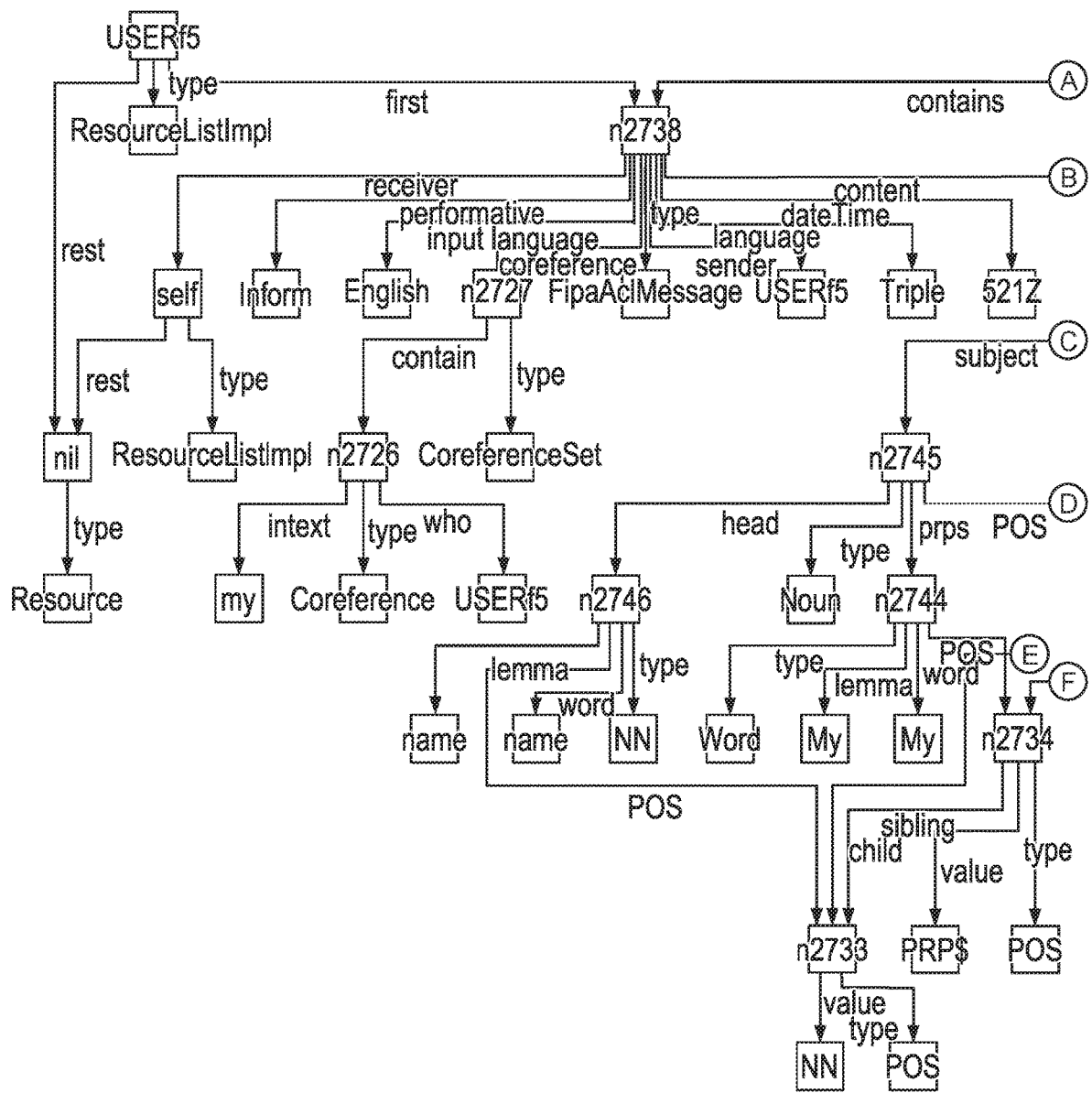
FIG. 16 is a diagram illustrating an example of a memory graph data structure.
Figure 16:
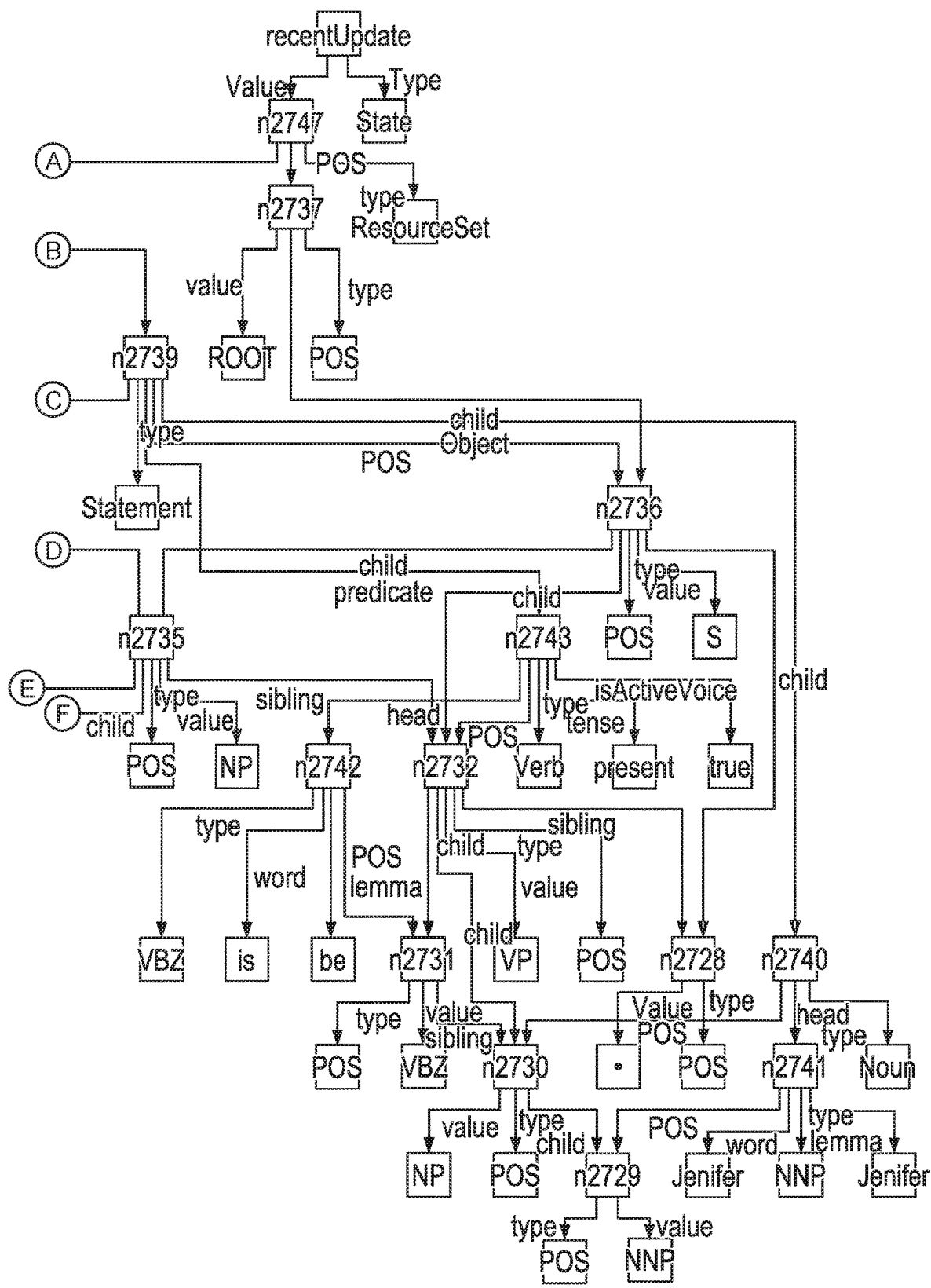

FIG. 16 is a diagram illustrating an example of a memory graph data structure. FIG. 16 shows an exemplary sentence in the memory graph. It is just one sentence processed in the user memory. The data includes many relations and nodes that are the result from NLU. The top level node of the sentence has a lot of information about the sentence, such as language, date, and time, and there is a sentence element under 'content' relation. In some embodiments, the memory graph of FIG. 16 is memory graph 607 of FIG. 6. In some embodiments, the memory graph of FIG. 16 is used at 105, 107, and 109 of FIGS. 1; 205, 207, 209, and 211 of FIGS. 2; 305 and 307 of FIG. 3; and FIG. 4.

In addition, in some embodiments, the CBR module makes the CBR case and saves it under a case node in the 'memory module'. A CBR case is made with sender, receiver, time, 'PDDL problem' and solution information. The sender and receiver information represent who or what the speaker is and the listener of the conversation that is generating a 'PDDL problem'. The time information records the date of conversation. The planner represents what kind of planner the AICoRE uses to solve this conversation problem. The 'problem' is constructed using a 'PDDL problem' and the goaltree's goal. The solution is an action plan of the selected planner. The AICoRE database saves the CBR case under a user node and makes the CBR case list. When the AICoRE makes a new CBR case, the AICoRE database adds this CBR case to the last of the CBR case list. When the CBR module wants to find a similar case, the CBR searches in the CBR's case list. In various embodiments, every user memory structure has its own CBR case list in a database. Thus, the CBR module can reduce the time to search for a similar case in a list.

(7) Inter-Agent Communication (iAC)

The iAC stands for inter-agent communication. It is a communication module for agents that uses, in some embodiments, the JADE and FIPA-ACL message structure. The iAC is may be composed of two projects: iACManager and iACServer.

In some embodiments, the iACManager is a client side management module of iAC. In some embodiments, the iACManager generates ACLMessages that is based on the FIPA-ACL structure and sends messages via the JADE Platform. In some embodiments, the iACServer runs a JADE Platform so that clients can send and receive ACLMessages. It manages whether messages should be sent by checking whether a receiver exists.

Figure 17:
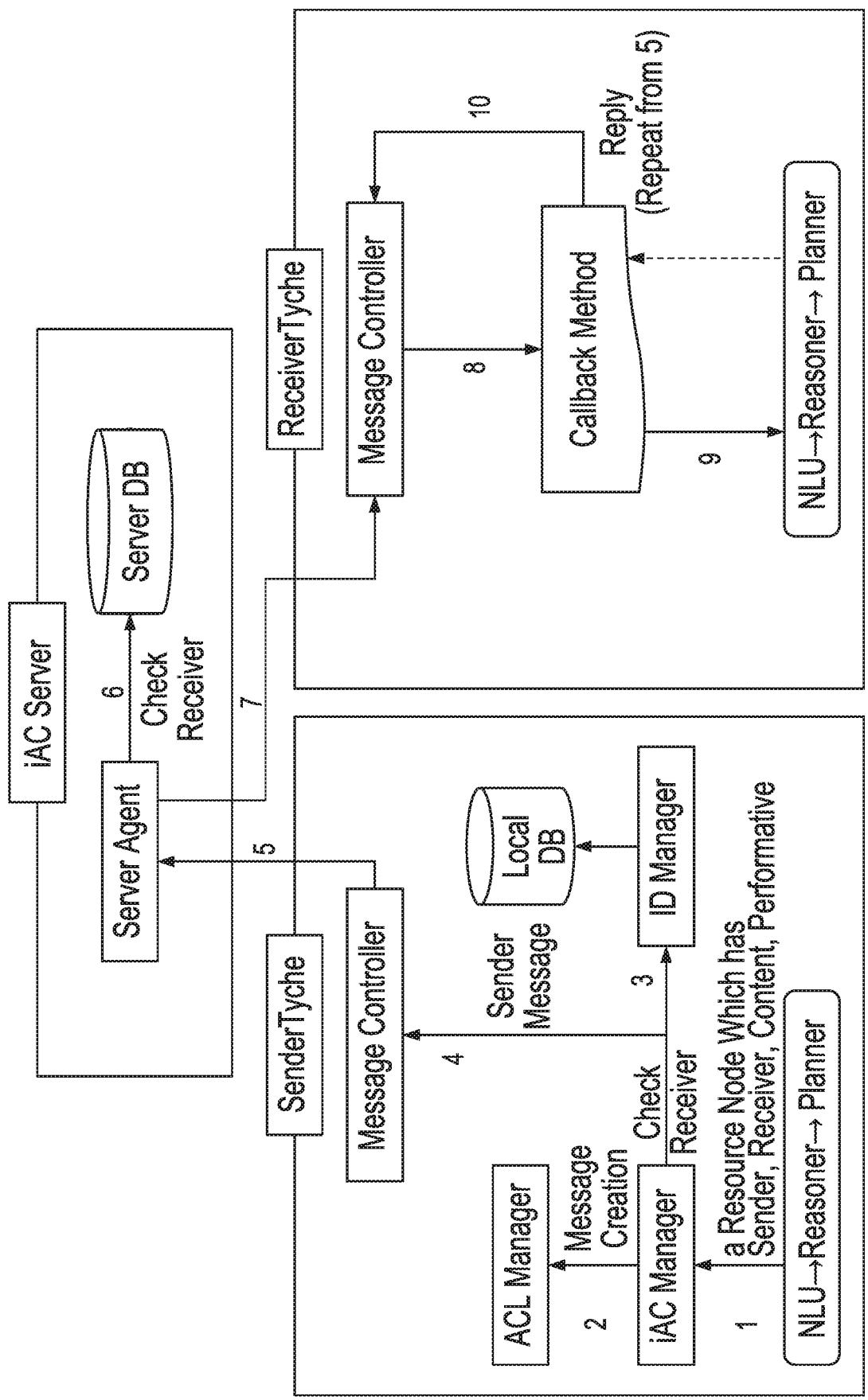
FIG. 17 is a functional block diagram illustrating an embodiment of a process for inter-agent communication.

FIG. 17 is a functional block diagram illustrating an embodiment of a process for inter-agent communication. FIG. 17 shows exemplary processes of the iAC module. In some embodiments, the planner or dialogue manager determines a sender, receiver, content, and performative of a message. The iAC manager receives this message and generates an ACL message using an ACL Manager. When the ACL Manager makes an ACL message, the receiver information is changed into an internal ID using an ID Manager. The ACL message is passed to message controller, and it sends the message to an iAC Server. The server agent in the iAC Server receives the message and checks whether the receiver exists. If the receiver exists, then it sends the message to the receiver module of a robotic system. The planner and dialogue manager can register callback methods to the message controller. The message controller uses the callback methods when it receives messages.

In some embodiments, there are two possible types of ACL messages that can be processed. One is a request. When an iAC manager receives a request, it passes it to a NLU, so that the NLU can start to process the message through the AICoRE. For the other type of the message, the iAC manager outputs the message to the target user.

Communication between agents allows the agents to share information and to command each other. For example, a user can ask an agent about someone's hobby. If there is no information about it, the agent may ask someone else's agent and provide the answer to the user. In various embodiments, personal information can be protected and an agent can decide whether it sends requested information or not to an asking agent.

The iAC module can be used in many ways. For example, agents can share the owner's schedule to come up with a meeting time. The iAC module can also be used to share the price of the used goods of the owner and to suggest fine goods to the user.

In some embodiments, the process of FIG. 17 is performed in part at 101 and/or 109 of FIG. 1 to receive and send inter-agent communication. In some embodiments, the process of FIG. 17 is performed at 105 and/or 107 of FIG. 1 to retrieve supporting knowledge and/or to identify and/or solve an artificial intelligence problem.

The AICoRE Processes

FIG. 18 is a pseudo-code description illustrating an embodiment of a process for solving an artificial intelligence problem using adaptive, interactive, and cognitive reasoning. An example of a process and execution of the system are shown in FIG. 18, i.e. an exemplary pseudo code of the AICoRE process. FIG. 18 shows the BDI aspect by retrieving the beliefs from the agent's personal memory, executing the plan from reasoning out, and finally arriving at the set goals. In FIG. 18, the execution architecture is represented in five sequences: initialization, getting new events, setting new plans, executing plans, and processing the rest of the job. The executing sequence, depicted in FIG. 18, resembles an embodiment of an architecture of a BDI agent. In some embodiments, the pseudo-code description of FIG. 18 describes the processes of FIGS. 1 and 2. In some embodiments, the system described by the functional block diagram of FIG. 6 performs the process described in FIG. 18.

In some embodiments, a BDI agent stands for an agent based on the three main concepts: Belief, Desire and Intention. The Belief is the knowledge of what the agent has, including environmental information and data from other agents that is saved in an agent's belief-base. The Desire is what the agent wants to accomplish. The desire that the agent wants to accomplish may also be called the goal of the agent. Specifically, an agent executes and determines an active goal that is more profitable for the current input data or changes. The Intention represents the methods to achieve the goal. The intention may also be called the plan of the agent. The plan is composed of actions that perform a single job. Additionally, the inducer of the processes of an agent is called an event.

When an event occurs to a BDI agent, a belief is updated in the belief-base, and the BDI agent interoperates the belief with goals and plans to invoke them. When the available goal and plans are activated within the BDI agent, the reasoner within the BDI agent executes the proper actions to accomplish this goal, and the result is executed within the BDI agent in the form of actions. This sequence of actions updates the belief-base of the BDI agent. If there are no more goals to be accomplished for the belief, the BDI agent finishes the job.

This process may be used by some embodiments of an AICoRE. After an AICoRE is initialized, an AICoRE receives new external events in the form of triples as input. These events are triggered whenever a user says a verbal utterance. Normally an AICoRE may process these events sequentially using a time-priority queue storing verbal utterances. However, if a high-priority event such as fire emergencies happens, then the event's priority within the queue of an AICoRE is changed to accommodate the high-priority event.

A brief example of a process of the AICoRE is as follows: The chosen event, represented in natural language format, gets transferred into the natural language understanding module of the AICoRE, and it gets appended with various optional parameters from the option-generator from the event queue of the AICoRE. Next, the planner module of the AICoRE uses a set of internal rules to set the most proper goal and plan to get the best solution for the given event. This phase is analogous with the 'update-intention' process of a BDI agent. However, in the AICoRE, there are not only rules of the planner module, but also rules from other modules within the system, so an iterative sequence may be used within the main repeat sequence in order to account for all the various rules. Examples of rules not from the planner module include rules from the reasoner module that are used to map data to the event, based on various characteristics of the event. Whenever a plan is set for executing a solution for a given event, the AICoRE executes the plan with the executor module. Finally, using the steps generated by the execution of the plan, the AICoRE can generate responses in the form of natural language that satisfies the actions required to accomplish the goal set by the inputted event.

Figure 19:
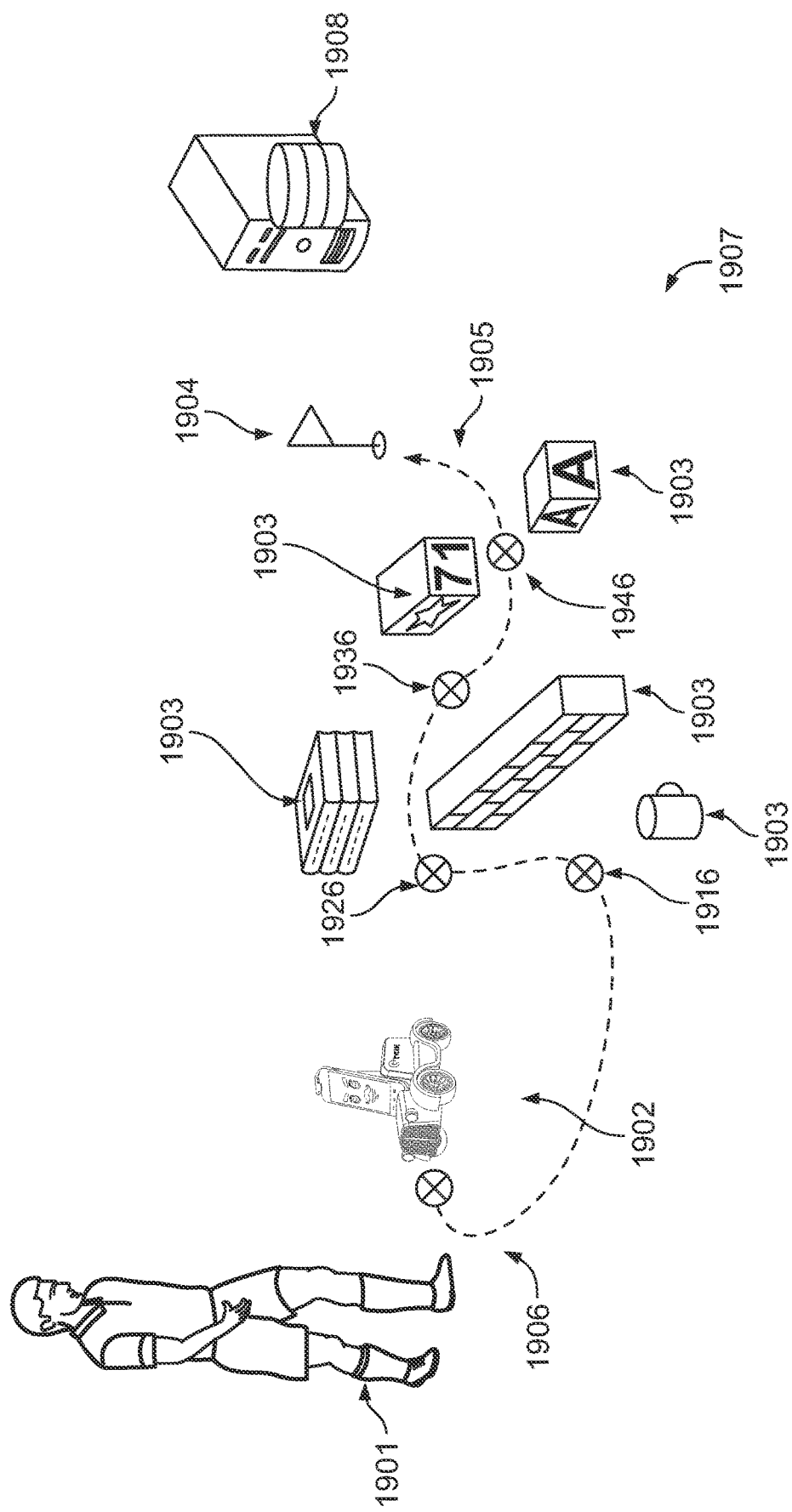
FIG. 19 is a diagram illustrating an example of an interactive game system using an intelligent smartphone robot.

FIG. 19 is a diagram illustrating an example of an interactive game system using an intelligent smartphone robot. In the example shown, a game environment is configured and a target object is hidden. An intelligent smartphone robot then seeks to find the target object by navigating the game environment. While navigating the game environment, the intelligent smartphone robot will encounter challenges such as obstacles. The robot can interact with others players in the game such as a human player. For example, the robot can ask the human player questions and depending on the answer, the robot can modify its search for the target object. In some embodiments, the intelligent smartphone robot is connected to an Adaptive Interactive Cognitive Reasoning Engine (AICoRE) server. In various embodiments, the intelligent smartphone robot and the AICoRE server are implemented using one or more of the processes described above with respect to FIGS. 1-18. In various embodiments, the intelligent smartphone robot and AICoRE server are implemented using the autonomous robotic system described above and/or with respect to FIGS. 1-18. In the example shown, the interactive game system includes human player 1901; intelligent smartphone robot 1902; objects 1903; target object 1904; trajectory 1905; positions 1906, 1916, 1926, 1936, and 1946; playing surface 1907; and AICoRE server 1908.

In some embodiments, human player 1901 interacts with intelligent smartphone robot 1902 on playing surface 1907. In some embodiments, intelligent smartphone robot 1902 is a smartphone device coupled to a motorized robotic base. In some embodiments, the intelligent smartphone robot 1902 is a mobile device such as a tablet coupled to a motorized robotic base. For example, a smartphone computing device is docked in a robot base. The robotic base may include motorized functionality such as wheels to provide mobility to intelligent smartphone robot 1902. In some embodiments, playing surface 1907 is used to contain the game environment and game scenario. In some embodiments, playing surface 1907 is a table, the floor of a room, or other appropriate playing surface. Objects 1903 are examples of objects placed throughout the game environment on playing surface 1907 and may function as obstacles in the game scenario. For example, the placed objects, such as objects 1903, may include a book, a wall, a block, or other objects placed in the environment. In some embodiments, the placed objects, such as objects 1903, may be recognizable or unrecognizable by the vision functionality of intelligent smartphone robot 1902. Target object 1904 is a recognizable object that is placed in the game environment. In some embodiments, one of the goals of the interactive game is for intelligent smartphone robot 1902 to navigate to and reach target object 1904.

During the gameplay of the interactive game illustrated by FIG. 19, intelligent smartphone robot 1902 may take one of many possible paths to find target object 1904. The particular path taken depends at least on the objects encountered while navigating playing surface 1907 and the responses from interactions with human player 1901. For example, intelligent smartphone robot 1902 may turn left or right when encountering an obstacle based on the suggestion of human player 1901. In some embodiments, one path taken by intelligent smartphone robot 1902 to find target object 1904 is depicted as trajectory 1905. The path taken to find target object 1904 may include one or more encounters with objects. In some embodiments, intelligent smartphone robot 1902 stops at an encountered object, such as an obstacle, and interacts with human player 1901. Trajectory 1905 includes encounters with multiple objects. The encounters are associated with the depicted breaks in trajectory 1905. Trajectory 1905 includes stops at positions 1906, 1916, 1926, 1936, and 1946 that correspond to encountered objects. In some embodiments, trajectory 1905 includes a final stop at target object 1904.

In some embodiments, at each of the positions 1906, 1916, 1926, 1936, and 1946, intelligent smartphone robot 1902 stops based on one or more nearby objects. In some embodiments, intelligent smartphone robot 1902 recognizes the objects at the stop and attempts to communicate with AICoRE server 1908 in order to receive an action command for its next movement.

In some embodiments, AICoRE server 1908 is a reasoning engine server that is connected via a wireless network to and can communicate with intelligent smartphone robot 1902. In various embodiments, AICoRE server 1908 analyzes the status of intelligent smartphone robot 1902 and the voice input received from human player 1901. In some embodiments, AICoRE server 1908 can provide questions for intelligent smartphone robot 1902 to ask human player 1901. AICoRE server 1908 is able to make an action plan for intelligent smartphone robot 1902 based on the input received via the robot. In some embodiments, the action plan is based on solving an artificial intelligence (AI) planning problem. For example, AICoRE server 1908 can solve an AI problem and create an action plan for intelligent smartphone robot 1902 based on the status of intelligent smartphone robot 1902 and the responses of human player 1901.

In various embodiments, AICoRE server 1908 receives the status of intelligent smartphone robot 1902 and can send action commands to control or modify the behavior of intelligent smartphone robot 1902. For example, based on an obstacle encountered by intelligent smartphone robot 1902, AICoRE server 1908 can suggest a question for intelligent smartphone robot 1902 to ask human player 1901. Based on the response of human player 1901 relayed via intelligent smartphone robot 1902, AICoRE server 1908 can suggest an action for intelligent smartphone robot 1902 to progress towards target object 1904. For example, AICoRE server 1908 can suggest or control intelligent smartphone robot 1902 to turn right and move forward around an identified obstacle.

In some embodiments, human player 1901 places intelligent smartphone robot 1902, one or more obstacles, and target object 1904 on playing surface 1907. In some embodiments, human player 1901 identifies target object 1904 for intelligent smartphone robot 1902 and intelligent smartphone robot 1902 is able to visually recognize, for example, using a vision recognition function, target object 1904. The objects placed as obstacles may be recognizable or unrecognizable. The objects can be arranged in any configuration and/or placement. The difficulty or level of the gameplay can be influenced by the player's selection and/or placement of the obstacles and the placement and type of target object. By allowing human player 1901 to modify the game environment, the game system is flexible and extendable. Various combinations and difficulty levels of gameplay are possible.

In some embodiments, human player 1901 guides intelligent smartphone robot 1902 to the position of target object 1904, attempting to avoid obstacles along the way. Intelligent smartphone robot 1902 can continuously recognize objects and their distances using object recognition and distance measurement functions processed by the smartphone docked onto the robot body and the information from the status of intelligent smartphone robot 1902 sent to a reasoning engine server such as AICoRE server 1908. In various embodiments, during the gameplay, intelligent smartphone robot 1902 will interact with human player 1901 by asking questions to obtain information on where or how to proceed to reach target object 1904. Human player 1901 can respond to the inquiries generated by AICoRE server 1908 based on the information gathered by intelligent smartphone robot 1902.

In some embodiments, intelligent smartphone robot 1902 will continue to search for target object 1904 until target object 1904 is recognized or until the game time runs out. For example, once the timer expires and the target object 1904 has not been reached, the game is over. In some embodiments, once intelligent smartphone robot 1902 identifies target object 1904, human player 1901 must confirm that intelligent smartphone robot 1902 has found target object 1904 for the game to complete and for human player to register a win. In the event the timer expires before intelligent smartphone robot 1902 has reached target object 1904, the human player registers a loss.

Figure 20:
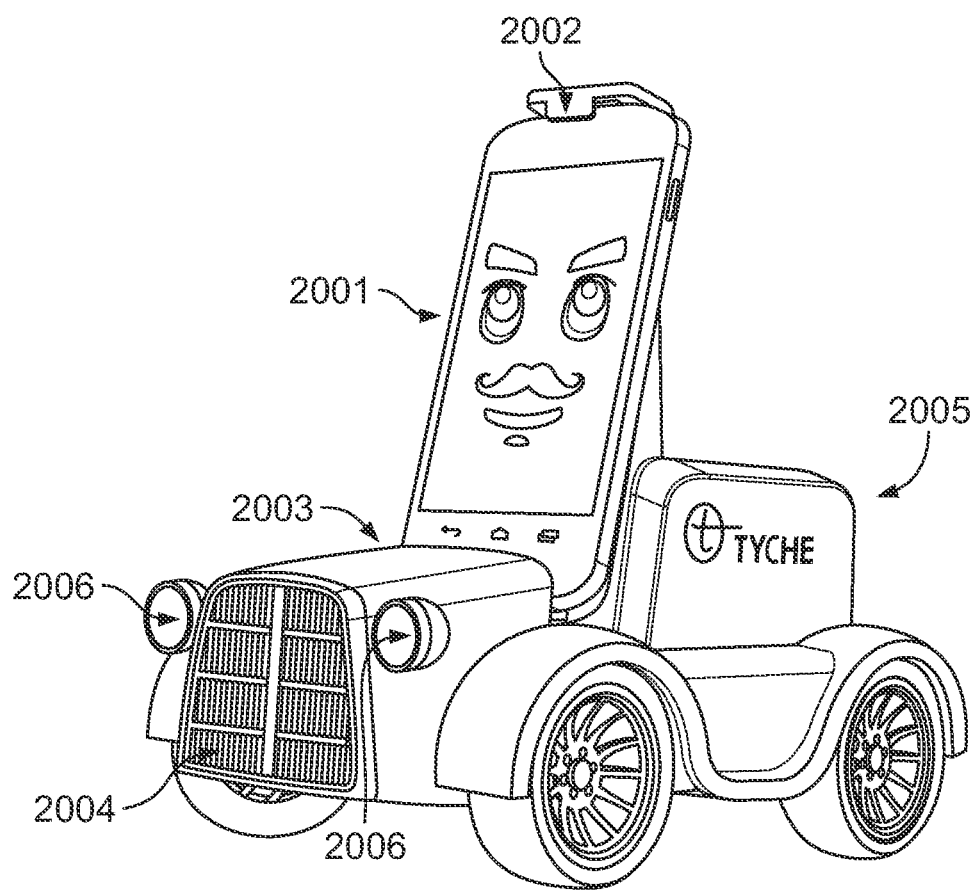
FIG. 20 is a diagram illustrating an embodiment of an intelligent smartphone robot.

FIG. 20 is a diagram illustrating an embodiment of an intelligent smartphone robot. In the example shown, the intelligent smartphone robot includes docked smartphone 2001, camera 2002, microphone 2003, distance measurement sensor 2004, motorized robot base 2005, and lights 2006. In various embodiments, the intelligent smartphone robot of FIG. 20 may be used for the interactive game system of FIG. 19 and is intelligent smartphone robot 1902 of FIG. 19. In some embodiments, the intelligent smartphone robot is a client to an AICoRE server such as AICoRE server 1908 of FIG. 19. In some embodiments, the intelligent smartphone robot is implemented using the disclosed autonomous robotic system.

In some embodiments, docked smartphone 2001 is a smartphone computing device with included sensors such as camera 2002 and microphone 2003. In some embodiments, docket smartphone 2001 includes additional sensors such a location, accelerometer, and gyroscope sensors, among others. In various embodiments, docked smartphone 2001 includes network communication functionality such as WiFi and cellular functionality and the ability to execute programmed software modules. In various embodiments, docked smartphone 2001 is docked on a robot body such as motorized robot base 2005.

In some embodiments, camera 2002 is a front camera of docked smartphone 2001. In some embodiments, camera 2002 is used for object recognition. In some embodiments, camera 2002 is used to identify faces such as the face of a human player. In various embodiments, camera 2002 is used to capture images for facial identification and facial expression recognition.

In some embodiments, microphone 2003 is the microphone of docked smartphone 2001. In some embodiments, microphone 2003 is used to capture voice input such as a player's voice commands and/or questions.

In some embodiments, distance measurement sensor 2004 is installed on the front of the intelligent smartphone robot. For example, distance measurement sensor 2004 may be installed on the front of motorized robot base 2005. Distance measurement sensor 2004 may be used for obstacle detection and measuring the distance between a robot base, such as motorized robot base 2005, and one or more obstacles in front of robot base 2005. In some embodiments, the results of distance measurement sensor 2004 are used to approximate the distance of a detected object from the base of the intelligent smartphone robot. In some embodiments, one or more distance measurement sensors are affixed to the robot to sense obstacles in one or more directions including in front of the robot. In some embodiments, distance measurement sensor 2004 is an IR sensor, an ultrasonic sensor, a radar sensor, or other appropriate sensor for measuring relative distance to an object. In some embodiments, distance measurement sensor 2004 is a proximity sensor. For example, using a proximity sensor, objects located in the proximity of the intelligent smartphone robot can be detected.

In some embodiments, motorized robot base 2005 provides mobility for an intelligent smartphone robot. For example, motorized robot base 2005 may include a four-wheel robot body and motor capable of moving forwards, backwards, and turning. In various embodiments, other appropriate motorized bases can provide different forms of mobility such as flying, travelling on water, traversing rugged terrain, etc.

In some embodiments, lights 2006 are installed on the intelligent smartphone robot. For example, lights 2006 may be installed on the front of motorized robot base 2005. In various embodiments, the lights provide illumination and/or may be used as a form of communication. For example, lights 2006 may be activated in response to feedback or to encourage feedback from a human player. As another example, lights 2006 may be activated to confirm a human player's response was captured.

In some embodiments, the intelligent smartphone robot of FIG. 20 includes speech recognition functionality. For example, using the speech recognition functionality, the intelligent smartphone robot can recognize the speech of a human player. In some embodiments, the speech recognition functionality utilizes the processing and/or sensors of docked smartphone 2001 and microphone 2003. In some embodiments, the speech recognition functionality incorporates facial expression recognition for improved accuracy.

In some embodiments, the intelligent smartphone robot of FIG. 20 includes vision recognition functionality. For example, using the vision recognition functionality, the intelligent smartphone robot can recognize objects in the images captured by camera 2002. In some embodiments, the vision recognition functionality utilizes the processing and/or sensors of docked smartphone 2001 and camera 2002 to identify objects such as obstacles. Examples of objects that may be detected include objects 1903 and the target object 1904 of FIG. 19.

In some embodiments, the intelligent smartphone robot of FIG. 20 includes distance measurement functionality. For example, using the distance measurement functionality, the intelligent smartphone robot can measure or approximate the distance between the robot body and detected objects. In some embodiments, the distance measurement functionality is used to measure the distance between a detected object and motorized robot base 2005 and/or docked smartphone 2001. In some embodiments, the distance measurement functionality utilizes the processing and/or sensors of docked smartphone 2001 and distance measurement sensor 2004 to identify the presence and/or distance of objects near the robot. In some embodiments, the distance is the distance in front of the robot. In some embodiments, the distance is to the side, above, below, behind, and/or another direction or orientation from the robot.

In some embodiments, the intelligent smartphone robot of FIG. 20 includes motion functionality. For example, using the motion functionality, the intelligent smartphone robot can move forward, turn, stop, etc. The motion functionality allows the robot to be mobile and to traverse different areas such as playing surface 1907 of FIG. 19. In various embodiments, the motion functionality utilizes the processing and/or sensors of docked smartphone 2001 and motorized robot base 2005 to act on motion commands.

In some embodiments, the intelligent smartphone robot of FIG. 20 includes conversation functionality. For example, using the conversation functionality, the intelligent smartphone robot can converse with a human player. In some embodiments, the conversion utilizes natural language understanding to interact with a human player. In various embodiments, the conversation recognition functionality utilizes the processing and/or sensors of docked smartphone 2001 and microphone 2003. In various embodiments, the intelligent smartphone robot includes speakers (not shown) for playing generated speech. In various embodiments, one or more speakers are part of docked smartphone 2001 and/or mounted to motorized robot base 2005.

In some embodiments, the intelligent smartphone robot of FIG. 20 includes communication functionality. For example, using the communication functionality, the intelligent smartphone robot can communicate with a remote server, such as AICoRE server 1908 of FIG. 19, to send status updates of the robot and/or to receive action plans or questions to ask a human player. In various embodiments, the communication functionality includes wireless network functionality such as WiFi, Bluetooth, and/or cellular connectivity. In various embodiments, the communication functionality utilizes the processing and/or network components of docked smartphone 2001.

Figure 21:
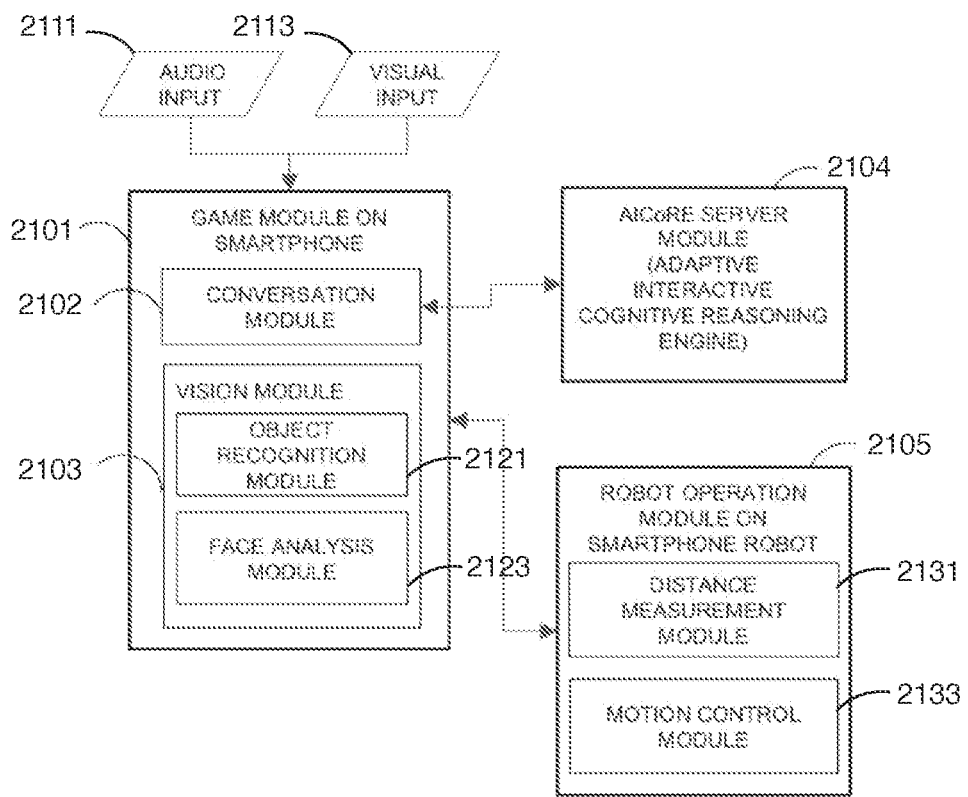
FIG. 21 is a block diagram illustrating an embodiment of an interactive game system using an intelligent smartphone robot.

FIG. 21 is a block diagram illustrating an embodiment of an interactive game system using an intelligent smartphone robot. In some embodiments, the interactive game system utilizes the disclosed autonomous robotic system including an intelligent smartphone robot and an AICoRE server. For example, in some embodiments, the intelligent smartphone robot is the intelligent smartphone robot of FIGS. 19 and/or 20. In some embodiments, the AICoRE server is AICoRE server 1908 of FIG. 19. In the example shown, the interactive game system includes game module 2101, AiCoRE server module 2104, and robot operation module 2105. In some embodiments, game module 2101 is configured to run on a docked smartphone such as docked smartphone 2001 of FIG. 20. Game module 2101 includes conversation module 2102 and vision module 2103. Vision module 2103 includes object recognition module 2121 and face analysis module 2123. Game module 2101 receives audio input 2111 and visual input 2113. For example, audio input 2111 may be captured by a microphone such as microphone 2003 of FIG. 20 and visual input 2113 may be captured by a camera such as camera 2002 of FIG. 20. In some embodiments, AiCoRE server module 2104 is configured to run on a remote computer server. In some embodiments, AiCoRE server module 2104 is implemented by AiCoRE server 1908 of FIG. 19. AiCoRE server module 2104 may be used to receive the status of game module 2101. In some embodiments, AiCoRE server module 2104 may be used to receive the status of motion control module 2133. For example, game module 2101 can communicate with AiCoRE server module 2104 via a network connection (not shown). Game module 2101 can send information on the status of the robot, such as recognition results, distance measurement results, and contents of recognized player speech, to AiCoRE server module 2104. Game module 2101 can also receive the processed feedback of AiCoRE server module 2104 including action commands and questions to be used to interact with the human player. In various embodiments, the action commands can be used to control the movement of the robot via motion control module 2133.

In some embodiments, robot operation module 2105 is configured to run on a docked smartphone such as docked smartphone 2001 of FIG. 20. Robot operation module 2105 includes distance measurement module 2131 and motion control module 2133. In various embodiments, distance measurement module 2131 utilizes distance measurement sensor 2004 of FIG. 20 and motion control module 2133 utilizes motorized robot base 2005 of FIG. 20. In various embodiments, the interactive game system of FIG. 19 may be implemented using the interactive game system of FIG. 21. In some embodiments, the interactive game system of FIG. 21 utilizes the intelligent smart robot of FIGS. 19 and/or 20. In some embodiments, an application, such as a smartphone application is configured and installed to run on a docked smartphone computing device. In various embodiments, the application includes game module 2101 and/or robot operation module 2105. In some embodiments, the application is capable of communicating with AiCoRE server module 2104 running on a remote server and is able to register the identity of a human player based on the human player's face.

In some embodiments, visual input 2113 captured by a camera such as camera 2002 of FIG. 20 and audio input 2111 captured by a microphone such as microphone 2003 of FIG. 20 are inputs to game module 2101. Conversation module 2102 of game module 2101 may be used to interact with a human player. For example, the robot may use conversation module 2102 to ask the human player questions and in turn to receive spoken responses. Vision module 2103 of game module 2101 may utilize object recognition module 2121 to identify obstacles and/or the target object of an interactive game. Face analysis module 2123 of vision module 2103 may be used to perform face identification, for example, to determine the identity of the human player and to associate a human player's face with the player's identity.

In some embodiments, game module 2101 communicates with robot operation module 2105. Game module 2101 can send commands to robot operation module 2105 and receive distance measurement results of distance measurement module 2131. Distance measurement results may be used, for example, to detect obstacles. Commands sent by game module 2101 to robot operation module 2105 may include motion commands to move the robot, which may be performed by motion control module 2133. Motion commands used to control the robot's movement can include control of the robots speed, acceleration, and/or direction. In various embodiments, robot operation module 2105 can receive actions commands from game module 2101 and send distance measurement results of distance measurement module 2131 to game module 2101.

In some embodiments, conversation module 2102 provides conversation functionality and is used for interaction between a human player and a smartphone robot. Using a speech recognition function, conversation module 2102 can recognize words in a player's speech captured from audio input 2111 and send the recognized results to AiCoRE server module 2104. In various embodiments, a robot can implement a "listen" functionality using conversation module 2102 and AiCoRE server module 2104. In some embodiments, conversation module 2102 can also convert words to audio output (not shown) and play the converted output through a speaker such as the docked smartphone's speaker. The played speech corresponds to a talk functionality of the robot.

In some embodiments, vision module 2103 can process visual input 2113 (e.g., the images captured by a camera of the robot). Using object recognition module 2121, objects can be recognized and classified into type such as cups, books, toy blocks, etc. The objects in a game environment near the robot can be identified. Similarly, using face analysis module 2123, faces and facial expressions in the captured images of visual input 2113 can be recognized.

In some embodiments, AICoRE server module 2104 is connected to game module 2101 via a network connection. After receiving robot status information, AICoRE server module 2104 analyzes the information to generate a suitable action command sequence that is sent back to the robot. In various embodiments, AICoRE server module 2104 is a planner for the robot's next movement. For example, AICoRE server module 2104 may implement an automated artificial intelligence (AI) planner to determine the next move for an intelligent smartphone robot. In some scenarios, the processing performed by AICoRE server module 2104 corresponds to the "think" functionality of the robot. In various embodiments, the actions command sequence corresponding to actions to be performed by the robot are predefined and configured as part of AICoRE server module 2104. Additional actions can be continuously and/or dynamically added. In various embodiments, examples of actions are described in the table of FIG. 22. In various embodiments, additional actions may be learned and/or added to potential actions as the robot and AICoRE server module 2104 interact with human players and/or the environment.

In some embodiments, when an obstacle or recognizable object is detected, the robot interacts with the human player by asking the human player questions. AICoRE server module 2104 analyzes the current situation and generates a corresponding suitable question that is relayed to the intelligent smartphone robot. In some embodiments, the questions are predefined and configured as part of AICoRE server module 2104. In various embodiments, examples of pre-defined questions are described in the table of FIG. 23. In some embodiments, the robot interacts with a human player using one or more questions provided by AICoRE server module 2104. The response by the human player is processed by conversation module 2102 and sent back to AICoRE server module 2104. AICoRE server module 2104 determines a plan for the next action (such as a movement) based on the human player response. In various embodiments, additional actions or questions can be continuously and/or dynamically added. In various embodiments, additional questions are learned and added to potential questions as the robot and AICoRE server module 2104 interact with human players and/or the environment. The type of questions can include complex questions including math puzzles.

In some embodiments, distance measurement module 2131 of robot operation module 2105 can provide the measurement result corresponding to the distance between the robot and a detected obstacle. In some embodiments, the distance is measured from the front of the robot, although other reference points may be used as well. In various embodiments, motion control module 2133 of robot operation module 2105 controls the movement of the robot, including the speed and direction of the robot. In various embodiments, robot operation module 2105 receives action commands from game module 2101 and sends the results of distance measurements to game module 2101.

FIG. 22 is a table illustrating exemplary action commands for an embodiment of an intelligent smartphone robot for an interactive game system. In the example shown, the table includes action commands "start robot," "stop robot," "turn left," "turn right," "light on," "light off," "move forward," and "move backward." In some embodiments, the commands are received by an intelligent smartphone robot, such as intelligent smartphone robot 1902 of FIG. 19, and are sent from an Adaptive Interactive Cognitive Reasoning Engine (AICoRE) server, such as AICoRE Server 1908 of FIG. 19. In some embodiments, the intelligent smartphone robot is the intelligent smartphone robot of FIG. 20. In various embodiments, the commands are received by a game module of an intelligent smartphone robot, such as game model 2101 of FIG. 21, from an AICoRE server module such as AICoRE server module 2104 of FIG. 21. In some embodiments, the game module directs the commands to a robot operation module, which may utilize a motion control module to implement a movement associated with the command. For example, a "move forward" or a "stop robot" command is received at a game module of an intelligent smartphone robot. Based on the type of command, the command may be directed to a robot operation module. In the event the command involves movement, such as the "move forward" command, the motion control module is used to move the robot. As another example, the motion control module is used to stop the robot in response to a "stop robot" command. In some embodiments, the game module is game module 2101 of FIG. 21, robot operation module is robot operation module 2105 of FIG. 21, and motion control module is motion control module 2133 of FIG. 21.

In some embodiments, the number of supported commands is extendable and additional commands can be added at any time. In some embodiments, fewer or more commands are available for interfacing with an intelligent smartphone robot. In some embodiments, commands can be added by an AICoRE server to control the motorized robot base. For example, commands can be added that utilize the different operation modules of the intelligent smartphone robot. In some embodiments, one or more commands can be used in sequence or in parallel. For example, an action command sequence may specify one or more action commands.

FIG. 23 is a table illustrating exemplary questions that may be asked by an embodiment of an intelligent smartphone robot for an interactive game system. In the example shown, the questions are predefined and are selected based on a particular scenario. For example, a different set of questions is used depending on whether (1) an obstacle is detected, (2) an object recognized, and (3) whether the target object has been found. In some embodiments, more or fewer factors may be used to determine which set of predefined questions to utilize. In some embodiments, the particular question to select from the set is determined by an Adaptive Interactive Cognitive Reasoning Engine (AICoRE) server, such as AICoRE Server 1908 of FIG. 19 or AICoRE server module 2104 of FIG. 21. In some embodiments, the predefined questions are based on previously selected questions in order to ensure a variety of questions are asked. In some embodiments, the question is randomly selected after matching the factors to a set of predefined questions. For example, in the scenario that an obstacle is detected, the object is not recognized, and the target object is not found, one of three questions may be selected randomly by AICoRE server from the questions: "Do I need to turn left?," "Do I need to move forward?," and "Do I need to turn on the lights?." In various embodiments, the selected question is identified by AICoRE server and intelligent smartphone robot is used to ask the question to a human player. The response by a human player to the question is then used by the intelligent smartphone robot and AICoRE server to determine the next step in finding the target object.

In some embodiments, additional questions may be added at any time and may be added to extend the playability of the game. In some embodiments, fewer or more questions are available for interacting with human players. In some embodiments, additional questions can be added by an AICoRE server. The new questions are part of the collection of questions that can be asked by the robot to a human player. For example, questions can be added that respond to different scenarios encountered by an intelligent smartphone robot based on past experience.

Figure 24:
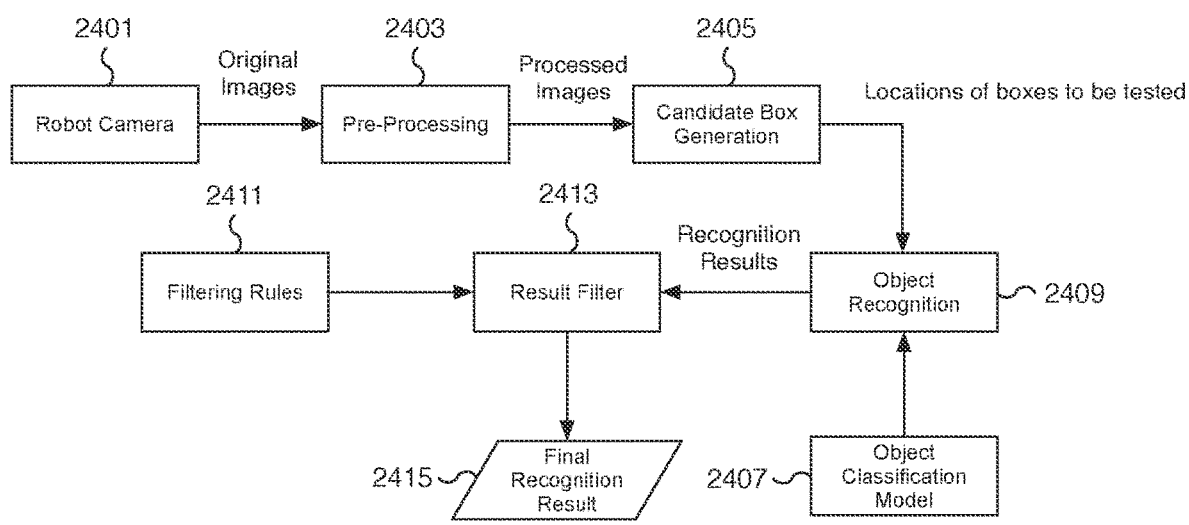
FIG. 24 is a flow diagram illustrating an embodiment of a process for performing object recognition by an intelligent smartphone robot.

FIG. 24 is a flow diagram illustrating an embodiment of a process for performing object recognition by an intelligent smartphone robot. In some embodiments, the process is used by intelligent smartphone robot 1902 of FIG. 19 and/or the intelligent smartphone robot of FIG. 20. In particular, the process of FIG. 24 may be used by a game module such as game module 2101 of FIG. 21 utilizing a vision module such as vision module 2103 of FIG. 21.

At 2401, a robot camera captures an image. For example, a robot camera such as camera 2002 of FIG. 20 captures an image of the environment of the robot. In various embodiments, the camera is the camera of a smartphone device that is docked in a motorized robot base, such as docked smartphone 2001 of FIG. 20. Robot camera 2401 captures original images of the environment that are used as input to an object recognition module, such as object recognition module 2103 of FIG. 21.

At 2403, the images captured by the robot camera at 2401 are pre-processed. In various embodiments, one or more pre-processing steps may be performed to enhance and/or prepare the image for object recognition. For example, warping may be removed, noise may be removed, the image may be converted to a different format, and/or the captured image may be resized, among other appropriate techniques. The result of pre-processing at 2403 are processed images.

At 2405, box generation is performed to identify candidate objects. For example, a box generator is used on a processed image to generate candidate boundary boxes. In some embodiments, the candidate boundary boxes contain objects that have a high probability of being recognized. For example, using a image of a scene with a stack of books, a ball, and a toy block, one boundary box is generated for the stack of books, another for the ball, and yet another for the toy block. Each of the objects is likely to be identified using object recognition.

At 2407, an object classification model is used as an input to object recognition at 2409. In some embodiments, the object classification model is trained in advance on a variety objects and includes a model for each object that can be identified. In some embodiments, the object classification model is trained using a machine learning model. In various embodiments, the object classification model is used to recognize and identify of different objects likely to be found in a gameplay environment of the intelligent smartphone robot.

At 2409, an object recognition module receives candidate boundary boxes and applies an object classification model to the objects at the location of the boundary boxes. In various embodiments, each candidate boundary box includes a location of the box relative to the processed image. The object recognition functionality is applied to each boundary box of the image using the object classification model to identify potential objects. The result of the object recognition functionality is the object recognition results.

At 2411, filtering rules are configured. In some embodiments, the rules are created ahead of time and may be updated dynamically. In various embodiments, the filtering rules are used to filter the results of object recognition. Examples of filtering rules include the rules based on the size of the recognized objects, confidence coefficients, the number of objects to recognize, a priority rating for recognizing objects, etc. In some embodiments, a filtering rule may require that the confidence an object is correctly recognized must exceed a particular threshold in order to determine that the recognition result is a final recognition result. Using filtering rules, objects recognized with lower probabilities are filtered out and not detected. In some embodiments, the filtering rules are based on the context of the performed object recognition. For example, in the scenario where a game is played indoors in a room of a house, confidence requirements for indoor game objects may be lower than confidence requirements for outdoor objects not likely to be found in a similar type of game.

At 2413, the filtering rules configured at 2411 and the object recognition results determined at 2409 are used to determine final recognition results. For example, the filtering rules configured at 2411 are used to filter recognition results determined at 2409. In various embodiments, two types of final recognition results are possible: (1) no object is detected and (2) an object is recognized. In some embodiments, the recognized object is an object close to the robot. In various embodiments, objects that are not detected may be due to low confidence coefficients, objects that are too far away or too small, objects that are difficult to identify, and/or objects that do not match any known object classification model, among other reasons.

At 2415, the final recognition results are outputted. In various embodiments, the object recognition process performed by an object recognition module is continually executed after a game starts. In some embodiments, the final recognition results may be sent to an AICoRE server as part of the information related to the intelligent smartphone robot's status. In some embodiments, more types of objects are recognized by utilizing a more powerful object recognition module. For example, an object classification model trained on a greater variety of object types can recognize a greater number of different object types. In various embodiments, the object recognition module may be performed online by a cloud server.

Figure 25:
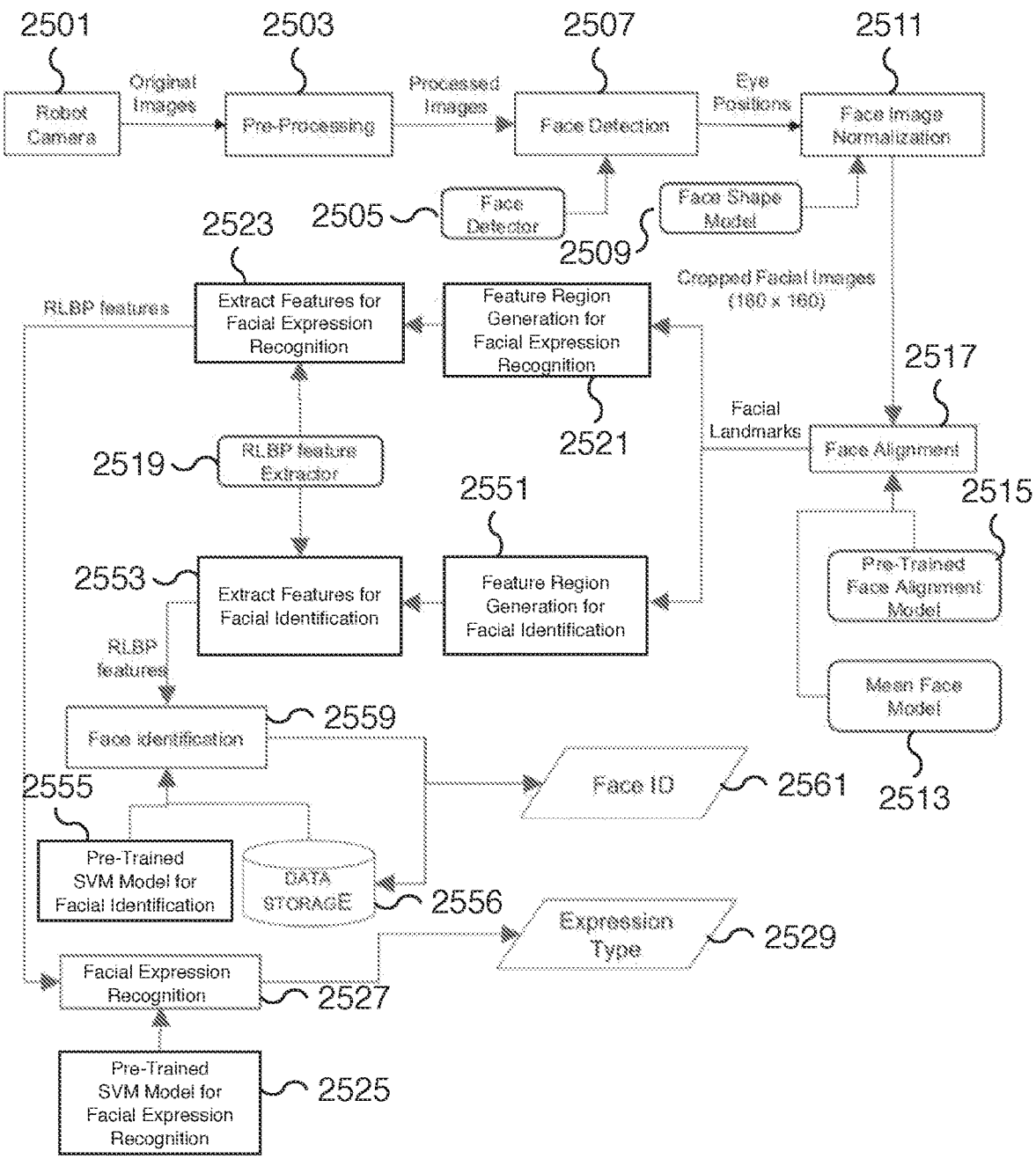
FIG. 25 is a flow diagram illustrating an embodiment of a process for performing facial analysis by an intelligent smartphone robot.

FIG. 25 is a flow diagram illustrating an embodiment of a process for performing facial analysis by an intelligent smartphone robot. In some embodiments, the process is used by intelligent smartphone robot 1902 of FIG. 19 and/or the intelligent smartphone robot of FIG. 20. In particular, the process of FIG. 25 may be used by a facial analysis module such as game module 2101 of FIG. 21 utilizing a face analysis module such as face analysis module 2123 of FIG. 21.

At 2501, a robot camera captures an image. For example, a robot camera such as camera 2002 of FIG. 20 captures an image of the environment of the robot. In various embodiments, the camera is the camera of a smartphone device that is docked in a motorized robot base, such as docked smartphone 2001 of FIG. 20. Robot camera 2501 captures original images of the environment that are used as input to a face analysis module, such as face analysis module 2123 of FIG. 21.

At 2503, the images captured by the robot camera at 2501 are pre-processed. In various embodiments, one or more pre-processing steps may be performed to enhance and/or prepare the image for facial identification and/or facial expression recognition. For example, warping may be removed, noise may be removed, the image may be converted to a different format, and/or the captured image may be resized, among other appropriate techniques. The result of pre-processing at 2503 are processed images.

At 2505, a face detector is configured. The face detector functionality is used to detect faces and facial features. In some embodiments, the face detector is implemented using a face detector module. In various embodiments, the face detector can be configured and revised based on detected past faces and/or facial features.

At 2507, face detection is performed. For example, using the processed images outputted at 2503 and the face detector configured at 2505, face detection is performed. In some embodiments, the result is the detection of eye positions. For example, eye positions corresponding to faces found in the processed images are outputted.

At 2509, a face shape model is configured and used as an input for face image normalization at 2511. In some embodiments, the face shape model is trained in advance on a variety face shapes and includes a model for each face shape that can be identified. In some embodiments, the face shape model is trained using a machine learning model. In various embodiments, the face shape model is used to recognize and identify different face shapes using eye positions as input.

At 2511, face image normalization is performed. For example, using eye positions and a face shape model, face image normalization is performed to normalize potential faces identified in a processed image.

At 2513, a mean face model is configured. In some embodiments, a mean face model is trained using a data set of faces to determine a mean face model. In some embodiments, the mean face model is based on faces the intelligent smartphone robot is likely to encounter.

At 2515, a pre-trained face alignment model is configured. In some embodiments, a pre-trained face alignment model is configured based on misaligned faces and a corresponding correctly aligned face. In various embodiments, a pre-trained face alignment model is useful to correct for misalignment issues in faces.

At 2517, face alignment is performed using a normalized face image, a mean face model, and a pre-trained face alignment model. The various inputs are used to align a potentially detected face and to output facial landmarks. In some embodiments, face landmarks are applied to a cropped image with a reduced size that contains the face to be processed. For example, the potentially detected face is cropped after normalization and alignment. In some embodiments, a cropped image is a smaller size such as 160 pixels by 160 pixels and the facial landmarks are applied on top of the cropped image.

At 2519, a feature extractor is configured. In some embodiments, the feature extractor is a Rotated Local Binary Pattern (RLBP) feature extractor. In various embodiments, the feature extractor is configured for extracting features from a feature region. For example, a RLBP feature extractor is configured to extract RLBP features from a processed image based on facial landmark positions. In some embodiments, the feature extractor is based on another appropriate feature extractor technique such as scale-invariant feature transform (SIFT), speeded up robust features (SURF), oriented FAST and rotated BRIEF (ORB), and/or convolutional neural networks (CNN), among other techniques.

At 2521, one or more feature regions for facial expression recognition are generated. For example, a region of a potentially detected face is identified as a feature region. The feature region is used as an input for identifying a facial expression expressed in the feature region. In various embodiments, the facial landmarks are used as input for feature region generation.

At 2523, features for facial expression recognition are extracted. For example, using the one or more feature regions generated at 2521 and the feature extractor configured at 2519, features for facial expression recognition are extracted. In some embodiments, the features are extracted as RLBP features. In some embodiments, RLBP features of the cropped image are extracted based on facial landmark positions.

At 2525, a pre-trained model for facial expression recognition is configured. In some embodiments, the model is a support vector machine (SVM). For example, a SVM model for facial expressions is trained based on a data set of facial expressions and their corresponding expression type. Other types of models may be used as appropriate.

At 2527, facial expression recognition is performed. For example, facial expressions are recognized based on extracted facial expression features. In some embodiments, the facial expression recognition is performed using a pre-trained model of facial expressions and identified facial expression features. For example, the facial expression features may be RLBP features and a pre-trained SVM model for facial expression recognition is used to identify an expression type. In some embodiments, the pre-trained model is used to classify the extracted facial expression into one of multiple expression types.

At 2529, the result of facial expression recognition is an expression type. In some embodiments, the facial expression type is based on the types used to train the pre-trained model of 2525. In some embodiments, the expression type is sent to an AICoRE server as part of a status update of an intelligent smartphone robot. For example, the determined expression type may be sent by an intelligent smartphone robot to an AICoRE server for determining how to respond to a human player with a particular expression.

At 2551, one or more feature regions for facial identification are generated. For example, a region of a potentially detected face is identified as a feature region. One or more feature regions are used as an input for facial identification. In various embodiments, the facial landmarks are used as input for feature region generation.

At 2553, features for facial identification are extracted. For example, using the one or more feature regions generated at 2551 and the feature extractor configured at 2519, features for facial identification are extracted. In some embodiments, the features are extracted as RLBP features. In some embodiments, RLBP features of the cropped image are extracted based on facial landmark positions.

At 2555, a pre-trained model for facial identification is configured. In some embodiments, the model is a support vector machine (SVM). For example, a SVM model for facial identification is trained based on a data set of faces. In some embodiments, the model is trained using the identity corresponding to extracted features. In some embodiments, the faces and/or facial identification features and their corresponding identities are stored in data storage 2556. In some embodiments, the model is used to extract facial identification features and the identity of a face corresponding to a particular set of facial identification features is stored in data storage 2556. Other types of models may be used as appropriate.

At 2556, a data storage is configured to store faces and/or facial identification features and their corresponding identities. In some embodiments, the data storage is updated as new users are identified. For example, facial identification features are extracted from a new human player and stored in the data storage along with the user's identity. In some embodiments, the identity is referenced using a face identifier or face ID that is unique to each human player.

At 2559, face identification is performed. For example, the identity of a detected face is determined based on extracted facial identification features. In some embodiments, face identification is performed using a pre-trained model of faces and their corresponding identities. For example, the facial identification features may be RLBP features and a pre-trained SVM model for facial identification is used to determine an identity of a detected face using the facial identification features. In some embodiments, the pre-trained model is used to classify a face into one of multiple users. In various embodiments, the extracted facial identification features are compared with existing features stored in data storage 2556 to determine a facial identity. In some embodiments, extracted features may be then stored in data storage 2556, for example, in the scenario that the features are not recognized or are new features.

At 2561, the result of face identification is a face identifier. In some embodiments, the face identifier corresponds to a human player and is based on the human players used to train the pre-trained model of 2555 and/or stored in data storage 2555. In some embodiments, the face identifier is sent to an AICoRE server as part of a status update of an intelligent smartphone robot. For example, the face identifier may be sent by an intelligent smartphone robot to an AICoRE server for determining how to respond to a particular human player.

In some embodiments, the face identification of 2561 and the expression type of 2529 are sent together to an AICoRE server. For example, as part of a status information update, a face ID and a face expression type are sent for an AICoRE server to determine an appropriate response. In some embodiments, the features extracted can be extracted using other efficient features to improve the facial recognition and face identification results. For example, features based on scale-invariant feature transform (SIFT), speeded up robust features (SURF), oriented FAST and rotated BRIEF (ORB), and/or convolutional neural networks (CNN), among other appropriate solutions may be used.

In some embodiments, a new player can register his or her face with an intelligent smartphone robot using facial identification. For example, prior to a game starting or as part of a game setup, a user can register his or her face. In some embodiments, a human player launches an interactive game running on an intelligent smartphone robot. The player faces a camera such as a camera of a smartphone device docked into a motorized robot base. The player beings the face registration process by using an app installed on the smartphone. The app initiates the face analysis module and extracts the player's facial identification features. For example, facial identification features may be extracted as RLBP features. The extracted facial identification features are stored in a data storage such as data storage 2556.

Figure 26:
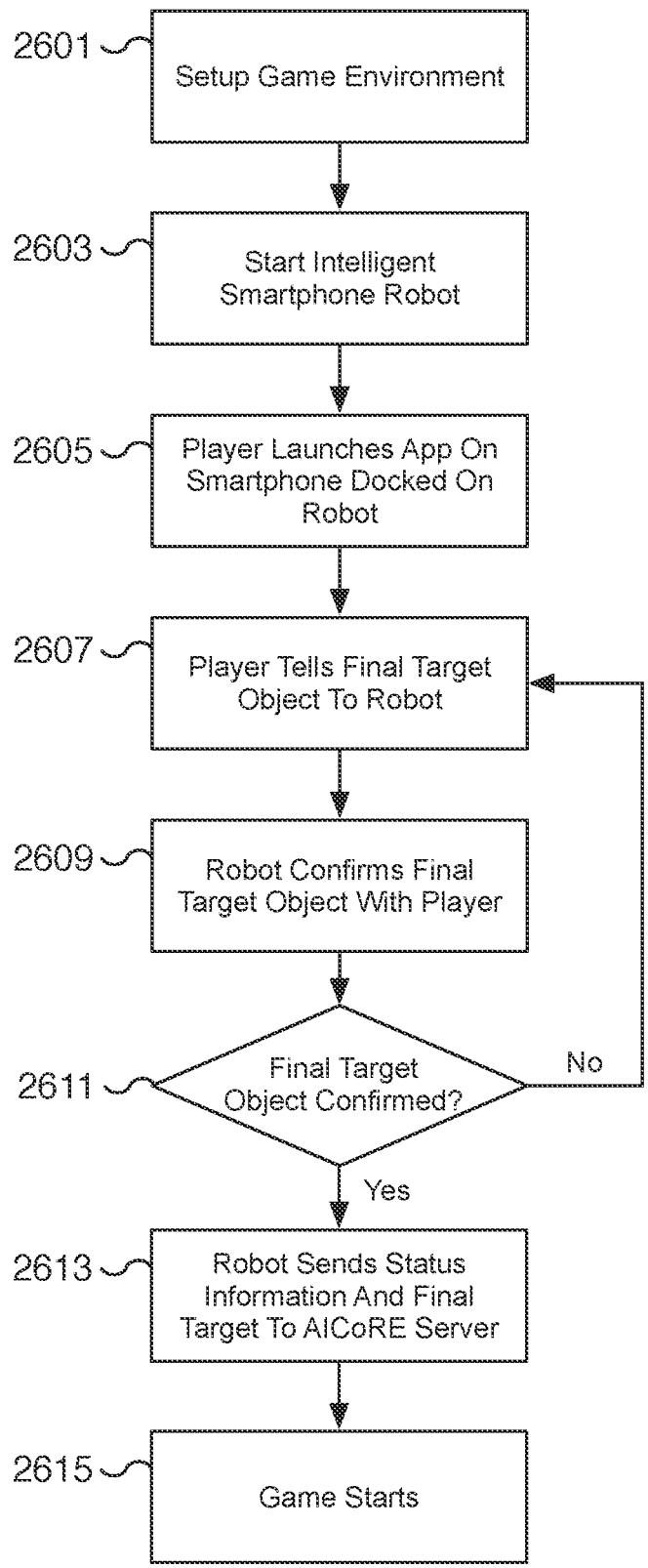
FIG. 26 is a flow diagram illustrating an embodiment of a process for an interactive game using an intelligent smartphone robot.

FIG. 26 is a flow diagram illustrating an embodiment of a process for an interactive game using an intelligent smartphone robot. In some embodiments, the process corresponds to the interactive game system of FIG. 19 and/or FIG. 21. In some embodiments, the process of FIG. 26 uses intelligent smartphone robot 1902 of FIG. 19, the intelligent smartphone robot of FIG. 20, and/or the disclosed autonomous robotic system. In some embodiments, the interactive game may be divided into at least two stages, a start stage and a search stage. In some embodiments, the process of FIG. 26 is performed as part of the start stage of an interactive game. For example, the process is used to setup and initialize the game parameters for starting a new game.

At 2601, a player sets up the game environment. For example, a player places an intelligent smartphone robot, obstacles, and one recognizable object used as a final target object on a playing surface. The robot needs to be guided from its starting position to the final target while attempting to avoid obstacles along the way. The player should choose the locations of the robot, obstacles, and final target so that there exists at least one path for the robot to navigate from the starting location to the final target.

At 2603, the intelligent smartphone robot is started. For example, the robot must be powered on and activated. In some embodiments, the robot may sleep if there is no activity for a certain duration. In various embodiments, to start a new game the robot must be powered on and started. In some embodiments, to start the intelligent smartphone robot, a docked smartphone device and a motorized base must both be powered on.

At 2605, the player launches a smartphone application on the docked smartphone of the intelligent smartphone robot. In various embodiments, an AICoRE server should also be connected to the intelligent smartphone robot via a network link. Once the application is launched, the intelligent smartphone robot is able to listen to the human player's speech.

At 2607, a human player tells the final target object to the intelligent smartphone robot. In some embodiments, the final target is a recognizable object, for example, a card with printed marker, a colorful ball, etc. The final target object is the object that the robot needs to find during the gameplay. In some embodiments, the player can interact with the intelligent smartphone robot verbally. For example, a human player can speak the phases: "Find a red cup" or "Final target is a green ball." The intelligent smartphone robot will analyze the player's sentence and extract the name of the final target. In some embodiments, the analysis utilizes the conversation module of the robot. In some embodiments, the robot utilizes a remote AICoRE server.

At 2609, the intelligent smartphone robot confirms the final target object with the player. For example, in some embodiments, the robot displays a sentence using the smartphone display confirming the target object. In some embodiments, the robot displays an image of the final object on the smartphone display. In some embodiments, a text description may be displayed along with the image of the target object. In some embodiments, the robot verbalizes the final target object. For example, the robot speaks a sentence to confirm whether the robot correctly understood the name of the final target object. Examples of prompts include: "Do I need to find a red cup?" and "Is my final target a green ball?" In various embodiments, the final target name is utilized in the confirmation prompt. Other appropriate sentences confirming the target objects may be used as well. Once the target object confirmation is prompted, the robot waits for the player's response. In some embodiments, the response is a selection via the touchscreen of the smartphone device or other touch-based user interface. In some embodiments, the response is a voice response. For example, a positive answer from a player, such as "yes" or "correct," confirms the final target is correctly selected. In response to a negative confirmation, the robot will consider the name of the final target incorrect. In some embodiments, the response is a facial expression such as a smile or a nod for a confirmation of a correctly identified final target and/or a frown for an incorrectly identified final target.

At 2611, in response to a confirmed final target object, processing continues to 2631. A confirmed target object may include a human player voice response such as "yes" or "correct." In response to the final target object not being confirmed (i.e., a negative confirmation), processing loops back to 2607 for the player to tell the final target object to the robot.

At 2613, the intelligent smartphone robot sends status information and the final target to an AICoRE server. In various embodiments, the AICoRE server is a remote server accessible via a network connection. The AICoRE server receives the name of the final target object. In some embodiments, other additional status information may include the player name and other game parameters (obstacle information, distances to obstacles, number of players, face analysis results, etc.).

At 2615, the interactive game starts. In some embodiments, the start of the game initiates the intelligent smartphone robot to begin searching for the final target. In various embodiments, once the intelligent smartphone robot begins searching, the robot continuously sends status information to an AICoRE server. Status information may include objects recognized, face analysis results, measurement results using a distance sensor, and the final target name, among other information. In various embodiments, the status information is used by an AICoRE server to generate the robot's next movement or action. For example, the robot may move and/or ask the human player a question to help determine the robot's next move.

Figure 27:
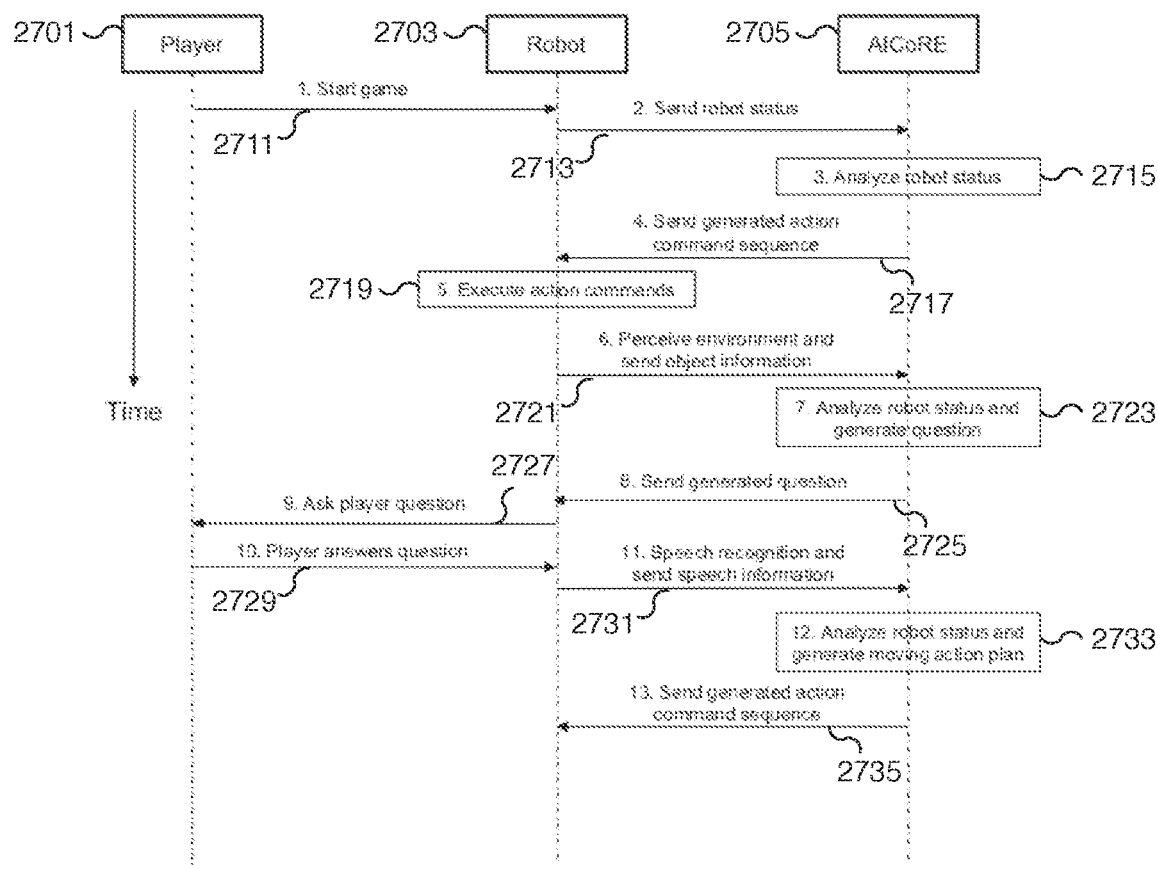
FIG. 27 is an interaction diagram illustrating an embodiment of a process for an interactive game using an intelligent smartphone robot.

FIG. 27 is an interaction diagram illustrating an embodiment of a process for an interactive game using an intelligent smartphone robot. In some embodiments, the process corresponds to the interactive game system of FIG. 19 and/or FIG. 21. In some embodiments, the process of FIG. 27 uses intelligent smartphone robot 1902 of FIG. 19, the intelligent smartphone robot of FIG. 20, and/or the disclosed autonomous robotic system. In the example shown, the process describes the interactions between human player 2701, intelligent smartphone robot 2703, and AICoRE server 2705 for an interactive game using an intelligent smartphone robot. In some embodiments, the process of FIG. 27 corresponds to the search stage of a game and is performed after the start stage to configure and setup the game is completed. In some embodiments, the configuration performed prior to the game starting is the process described by FIG. 26.

At 2711, the interactive game is started. At 2711, human player 2701 has completed the start process and the game enters the search stage. In various embodiments, human player 2701 interacts with smartphone intelligent robot 2703 to start the game.

At 2713, smartphone intelligent robot 2703 sends status information to AICoRE server 2705. In some embodiments, status information includes object recognition results, measurement result(s), face analysis result(s), speech recognition results, and final target results, among other information. Measurement results may be the result of a distance measurement module of smartphone intelligent robot 2703. Speech recognition results may be based on audio input captured from human player 2701 speaking.

At 2715, AICoRE server 2705 analyzes the status information received from smartphone intelligent robot 2703. Based on the information, AICoRE server 2705 may generate an action command sequence. In some embodiments, the action commands of the action command sequences are described with respect to FIG. 22.

At 2717, AICoRE server 2705 sends a generated action command sequence to smartphone intelligent robot 2703. In various embodiments, the sequence may command smartphone intelligent robot 2703 to ask a question of human player 2701 and/or to move smartphone intelligent robot 2703 in a particular direction.

At 2719, smartphone intelligent robot 2703 will execute the received action commands of the action command sequence. In some embodiments, during initialization and based on the status of smartphone intelligent robot 2703, AICoRE server 2705 will generate basic action commands such as commands directing smartphone intelligent robot 2703 to turn left or move forward.

At 2721, smartphone intelligent robot 2703 will perceive its surrounding environment to obtain object information and send the perceived object information to AICoRE server 2705. In various embodiments, the object information includes object recognition results, measurement results using a distance measurement module, etc. In the event the final target is recognized at this step, the game is finished successfully. In the event the final target is not recognized, the game will continue.

At 2723, AICoRE server 2705 analyzes the status information received from smartphone intelligent robot 2703 including robot status information (such as location and orientation) and object information. Based on the information, AICoRE server 2705 may generate questions to ask of human player 2701 in order to navigate to the final target object. In some embodiments, the questions are described with respect to FIG. 23.

At 2725, AICoRE server 2705 sends the generated question to smartphone intelligent robot 2703. In some embodiments, the exemplary generated questions are described with respect to FIG. 23.

At 2727, smartphone intelligent robot 2703 asks human player 2701 the generated question. In various embodiments, the question is a verbalized inquiry by smartphone intelligent robot 2703 in a human language. For example, using natural language generation (NLG) described above, smartphone intelligent robot 2703 can vocalize the question. In some embodiments, smartphone intelligent robot 2703 first turns to orientate itself to face human player 2701. For example, smartphone intelligent robot 2703 turns to orientate the camera of smartphone intelligent robot 2703 to capture the face of human player 2701. In some embodiments, the position of human player 2701 is determined by processing visual and/or audio cues of human player 2701.

At 2729, human player 2701 answers the question. In various embodiments, human player 2701 answered the question by speaking the answer using a human natural language. In some embodiments, the answer is expressed by human player 2701 as a facial expression.

At 2731, smartphone intelligent robot 2703 processes the answer of human player 2701. In some embodiments, smartphone intelligent robot 2703 uses natural language understanding (NLU) to process the human language answer of human player 2701. In various embodiments, smartphone intelligent robot 2703 performs speech recognition on the answer and sends speech information to AICoRE server 2705.

In some embodiments, smartphone intelligent robot 2703 additionally performs facial expression recognition on human player 2701. In some embodiments, smartphone intelligent robot 2703 performs speech recognition utilizing recognized human expressions. In some embodiments, the speech information sent to AICoRE server 2705 includes human expression types that are recognized. In various embodiments, smartphone intelligent robot 2703 performs facial identification to confirm the human player 2701 is the person speaking at 2729. In various embodiments, facial identification and/or facial expression recognition are described with respect to FIG. 25. In some embodiments, smartphone intelligent robot 2703 re-orientates itself to face its original orientation prior to turning to face human player 2701.

At 2733, AICoRE server 2705 analyzes the status information received from smartphone intelligent robot 2703 including robot status information (such as location and orientation) and speech information to generate an action command sequence. Based on the information, AICoRE server 2705 may generate a movement action plan to navigate smartphone intelligent robot 2703 towards the final target object.

At 2735, AICoRE server 2705 sends a generated action command sequence to smartphone intelligent robot 2703. In various embodiments, the sequence may command smartphone intelligent robot 2703 to turn and/or move in a particular direction. In some embodiments, the action command sequence may command smartphone intelligent robot 2703 to speak a question to human player 2701 to obtain additional information.

In various embodiments, step 2735 is the same step as 2717 and the gameplay continues in a loop from step 2717 until the target object is found at an iteration of step 2721. In some embodiments, the gameplay ends when the game times out, for example, if the final target object has not been found within a configured timeout threshold.

Figure 28:
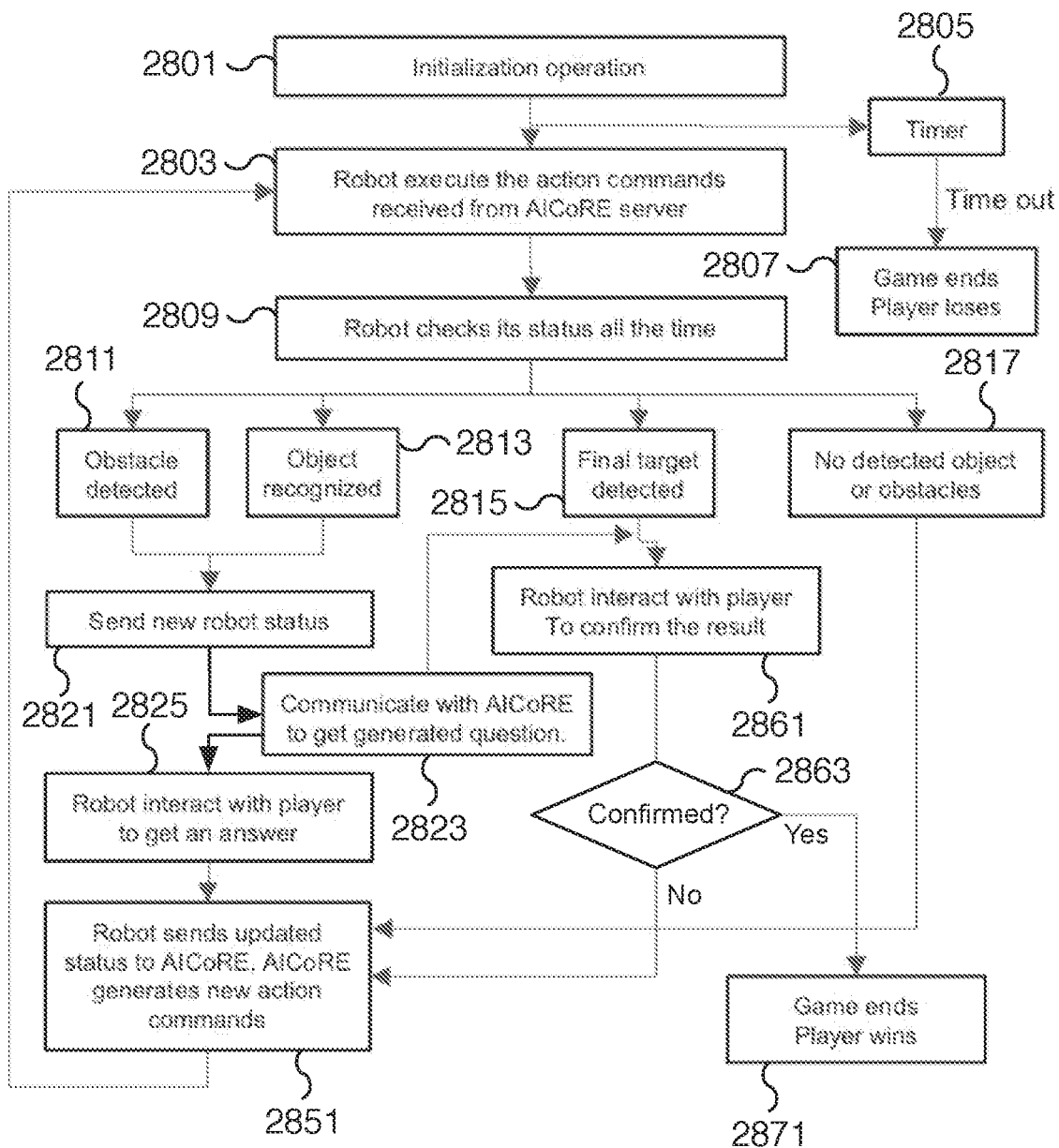
FIG. 28 is a flow diagram illustrating an embodiment of a process for an interactive game using an intelligent smartphone robot.

FIG. 28 is a flow diagram illustrating an embodiment of a process for an interactive game using an intelligent smartphone robot. In some embodiments, the process corresponds to the interactive game system of FIG. 19 and/or FIG. 21. In some embodiments, the process of FIG. 28 uses intelligent smartphone robot 1902 of FIG. 19, the intelligent smartphone robot of FIG. 20, and/or the disclosed autonomous robotic system. In various embodiments, an intelligent smartphone robot perceives the environment around it and utilizes an AICoRE server to generate action command sequences including questions to ask a human player to help navigate towards a final target object. For example, in some embodiments, the perceived environment includes distance measurements of nearby objects that may be obstacles and/or the final target object. In some embodiments, a detected object may be recognized using an object recognition module.

At 2801, an initialization operation is performed. For example, the intelligent smartphone robot is activated and the game is initialized. In some embodiments, a remote AICoRE server is also initialized.

At 2803, the intelligent smartphone robot executes one or more action commands received from an AICoRE server. As described herein, action commands may include movement and/or questions to ask a human player.

At 2805, a timer is configured. For example, a timer is configured to limit the game to a pre-defined time limit. In the event the timer times out, processing proceeds to 2807.

At 2807, the game ends and the human player loses. For example, the timer configured at 2805 runs out of time and the game ends. Since the intelligent smartphone robot has not navigated to the final target object, the game is counted as a loss.

At 2809, the intelligent smartphone robot checks its status. In some embodiments, the status is checked by checking the sensors of the intelligent smartphone robot such as the distance sensors, microphone, camera, etc. In various embodiments, the sensors are checked at regular intervals to continuously update the status information of the intelligent smartphone robot. In some embodiments, the status is checked until the game finishes and updates to the status trigger processing for subsequent steps 2811, 2813, 2815, and/or 2817.

At 2811, an obstacle is detected. For example, a stack of books is detected and is identified as an obstacle. In the event an obstacle is detected, processing continues to 2821. At 2811, a determination is made that the detected obstacle is not the final target object.

At 2813, an object is recognized. For example, a red ball is detected and recognized using an object recognition module. In the event an object is recognized, processing continues to 2821. At 2813, a determination is made that the recognized object is not the final target object.

At 2815, a final target object is detected. For example, the target object configured at the start of the game is detected by the intelligent smartphone robot. Once the final target object is detected, processing continues to 2861 for confirmation by the human player.

At 2817, no object or obstacles are detected and processing continues to 2851.

At 2821, in response to a detected obstacle or a recognized object that is not the final target object, the intelligent smartphone robot sends status information to an AICoRE server. For example, the intelligent smartphone robot sends information related to the detected obstacle or a recognized object to AICoRE server to utilized the planning abilities of AICoRE server. In response to the robot status information, AICoRE server generates a question for the intelligent smartphone robot to ask of the human player. The question is used to gather more information to help navigate the intelligent smartphone robot towards the final target object. In some embodiments, example questions are described with respect to FIG. 23 and may be pre-defined and/or learned. Once the status is sent to AICoRE server, processing continues to 2823 to receive a generated question as a response.

At 2823, the intelligent smartphone robot communicates with AICoRE server to receive a question generated by AICoRE server. In various embodiments, the intelligent smartphone robot and AICoRE server communicate using a network link. Once the question is received, processing continues to 2825.

At 2825, the intelligent smartphone robot interacts with the human player to receive the answer to the generated question received at 2823. In various embodiments, the question and answer are voice based and are processed using natural language generation (NLG) and natural language understanding (NLU). For example, the intelligent smartphone robot vocalizes an inquiry to a human player and the intelligent smartphone robot listens for a voice response from a human player. The response by the human player is included as part of the status information that will eventually be sent to AICoRE server. After the answer is received, processing continues to 2851.

At 2851, the intelligent smartphone robot sends an updated status to the AICoRE server and the AICoRE server responds with a new action command sequence. In some embodiments, the action commands include movement commands. Processing proceeds to 2803 where the action command sequence is executed.

At 2861, the intelligent smartphone robot interacts with the human player to confirm the result of a detected final target object. For example, an object is detected that the intelligent smartphone robot determines may be the final target object. At 2861, the robot interacts with the human player to confirm whether the detected object is actually the target object. In some embodiments, the interaction is all voice based using natural language generation (NLG) and natural language understanding (NLU). For example, the human player may respond to a voice confirmation prompt by the intelligent smartphone robot with the response: "Yes" or "You found it!" In some embodiments, the interaction may utilize a visual GUI such as a touch screen. In some embodiments, the interaction utilizes facial expression recognition.

At 2863, whether the intelligent smartphone robot target has reached the final target object is confirmed. In the event the human player confirms that the target object is reached, processing continues to 2871. In the event the human player confirms that the target object has not been reached, processing continues to 2851.

At 2871, the game ends and the human player wins. In various embodiments, the intelligent smartphone robot congratulates the human player. For example, the intelligent smartphone robot may vocalize a congratulatory message and/or perform a congratulatory celebration.

In some embodiments, the final target object may be a person's face. For example, the human player or another player can be the final target and once the intelligent smartphone robot reaches the target person and captures the target person's face via its camera, the game is won. In the event a human face is the target object, a player can register his or her face using the intelligent smartphone robot. In various embodiments, faces can be registered using an application run on the smartphone docked in the intelligent smartphone robot.

In some embodiments, facial expressions are detected and utilized along with or instead of vocal responses. For example, a facial expression can be used to confirm or not confirm a detected final target. As one example, a smile may be used as a confirmation that the detected final target is the actual final target. As another example, a frown may be used as a confirmation that the detected final target is not the actual final target. Other facial expression may be utilized as appropriate. In some embodiments, the interaction between the human player and the intelligent smartphone robot requires the intelligent smartphone robot to first position itself to face the human player before beginning a conversation. Once the conversation is complete, for example, the human player responds to a question, the intelligent smartphone robot returns its orientation to its previous positioning to continue navigating to the final target object. In various embodiments, by directing the intelligent smartphone robot to face the human player during conversations, a more rich and interactive experience is created. The human user is provided with a visual prompt corresponding to the start and end of a conversation and the intelligent smartphone robot is able to utilize facial identification and/or facial expression recognition from images captured by its camera to add additional context and accuracy for natural language understanding (NLU) performed on the human user's voice response.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a motor configured to control a physical movement of the system; and
   a base configured to be coupled with a computing device;
   wherein the computing device is configured to:
   receive an indication of a target object;
   detect an obstacle object in a physical environment of the system;
   in response to a detection of the detected obstacle object, provide to a user an inquiry associated with the detected obstacle object;
   receive a natural language response to the inquiry;
   control the motor to navigate the system around the detected obstacle object based at least in part on the natural language response;
   detect the target object;
   provide an indication that the target object has been located; and
   recognize a facial expression response to the indication that the target object has been located.

2. The system of claim 1, wherein the target object is a human face.

3. The system of claim 1, wherein the computing device is a smartphone device.

4. The system of claim 1, wherein the inquiry associated with the detected obstacle object is determined using a reasoning engine.

5. The system of claim 4, wherein the reasoning engine is installed on a remote computer server accessible via a network connection of the computing device.

6. The system of claim 5, wherein the reasoning engine is an adaptive interactive cognitive reasoning engine utilizing an artificial intelligence memory graph data structure.

7. The system of claim 1, wherein the natural language response to the inquiry is used to generate an action command sequence determined by a reasoning engine and the action command sequence is used to control the motor to navigate the system around the detected obstacle object.

8. The system of claim 1, wherein the inquiry associated with the detected obstacle object is one of a set of pre-defined inquiries configured for a reasoning engine.

9. The system of claim 1, wherein the computing device is further configured to receive a second natural language response in response to the indication that the target object has been located.

10. The system of claim 1, wherein the facial expression response is used to confirm that the target object has been located.

11. The system of claim 1, wherein the detected obstacle object is detected using a vision module configured to process an image captured by a camera of the computing device.

12. The system of claim 1, wherein the computing device includes a camera and a microphone.

13. The system of claim 1, wherein the base includes a distance measurement sensor.

14. The system of claim 13, wherein the distance measurement sensor is configured to approximate the distance from the base to the detected obstacle object.

15. The system of claim 13, wherein the computing device is configured to control the distance measurement sensor.

16. The system of claim 1, wherein the computing device is further configured to register a facial identity associated with a human player.

17. The system of claim 16, wherein the computing device is further configured to identify the human player using facial identification, wherein identifying the human player includes comparing the registered facial identity with extracted facial identification features.

18. A method, comprising:
    executing an interactive game on a mobile computing device, wherein the mobile computing device is coupled with a base and the base includes a motor configured to control the physical movement of the base;
    receiving an indication of a target object;
    detecting an obstacle object in a physical environment of the interactive game;
    in response to the detection of the obstacle object, providing to a user an inquiry associated with the detected obstacle object;
    receiving a natural language response to the inquiry;
    controlling the motor to navigate the base around the detected obstacle object based at least in part on the natural language response;
    detecting the target object;
    providing an indication that the target object has been located; and
    recognizing a facial expression response to the indication that the target object has been located.

19. The method of claim 18, wherein the base includes a distance measurement sensor.

20. A computer program product embodied in a non-transitory computer readable medium and comprising computer instructions for:
    executing an interactive game on a mobile computing device, wherein the mobile computing device is coupled with a base and the base includes a motor configured to control the physical movement of the base;
    receiving an indication of a target object;
    detecting an obstacle object in a physical environment of the interactive game;
    in response to the detection of the obstacle object, providing to a user an inquiry associated with the detected obstacle object;
    receiving a natural language response to the inquiry;
    controlling the motor to navigate the base around the detected obstacle object based at least in part on the natural language response;
    detecting the target object;

providing an indication that the target object has been located; and recognizing a facial expression response to the indication that the target object has been located.

* * * * *

UNITED STATES PATENT AND TRADEMARK OFFICE
CERTIFICATE OF CORRECTION

Page 1 of 1

PATENT NO. : 10,963,493 B1
APPLICATION NO. : 16/142809
DATED : March 30, 2021
INVENTOR(S) : Yi Hu, Run Cui and Hong Shik Shinn It is certified that error appears in the above-identified patent and that said Letters Patent is hereby corrected as shown below:

In the Specification

In Column 29, Line(s) 49, delete "FIGS. 1" and insert --FIG. 1--, therefor.

In Column 29, Line(s) 50, delete "FIGS. 2" and insert --FIG. 2--, therefor.

In Column 30, Line(s) 11, delete "FIGS. 1" and insert --FIG. 1--, therefor.

In Column 30, Line(s) 11, after "211 of", delete "FIGS." and insert --FIG.--, therefor.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*